United States Patent
Inami et al.

(10) Patent No.: US 8,509,425 B2
(45) Date of Patent: Aug. 13, 2013

(54) IMAGE PROCESSING SYSTEM, PROGRAM AND METHOD

(75) Inventors: Yasuharu Inami, Kahoku (JP); Mutsumu Nagashima, Kahoku (JP); Hitoshi Yoshio, Kahoku (JP); Seishi Sanada, Kahoku (JP)

(73) Assignee: PFU Limited, Kahoku-shi, Ishikawa (JP)

( * ) Notice: Subject to any disclaimer, the term of this patent is extended or adjusted under 35 U.S.C. 154(b) by 678 days.

(21) Appl. No.: 12/627,954

(22) Filed: Nov. 30, 2009

(65) Prior Publication Data

US 2010/0074437 A1    Mar. 25, 2010

Related U.S. Application Data

(63) Continuation of application No. PCT/JP2008/051483, filed on Jan. 31, 2008.

(51) Int. Cl.
*H04L 9/00*    (2006.01)

(52) U.S. Cl.
USPC .................................. 380/28; 380/29; 380/30

(58) Field of Classification Search
USPC ........................................................... 380/28
See application file for complete search history.

(56) References Cited

U.S. PATENT DOCUMENTS

| | | | |
|---|---|---|---|
| 2006/0126829 A1* | 6/2006 | Lai | 380/28 |
| 2007/0223691 A1* | 9/2007 | Takashima et al. | 380/200 |
| 2008/0279380 A1* | 11/2008 | Hayashi | 380/243 |

FOREIGN PATENT DOCUMENTS

| | | |
|---|---|---|
| JP | 08-179689 A | 7/1996 |
| JP | 2938338 B2 | 8/1999 |
| JP | 2004-032538 A | 1/2004 |
| JP | 2006-080623 A | 3/2006 |
| WO | 2006/028103 A1 | 3/2006 |

OTHER PUBLICATIONS

International Search Report of PCT/JP2008/051483, mailing date of Apr. 22, 2008.

* cited by examiner

*Primary Examiner* — Ghazal Shehni
(74) *Attorney, Agent, or Firm* — Westerman, Hattori, Daniels & Adrian, LLP

(57) ABSTRACT

Provided is an image processing system capable of simply executing image processing for encryption and decryption without causing a user to perform a time-consuming operation of generating a processing target image, the system including: a rendering information input accepting unit 21 accepting an input of rendering information for depicting a content of electronic data; a digital image generating unit 15 generating a digital image defined on the basis of the accepted rendering information; a definition information acquiring unit 23 acquiring definition information containing area designating information for specifying an encrypting target partial area in the generated digital image and key information used on the occasion of encrypting the partial area; an encrypting unit 11 generating an encrypted image by converting the image of the partial area on the basis of the key information; and an output unit 12 outputting the encrypted image.

12 Claims, 51 Drawing Sheets

FIG. 4

| IDENTIFYING INFORMATION | AREA DESIGNATING INFORMATION | KEY INFORMATION (ENCRYPTION KEY/DECRYPTION KEY) |
|---|---|---|
| 0001 | {(5, 10), (9, 10), (5, 12)}, {· · ·}, · · · | qwertyio |
| 0002 | {(7, 10), (9, 10), (7, 12)}, {· · ·}, · · · | kagikagi |
| 0003 | {(15, 3), (17, 3), (15, 12)}, {· · ·}, · · · | angoukagi |
| · · · | · · · | · · · |

FIG. 14

| IDENTIFYING INFORMATION | AREA DESIGNATING INFORMATION |
|---|---|
| 0001 | {(5, 10), (9, 10), (5, 12)}, {···}, ··· |
| 0002 | {(7, 10), (9, 10), (7, 12)}, {···}, ··· |
| 0003 | {(15, 3), (17, 3), (15, 12)}, {···}, ··· |
| ⋮ | ⋮ |

(A) TRIANGULAR MICRO AREA (B) MICRO AREAS HAVING DIFFERENT SIZES AND SHAPES (A)

(B)

FIG. 37
(A) (B) (C) (D)
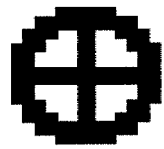 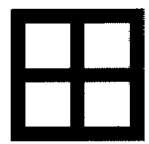 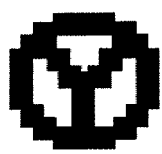 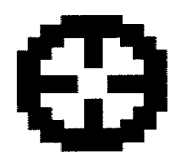

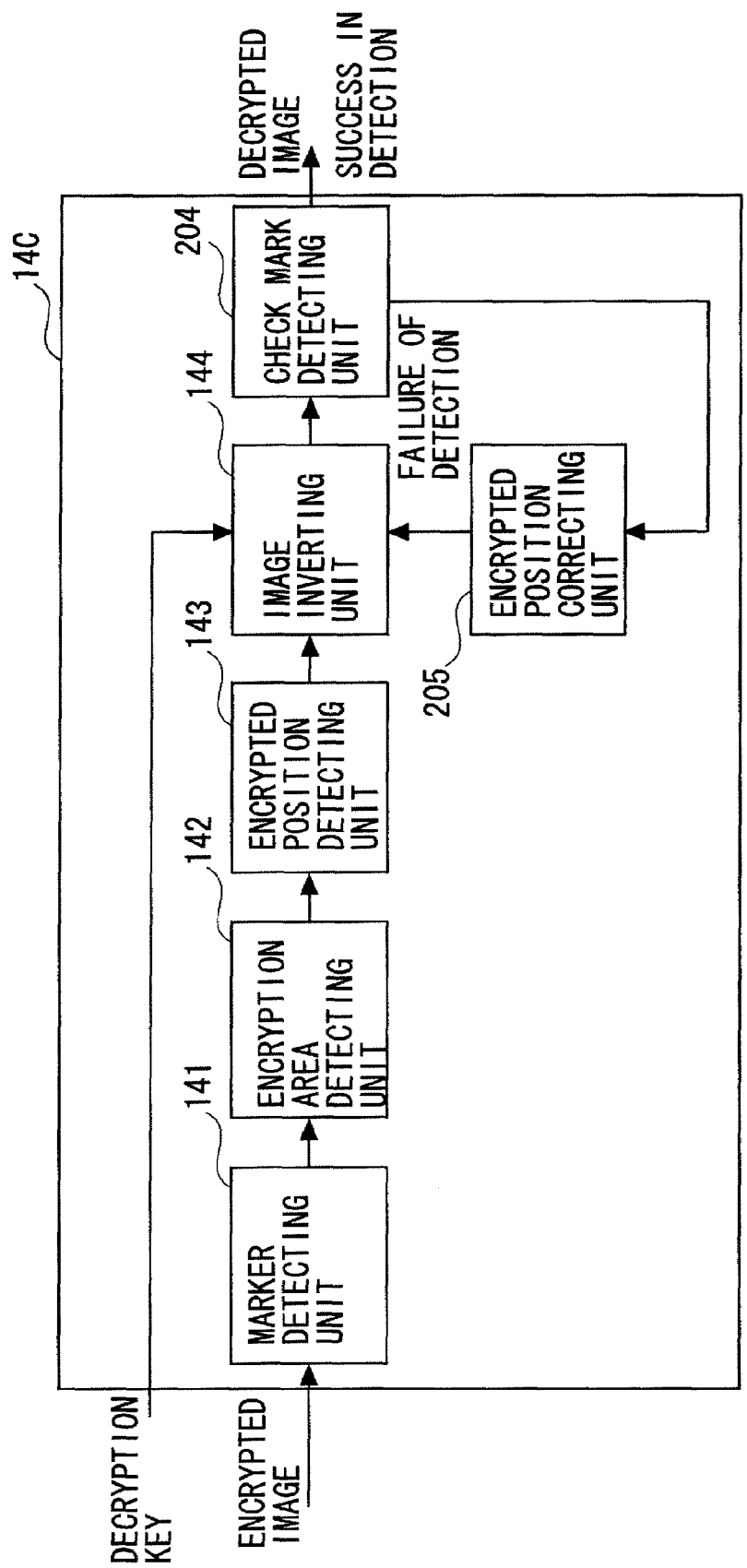

IMAGE PROCESSING SYSTEM, PROGRAM AND METHOD

This is a continuation of Application PCT/JP2008/051483, filed on Jan. 31, 2008, now pending, based upon and claims the benefit of priority of the prior Application PCT/JP2007/061112, filed on May 31, 2007, the contents of which are herein wholly incorporated by reference.

FIELD

The present invention relates to a technology of encrypting electronic data.

BACKGROUND

A technology of dealing with encryption of a printed matter is exemplified by a technology of, at first, segmenting a whole image into a plurality of blocks, rearranging images of the segmented blocks based on parameters obtained from an inputted password (encryption key), further black-and-white-inverting and mirror-inverting the images of the blocks designated by the parameters, and thus encrypting the images (refer to Patent document 1). On the occasion of decrypting the encrypted image, a positioning frame is attached to the outside of the image, and, after inputting the password (decryption key), the encrypted image is decrypted into the original image through procedures reversed to those for the encryption.

Another technology is that black-and-white squares having a predetermined size, which represent binary data, are arrayed in matrix and embedded into the printed matter (refer to Patent document 2). Further, for recognizing visualized positions on the occasion of decryption, positioning symbols are attached to predetermined positions of the matrix on the printed matter. Based on these positioning symbols, the image is captured by a scanner and a camera, and the embedded information is decrypted.

[Patent document 1] Japanese Patent Laid-Open Publication No. 8-179689
[Patent document 2] Japanese Patent Publication No. 2938338

SUMMARY

There has hitherto been a technology of encrypting an image by executing image processing based on an encryption key. When encrypting the image, however, the image needs capturing through a scanner in the case of a document of a paper medium, and, in the case of the document of electronic data, the image (such as the image in a bitmap format) defined as an aggregation of pixels is required to be generated. Particularly in the document of the electronic data, if an application dealing with the document does not have an output function in an image format, it is difficult to acquire the image for the encryption, and it follows that an extremely time-consuming operation is imposed on a user on the occasion of performing the encryption.

It is an object of the present invention, in view of the problems described above, to provide an image processing system capable of simply executing image processing for encryption and decryption without causing a user to perform a time-consuming operation of generating a processing target image.

The present invention adopts the following means in order to solve the problems given above. Namely, an image processing system includes: rendering information input accepting means accepting an input of rendering information for depicting a content of electronic data; digital image generating means generating a digital image defined as an aggregation of pixels on the basis of the rendering information of which the input is accepted by the rendering information input accepting means; definition information acquiring means acquiring definition information containing area designating information for specifying an encrypting target partial area in the digital image generated by the digital image generating means and key information used on the occasion of encrypting the partial area; encrypting means generating an encrypted image into which an image of the partial area is encrypted by converting the image of the partial area specified based on the area designating information on the basis of the key information; and output means outputting the encrypted image corresponding to the content of the electronic data, which is generated by the encrypting means.

Herein, the electronic data connotes data containing some category of information such as a document, a graph and an illustration. The electronic data is generated as an electronic file by, e.g., a document creating application, a spreadsheet application, an illustration creating application, etc. The digital image generating means generates an image on the occasion of displaying or printing the electronic data as a digital image (e.g., bitmap data) defined as the aggregation of pixels by use of the rendering information accepted by the rendering information input accepting means. The "rendering information" is information for designating a character, format information, a layout etc for displaying the electronic data on a display or printing the electronic data on a paper medium. Namely, according to the present invention, even in such a case that the application dealing with the electronic data does not support the output of the image, the image processing such as the encryption using the encryption key and the decryption can be simply executed without causing the user to perform a time-consuming operation of generating the digital image employed in the encryption process.

In the encryption according to the present invention, the encryption can be attained in a way that designates the partial area of the digital image. Herein, according to the present invention, the encrypting target partial area is designated by use of the area designating information. The area designating information contains information for specifying the area on the digital image. The information for specifying the area is exemplified by positional information, size information, vector information and so on.

Further, the present invention is an image processing system including: encrypted image acquiring means acquiring an encrypted image generated by converting at least a part of a digital image defined as an aggregation of pixels on the basis of an encryption key; definition information acquiring means acquiring definition information containing area designating information for specifying a decryption area becoming a decrypting target in the encrypted image and a decryption key used on the occasion of decrypting the partial area; decrypting means generating a digital image into which an image of the decryption area is decrypted by converting the image of the decryption area specified based on the area designating information on the basis of the decryption key; and output means outputting the digital image generated by the decrypting means.

With this configuration, a person holding none of authority of browsing is restricted from browsing important information in a way that encrypts the information desired to be restricted from being browsed, while the original digital image is output through the decryption using the decryption key, thereby enabling the person holding the authority of browsing to be given a permission to browse the information. In the image processing system according to the present invention, the encrypted information is the image, and hence it is feasible to display only the important information in an encrypted status on the display and to browse the information printed on the paper medium and further to restore (decrypt) the encryption area when the necessity arises.

Herein, the encrypting means generates the encrypted image containing an converted image having regularity used for specifying an encrypting position on the occasion of decryption by converting the image of the partial area into a processed image on the basis of the key information and further converting pixel values of the processed image with the regularity, and the decrypting means detects an encrypting position in which pixel values in the decryption area are converted with the regularity, and decrypts the decryption area into the digital image on the basis of the encrypting position and the decryption key. The pixel values are converted with the regularity when in the encryption process, whereby the encrypting position can be detected based on this regularity when in the decryption process, and the highly accurate decryption can be attained.

Moreover, the image processing system according to the present invention may further include definition information retaining means retaining a plurality of predefined pieces of definition information in the way of their being associated with pieces of identifying information for identifying the definition information, wherein the definition information acquiring means may acquire the definition information containing the area designating information and the key information used for generating the encrypted image by the encrypting means or generating the digital image by the decrypting means from the plural pieces of definition information retained by the definition information retaining means on the basis of the identifying information.

With this configuration, the plural pieces of definition information are defined beforehand, whereby the proper piece of definition information can be acquired and used for every image processing of the encryption or the decryption.

Herein, the image processing system according to the present invention may further include designated-by-user content retaining means retaining the identifying information associated with the definition information designated beforehand by a user in the plural pieces of definition information retained by the definition information retaining means, wherein the definition information acquiring means may acquire the definition information associated with the identifying information retained by the designated-by-user content retaining means from the plural pieces of definition information retained by the definition information retaining means.

This configuration enables a large quantity of electronic data to be consecutively encrypted or decrypted without any necessity for selecting the definition information each time the encryption process or the decryption process is executed and for newly setting the area designating information and the key information as well.

Still further, the image processing system according to the present invention may further include identifying information acquiring means acquiring the identifying information from the digital image generated by the digital image generating means or from the encrypted image acquired by the encrypted image acquiring means, wherein the definition information acquiring means may acquire the definition information associated with the identifying information acquired by the identifying information acquiring means from the plural pieces of definition information retained by the definition information retaining means.

The identifying information contained in the digital image or the encrypted image is acquired, and the definition information associated with the identifying information is acquired, thereby eliminating the necessity that the user selects the definition information by judging, from the content of the encrypting or decrypting target image, whether the encryption or the decryption should be conducted or not by use of any one piece of definition information, and enabling the image processing to be done.

Herein, the identifying information acquiring means acquires the identifying information by detecting, from the image, at least any one of, for example, a character, a symbol, a pattern and a color contained in the digital image or the encrypted image. More specifically, the identifying information acquiring means may acquire the identifying information from the barcode, the character string, the symbol, etc in the image.

The present invention adopts the following means in order to solve the problems given above. Namely, the present invention is an electronic data encrypting system comprising: digital image generating means generating a digital image defined as an aggregation of pixels on the basis of electronic data; encryption area designating means designating an encryption target partial area in the digital image generated by the digital image generating means; image converting means converting an image of the partial area designated by the encryption area designating means into a processed image on the basis of an encryption key; pixel value converting means regularly converting pixel values of the processed image converted by the image converting means and thus generating a converted image having regularity used for specifying a position of the partial area when in decryption; and output means outputting the encrypted image containing the converted image processed by the pixel value converting means, wherein the encryption area designating means designates, as the encryption target partial area, the area specified by the area designating information for specifying the area on the digital image.

Herein, the electronic data connotes data containing some categories of information such as a document, a graph and an illustration. According to the present invention, based on the digital image, the encryption area designating means, the image converting means and the pixel value converting means generate and output the encrypted image.

Further, the electronic data encrypting system according to the present invention may further comprise area designating information acquiring means acquiring the area designating information on the basis of information contained in the electronic data.

Herein, the information contained in the electronic data connotes information browsed directly by a user and may be, i.e., the information related directly to the document, the graph, the illustration, etc and may also be the information about the electronic data, i.e., so-called metadata. The area designating information is acquired based on these categories of information, whereby it is feasible to build up the electronic data encrypting system in which the optimum area designating information is automatically selected simply by designating the electronic data.

For example, the electronic data encrypting system according to the present invention may further comprising area designating information retaining means retaining the area designating information in a way that associates the area designating information with identifying information for identifying the area designating information, wherein the area designating information acquiring means may acquire the area designating information associated with the inputted identifying information in the area designating information retained by the area designating information retaining means.

The identifying information is information associated with each of plural types of area designating information in a way that makes the area designating information identifiable, and is information used for designating the area designating information on the occasion of designating the encryption target area.

Moreover, the electronic data encrypting system according to the present invention may further comprise identifying information acquiring means acquiring the identifying information contained in the electronic data, wherein the area designating information acquiring means may acquire the area designating information associated with the identifying information acquired by the identifying information acquiring means in the area designating information retained by the area designating information retaining means.

The identifying information contained in the electronic data is acquired, whereby the electronic data can be associated with the area designating information specifying which area of the digital image generated based on the electronic data should be encrypted.

Further, the electronic data encrypting system according to the present invention may further comprise keyword detecting means comparing a character string in the electronic data with a keyword defined as a predetermined character string and thus detecting the keyword contained in the electronic data, wherein the area designating information acquiring means may acquire the area designating information by generating the area designating information for specifying an area associated with the keyword detected by the keyword detecting means.

It is preferable that the keyword involves using, in addition to the important information itself, character stings (e.g., an [address] and a [name]) to which the important information is described anterior and posterior. This scheme enables auto-encryption of an area in which the important information in the digital image generated based on the electronic data is presumed to be recorded without performing an operation of preparing plural types of area designating information beforehand and selecting the area designating information when in encryption.

Moreover, in the present invention, the area designating information acquiring means may acquire the area designating information for designating a first partial area and a second partial area that are defined as encryption target areas, and the image converting means may convert the first partial area and the second partial area into processed images on the basis of encryption keys different from each other.

Namely, according to the present invention, the different encryption keys are employed for encrypting the different areas, whereby it is possible to perform access control based on the encryption key and to encrypt the electronic data in a way that sets security levels.

Furthermore, the present invention is an electronic data decrypting system comprising: encrypted image acquiring means acquiring an encrypted image on a paper medium by capturing an image of the paper medium; decryption area designating means designating, as a decryption target decryption area, an encryption area in the encrypted image acquired by the encrypted image acquiring means; encrypted position detecting means detecting an encrypted position where pixel values are regularly converted in the decryption area designated by the decryption area designating means; decrypting means decrypting the decryption area into a digital image on the basis of the encrypted position detected by the encrypted position detecting means and a decryption key; and electronic data generating means detecting and specifying characters in the digital image decrypted by the decrypting means, and generating the electronic data containing the characters in the digital image as character information based on character codes, wherein the decryption area designating means designates, as the decryption area, an area specified by the area designating information for specifying the area on the encrypted image.

The characters in the decrypted digital image are detected and specified, and the electronic data containing the characters in the digital image as the character information based on the character codes is generated, thereby restoring the same or similar electronic data as or to the pre-encrypting electronic data. Namely, according to the present invention, the decrypted information can be dealt with as the electronic data, and thus the convenience is improved.

Yet further, the present invention can be grasped as a method executed by a computer or as a program for making the computer function as the respective means. Moreover, the present invention may also be a recording medium recorded with the program that can be read by the computer, other devices, machines, etc. Herein, the recording medium readable by the computer etc connotes a recording medium capable of storing information such as data, programs, etc electrically, magnetically, optically, mechanically or by chemical action, which can be read from the computer and so on.

According to the present invention, it is feasible to provide the image processing system capable of simply executing the image processing for the encryption and the decryption without causing the user to perform the time-consuming operation of generating the processing target image.

BRIEF DESCRIPTION OF THE DRAWINGS

FIG. 4 is a diagram illustrating a structure of a definition information table in the embodiment.

FIG. 14 is a diagram showing a structure of an area designating information table in the embodiment.

FIG. 37 is a diagram showing an example of a positioning maker used for the encrypting process.

FIG. 51 is a diagram showing an outline of the decrypting process in the third mode.

DESCRIPTION OF EMBODIMENTS

An embodiment of the present invention will hereinafter be described with reference to the drawings.

Figure 1:
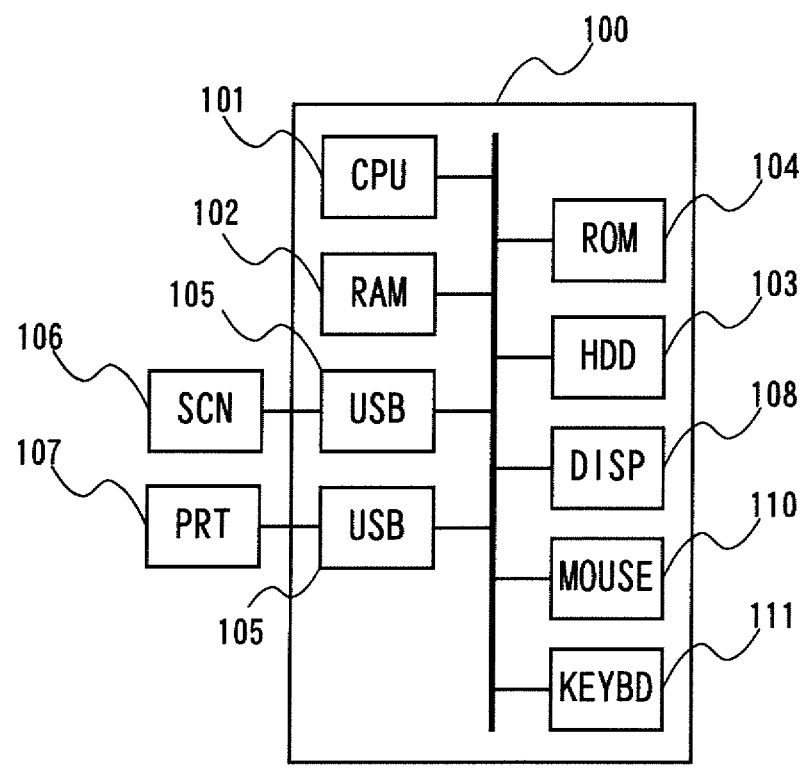
FIG. 1 is a diagram illustrating an outline of a hardware architecture of an image processing system according to an embodiment.

FIG. 1 is a diagram illustrating an outline of a hardware architecture of an image processing system according to the embodiment. An image processing system 900 includes a computer 100, a scanner 106 and a printer 107, wherein the scanner 106 and the printer 107 are connected to the computer 100. Herein, the computer 100 is a computer including a CPU (Central Processing Unit) 101, a main storage device such as a RAM (Random Access Memory) 102, an auxiliary storage device such as a HDD (Hard Disk Drive) 103, a ROM (Read Only Memory) 104, a display device such as a display 108, an input device such as a mouse and a keyboard 111, and a USB (Universal Serial Bus) interface 105 to which the scanner 106 and the printer 107 are connected.

First Embodiment

Figure 2:
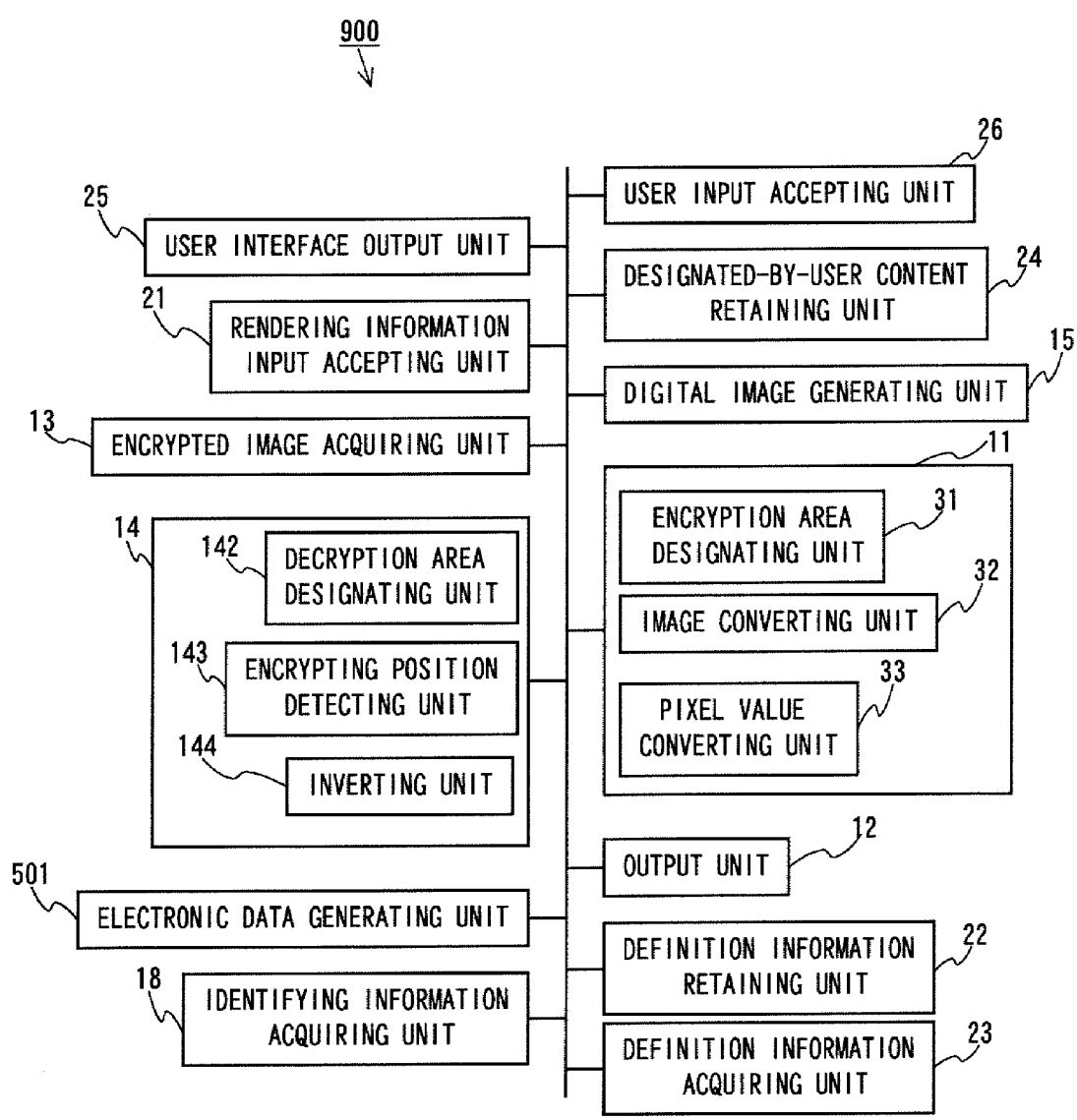
FIG. 2 is a diagram illustrating an outline of a functional configuration of the image processing system according to the embodiment.

FIG. 2 is a diagram illustrating an outline of a functional configuration of the image processing system 900 according to the first embodiment. The CPU 101 executes an image processing program read from the HDD 103 and developed on the RAM 102, whereby the computer system depicted in FIG. 1 functions as the image processing system 900 including: a rendering information input accepting unit 21 that accepts rendering information for printing or displaying, which is inputted from an external application; a digital image generating unit 15 which acquires a digital image based on the accepted rendering information; an encrypting unit 11 which generates an encrypted image in a way that encrypts at least a part of the generated digital image; an output unit 12 which outputs the thus-generated encrypted image; a definition information retaining unit 22 which retains definition information containing information for specifying an area etc that is encrypted by the encrypting unit 11; a definition information acquiring unit 23 acquiring the definition information from the definition information retaining unit 22; a user interface output unit 25 which provides a user with a user interface for getting various items of setting performed by and setting contents checked by the user; a user input accepting unit 26 accepting an input from the user; a designated-by-user content retaining unit 24 retaining information for identifying the definition information specified by the user; and an identifying information acquiring unit 18 which acquires the information for identifying the definition information from the digital image.

The CPU 101 executes, in order to decrypt the encrypted image, the image processing program read from the HDD 103 and developed on the RAM 102, whereby the computer system depicted in FIG. 1 functions as the image processing system 900 further including: an encrypted image acquiring unit 13 which acquires the encrypted image from an electronic file etc; a decrypting unit 14 that decrypts at least part of the acquired digital image and thus generates the already-decrypted digital image; and an electronic data generating unit 501 that generates the electronic data based on the decrypted digital image. Note that the respective function units, for processing the definition information, such as the definition information acquiring unit 23, the definition information retaining unit 22 and the identifying information acquiring unit 18, are also used for a process of decrypting the encrypted image.

It should be noted that the first embodiment has discussed the system according to the present invention as the image processing system including both of the encrypting function and the decrypting function, however, the image processing system according to the present invention may also be embodied as an encryption system including the encrypting function or a decryption system including the decrypting function.

Figure 3:
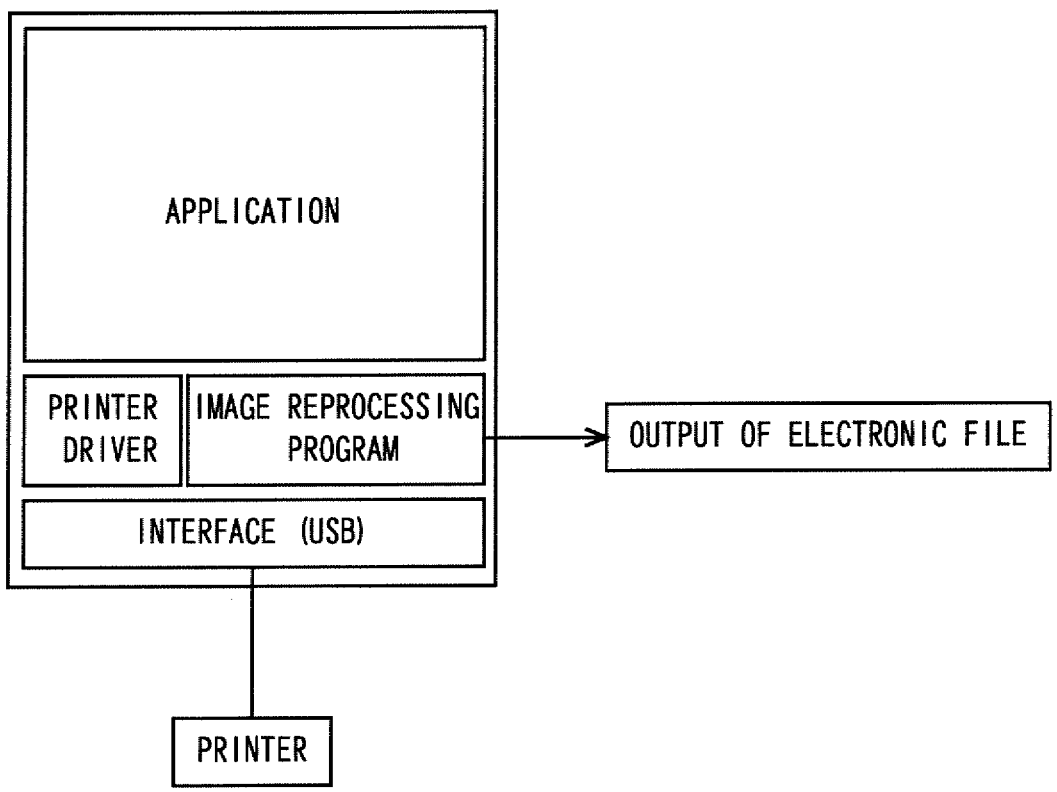
FIG. 3 is a diagram illustrating how an image processing program in the embodiment is located.

FIG. 3 is a diagram illustrating how an image processing program in the first embodiment is located. The image processing program provides a so-called printer driver to various categories of applications. The image processing program is thus implemented on the computer, thereby enabling the encrypted image based on the electronic data to be generated by the same operation as a normal printing process without causing the user to execute any time-consuming process for generating the digital image in a bitmap format as preprocessing to the encryption.

The rendering information input accepting unit 21 accepts rendering information inputted from an application such as a document creating application and a spreadsheet application in which to open some type of electronic data enabled to become the encryption target. The rendering information accepted herein is information used for the print on the paper medium etc and the display on the display 108 etc, and may contain character codes, format information, vector data for rendering, pixel information, and so on.

The digital image generating unit 15 generates the digital image in a pixel format on the basis of the rendering information accepted by the rendering information input accepting unit 21. The digital image generating unit 15 converts an image, in the case of printing the electronic data related to the rendering information onto the paper medium etc or displaying the electronic data on the display 108 etc, into the digital image in a so-called bitmap format. Normally, in the case of document data, the image consists of the character codes and the format information, however, the image, in the case of displaying or printing the document data, is generated as the image in the bitmap format, whereby the encrypting unit 11 can encrypt the image.

The encrypting unit 11 includes an encryption area designating unit 31 that designates an encryption target partial area in the digital image generated by the digital image generating unit 15, an image converting unit 32 that converts an image of the designated partial area into a processed image on the basis of an encryption key, and a pixel value converting unit 33 that generates a converted image having regularity, which is used for specifying a position of the partial area when in decryption, by regularly converting the pixel values of the converted processed image. An in-depth description of the encrypting process by the encrypting unit 11 will be made later on.

The output unit 12 outputs an electronic file containing the information of the encrypted image generated by the encrypting unit 11 to the storage device such as the HDD 103. The output may, however, be an output to the display device such as a monitor and may also be a print output of the printer 107.

The encrypted image acquiring unit 13 acquires the encrypted image from the electronic file designated by the user's operation. Note that the encrypted image acquiring unit 13 may acquire, as the encrypted image, the information on the paper medium by capturing the image of the paper medium in a way that employs a device such as a scanner 106 and a digital camera capable of capturing the image of the paper medium.

The decrypting unit 14 includes a decryption area designating unit (encryption area detecting unit) 142 that designates a decryption target area in the encrypted image acquired by the encrypted image acquiring unit 13, an encrypted position detecting unit 143 that detects an encrypted position in which pixel values are regularly converted in the designated decryption area, and an inverting unit (decrypting unit) 144 that decrypts the decryption area into the digital image on the basis of the detected encrypted position and a decryption key. An in-depth description of the decrypting process by the decrypting unit 14 will be made later on.

The electronic data generating unit 501 detects and specifies characters in the digital image decrypted by the decrypting unit 14 in a way that uses a so-called OCR (Optical Character Recognition) technology, thereby generating the electronic data containing the characters in the digital image as character information based on character codes. The same or very close electronic data as or to the electronic data used for the encryption can be obtained by generating the electronic data from the decrypted digital image. Note that the electronic data to be generated is, it is preferable, the electronic data taking a handle-enabled format in the same application as the application by which the pre-encrypting electronic data is generated. Moreover, the electronic data generating unit 501 can more precisely generate the electronic data close to the pre-encrypting electronic data by detecting and specifying, in addition to the characters, a format, a graph/illustration contained in the digital image, and a layout thereof.

The definition information retaining unit 22 manages, in a definition information table, the definition information containing the area designating information for designating the encryption target partial area with the position information indicating the position on the digital image and the key information (a common key is used as the encryption key and the decryption key in the first embodiment) employed for encrypting/decrypting the partial area in a way that associates the definition information with a unique piece of identifying information.

The identifying information acquiring unit 18 acquires, for identifying the definition information used for the encrypting process or the decrypting process, the identifying information contained in the pre-encrypting digital image or the pre-decrypting encrypted image from one of these images. The identifying information is herein contained in the image as, e.g., a barcode, a character string, a symbol, etc. The identifying information may be, however, contained in the electronic data or the electronic file as metadata. Further, the designated-by-user content retaining unit 24 retains the identifying information associated with the definition information designated by the user in a setting file or a registry etc., thus saving a content designated by the user.

The definition information acquiring unit 23 searches through the definition information table in a way that uses, as search keys, the identifying information acquired from the digital image or the encrypted image by the identifying information acquiring unit 18 and the identifying information retained by the designated-by-user content retaining unit 24, thus acquiring the associated definition information. This scheme enables the encryption or the decryption to be done by using the optimal definition information automatically without causing the user to perform the time-consuming operation such as selecting the appropriate area designating information and inputting the proper key information.

FIG. 4 is a diagram showing a structure of the area designating information table in the first embodiment. In the area designating information table, the items of definition information including: the area designating information containing the positional information specifying the area in the digital image; and the key information (the encryption key/decryption key) used for the encryption/decryption, are recorded in the way of being associated with the unique identifying information. The area designating information is the information containing the positional information etc for specifying the encryption area or the decryption area in the digital image. The information used for specifying the encryption area/decryption area is exemplified such as the positional information specifying the position in the digital image, size information and vector information. The encryption area/decryption area is designated by any one or more of these items of information. For example, the encrypting process, which will be described later on, involves using 3-point positional information in order to designate a rectangular encryption area/decryption area. The positional information can be generally expressed on units such as centimeters, inches and pixels by use of an x-axis and a y-axis orthogonal to the x-axis (see FIG. 3). Further, positions from the edges of the digital image along the x- and y-axis may also be expressed by a rate (%), wherein the unit is a width or a length of the digital image. Another thinkable method is that the numbers are allocated to all the pixels of the digital image (e.g., serial numbers are allocated to the pixels from the left upper pixel down to the right lower pixel), and the position is specified by use of the number.

Further, the position designated as the encryption target partial area by the area designating information corresponds to a position in which to record the encryption target information in the electronic data that has become a basis for generating the digital image. For example, in the document data, if items of individual information such as Social Security Number and an electronic mail address are important information becoming the encryption target information, the area in which to dispose these items of information in the generated digital image is designated by the area designating information. Therefore, the area designating information may be prepared beforehand, as shown in FIG. 4, according to the format of the document data, and may also be generated each time the encryption is done according to a content of the document data.

Figure 5:
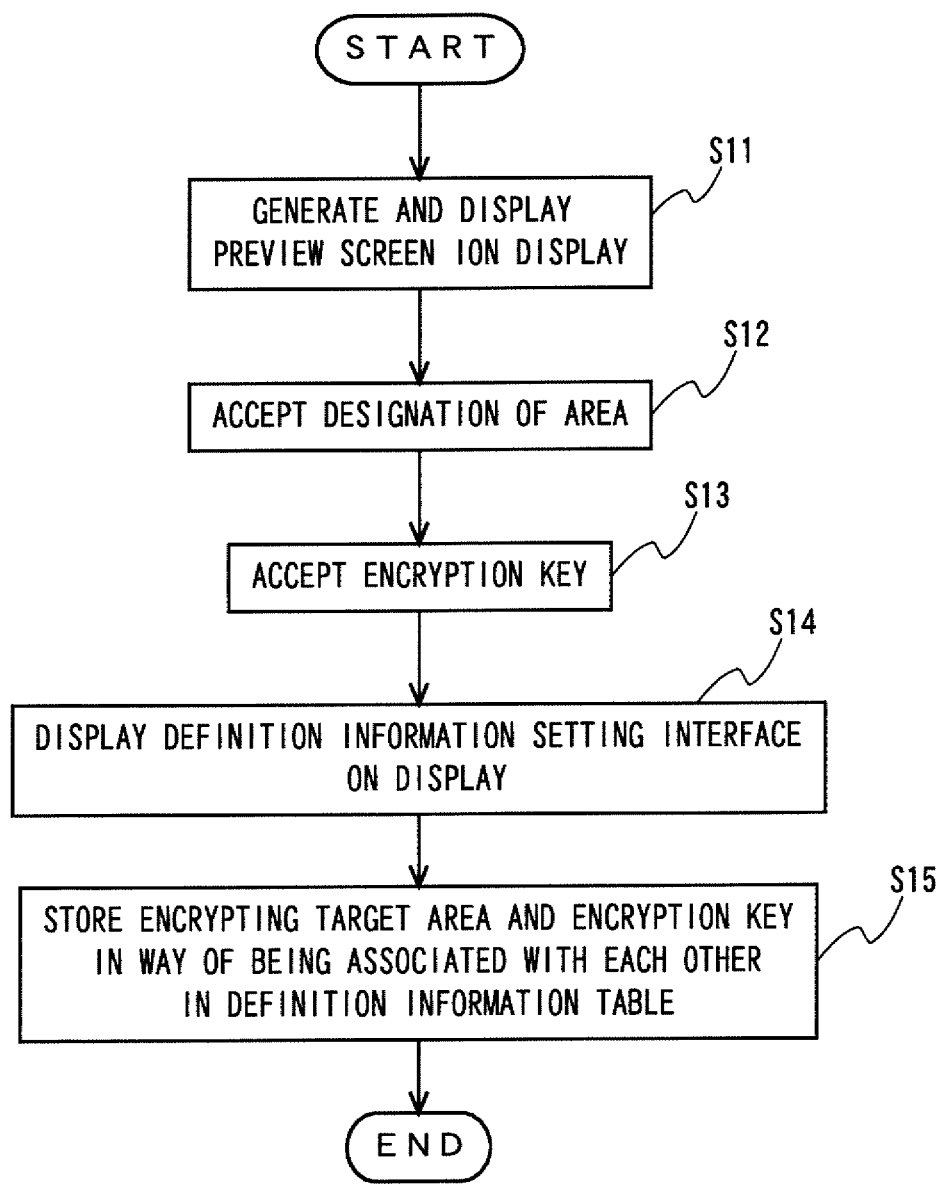
FIG. 5 is a flowchart illustrating a flow of a predefinition process in the embodiment.

FIG. 5 is a flowchart illustrating a flow of predefinition process in the first embodiment. The process illustrated in the present flowchart is a process for creating, before the encrypting process or the decrypting process, the definition information containing the area designating information and the key information employed for the encryption or the decryption and storing the definition information in the definition information table, and execution of this process is triggered by user's performing an operation of giving an instruction of executing the predefinition process. Note that the predefinition process given in the flowchart may be executed upon such an event that an image processing program is selected from a printer list within a print menu opened in the application where some type of electronic data enabled to become the encryption target opens, at which time a start of setting the definition information is hereat indicated.

In step S11 through step S13, a sample digital image etc used for setting the definition information is read and displayed, and the encrypting target area and the encryption key are designated. To begin with, the user interface output unit 25 generates a preview screen 600 including the digital image designated by the user, and displays the screen 600 on the display 108 (step S11).

Figure 6:
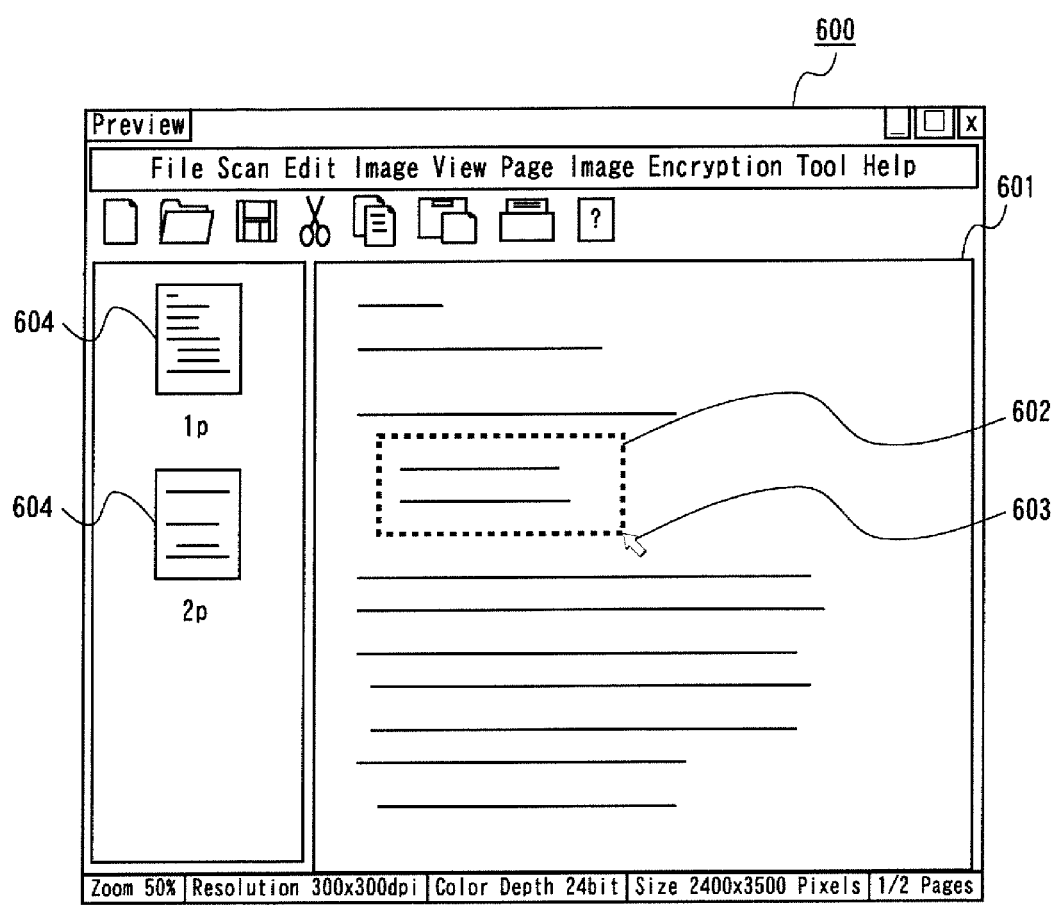
FIG. 6 is a diagram depicting a preview screen of electronic data that is displayed for designating an area in the embodiment.

FIG. 6 is a diagram illustrating the preview screen 600 of the electronic data displayed for designating the area in the first embodiment. A digital image 601 used for the definition of the definition information is displayed on the preview screen 600, and the user input accepting unit 26 accepts designation of the encrypting/decrypting target area through a range designating operation using an input device such as a mouse 110 (step S12). In the first embodiment, a main button of the mouse 110 is kept pressing in a position where a left upper vertex of an encrypting target rectangular area 602 on the digital image 601 displayed on the display 108 is desired to be formed, then a pointer 603 on the display 108 is dragged by manipulating the mouse to a position where a right lower vertex of the rectangular area 602 is desired to be formed, and the main button is released, thus enabling the encrypting target area to be designated. The selection of the area, which is desired to be set as the encrypting target area, may involve using other methods.

When the encrypting target area is designated, the user interface output unit 25 displays a dialog for prompting the user to input the key information on the display 108 (of which the illustration is omitted). Herein, the user input accepting unit 26 inputs a new piece of key information (encryption key/decryption key) to the user or accepts the key information used for encrypting/decrypting the area designated this time by causing the user to select the key information from the pieces of key information hitherto inputted (step S13).

Incidentally, in the area designating information according to the first embodiment, the encrypting target area different on a per-page basis can be, with respect to the electronic data extending over a plurality of pages, set by combining pieces of page number information with pieces of intra-page positional information. Therefore, when the electronic data extends over the plurality of pages, a so-called thumbnail 604 is displayed as a page list, whereby a listing property to the user may be enhanced. Further, in the image processing system 900 according to the first embodiment, in a status where the range is selected on this preview screen 600, a definition information setting interface 700, which will be explained next, can be displayed.

In step S14, the definition information setting interface 700 for adjusting and determining the encrypting target area is displayed. The user interface output unit 25 displays the definition information setting interface 700 on the display 108, which is triggered by an event that the user performs a predetermined operation in a status where the area and the encryption key are designated on the preview screen 600 (step S14).

Figure 7:
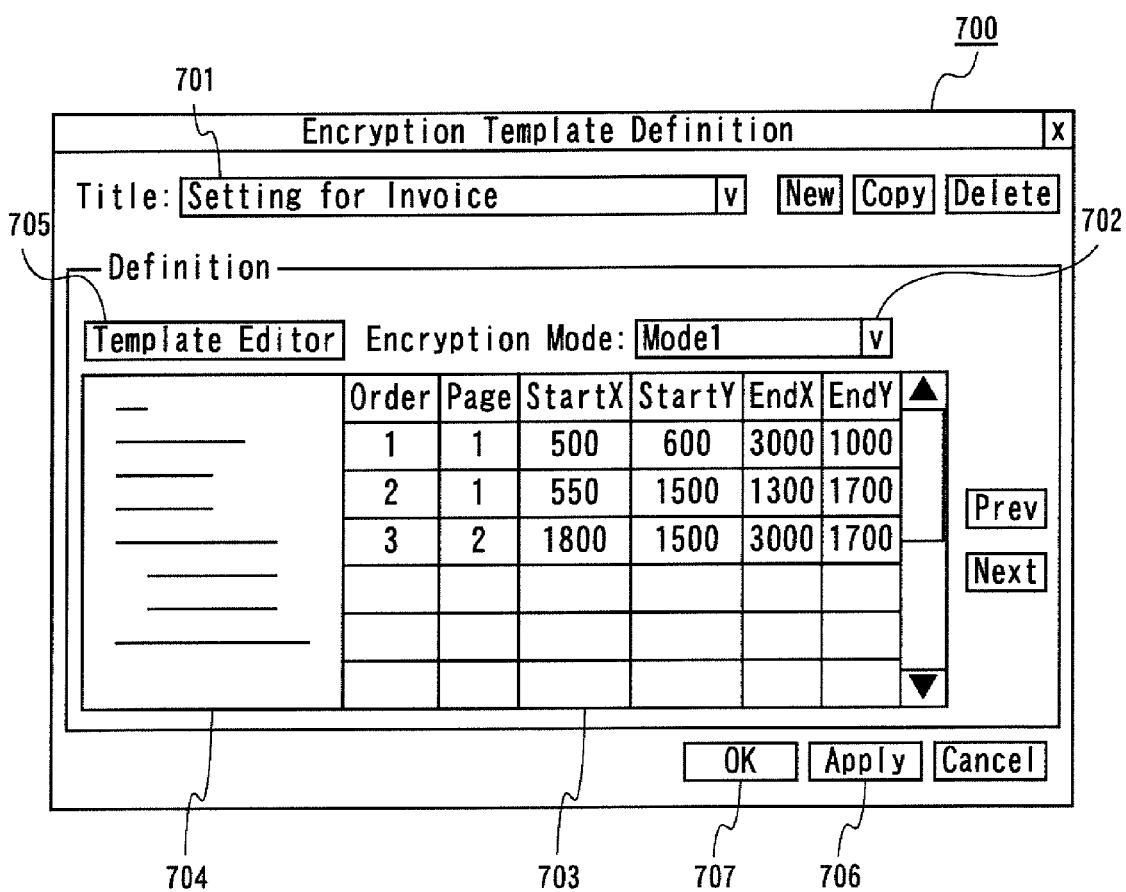
FIG. 7 is a diagram depicting a definition information setting interface displayed on a display for setting the definition information in the embodiment.

FIG. 7 is a diagram illustrating the definition information setting interface 700 displayed on the display 108 in order to set the definition information in the first embodiment. Displayed on the definition information setting interface 700 are: a name input box 701 for inputting a definition information name from which the user identifies the definition information, and a selection menu 702 for selecting an encryption mode, an area designating information display box 703 for displaying a detailed content of the area selected on the preview screen 600 and for adjusting these contents, a preview window 704 in which a reduced image for preview is displayed, a preview screen display button 705 for returning to the preview screen 600, a save button 706 for saving the setting contents in the definition information table, an end button 707 for finishing the predefinition process by saving the setting contents in the definition information table, and so on.

Herein, if necessary for changing the setting contents, e.g., changing the area designating information, the setting contents can be changed by a method such as reselecting the range by selecting the preview screen display button 705 and displaying again the preview screen 600, or alternatively selecting the contents displayed in the area designating information display box 703 and adjusting numeric values. Moreover, if the electronic data defined by the definition information is the electronic data extending over the plurality of pages, the information specifying the encrypting target area on each page is displayed in the area designating information display box 703. Note that a plurality of segments within the single page can be also designated as the encrypting target areas.

In step S15, the designated encrypting target area and the encryption key are stored in the way of being associated with each other in the definition information table (step S15). On this occasion, the definition information retaining unit 22 stores the definition information in the way of being associated with the unique identifying information in the definition information table. Note that the identifying information may be automatically generated by the definition information retaining unit 22 and may also be the definition information name designated by the user. The user checks the setting contents on the definition information setting interface 700, and completes the predefinition process by selecting the save button 706 or the end button 707. Thereafter, the process illustrated in the flowchart is terminated.

Figure 8:
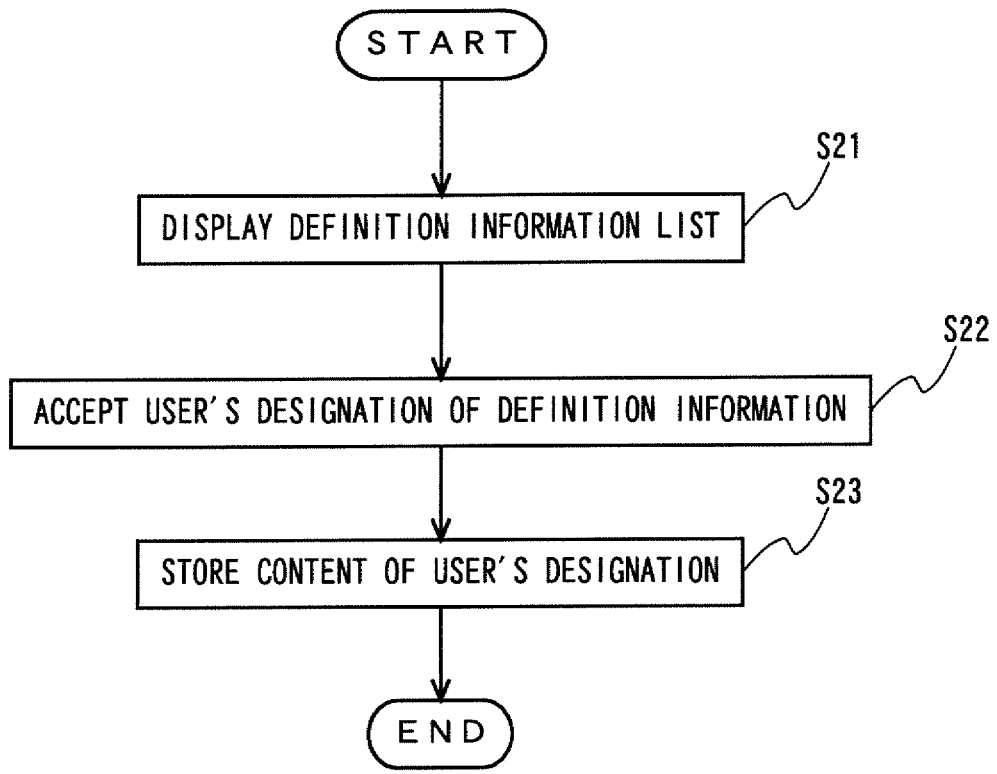
FIG. 8 is a flowchart illustrating a flow of a definition information designating process in the embodiment.

FIG. 8 is a flowchart illustrating a flow of a definition information designation process in the first embodiment. The definition information designation process is a process for previously designating the definition information used for the encryption process or the decryption process from within the plural pieces of definition information in the definition information table. The definition information is designated beforehand in the definition information designation process, thereby enabling the user to encrypt or decrypt a large quantity of electronic data continuously without any necessity of selecting the definition information each time the encryption process or the decryption process is executed and newly setting the area designating information and the key information. The execution of the process illustrated in this flowchart is triggered by such an event that the user performs an operation of designating the definition information. Note that the execution of the process illustrated in this flowchart may also be triggered by selecting the image processing program from the printer list within the print menu, which is opened in the application such as the document creating application and the spreadsheet application where some type of electronic data enabled to become the encryption target opens, and invoking hereat the setting screen (so-called [Property]) of the image processing program.

To start with, the user interface output unit 25 displays, on the display 108, the list of the definition information defined in the predefinition process (see FIG. 5) (step S21). Herein, the definition information list is displayed in a list format and a pull-down menu, thereby enabling the user to select a desired piece of definition information. The user input accepting unit 26 accepts the operation of indicating the desired definition information selected by the user (step S22). Then, the designated-by-user content retaining unit 24 retains the identifying information (see FIG. 4) associated with the definition information on the accepted indicating operation, as the definition information automatically applied in the subsequent encryption or decryption process (step S23). Thereafter, the process given in the flowchart is finished.

In the first embodiment, thus, the predefinition information is preset before the encryption process or the decryption process, and the definition information to be actually used is designated, thereby eliminating the necessity that the user designates the definition information to be applied each time the electronic data is inputted even on such an occasion that plural items of electronic data are consecutively processed. Therefore, on such an occasion as a batchwise process of encrypting or decrypting batchwise a large quantity of fixed electronic data, the time-consuming operation of the user can be remarkably reduced.

Figure 9:
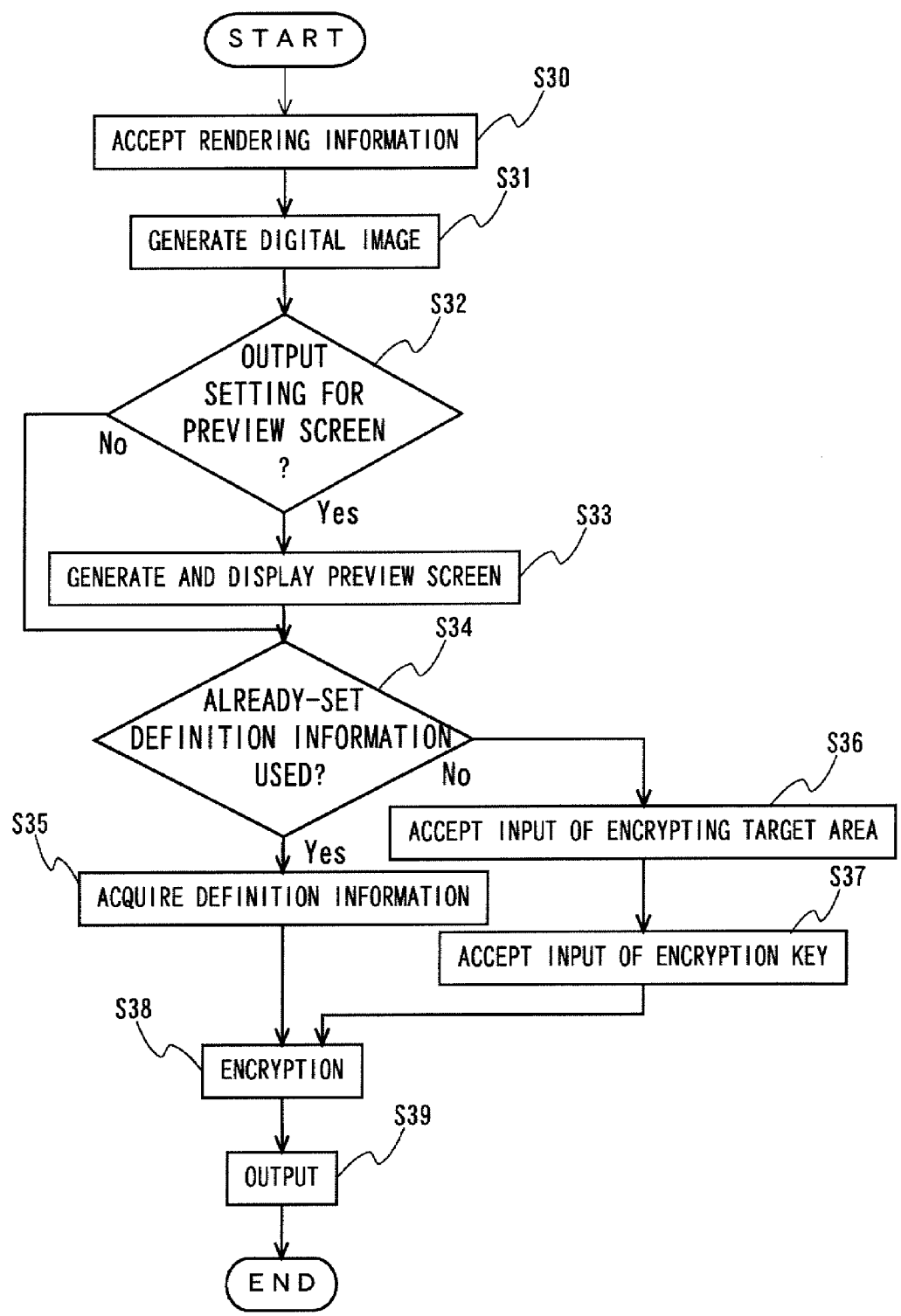
FIG. 9 is a flowchart illustrating a flow of an encryption process in the embodiment.

FIG. 9 is a flowchart illustrating a flow of the encryption process in the first embodiment. The execution of the process illustrated in this flowchart is triggered by such an event that the user invokes the print menu in the application such as the document creating application and the spreadsheet application where some type of electronic data enabled to become the encryption target opens, and gives an output instruction based on the image processing program.

In step S30 and step S31, the rendering information is accepted, and the digital image is generated. The rendering information input accepting unit 21 accepts the rendering information inputted from an external application (step S30), and the digital image generating unit 15 generates the digital image by generating the bitmap data of the print image or the display image on the basis of the accepted rendering information (step S31). Thereafter, the processing proceeds to step S32.

In step S32 and step S33, it is determined whether the preview screen 600 is output or not, and, if set to output the preview screen 600, this preview screen 600 is output. The user interface output unit 25 determines, based on the setting content that has been previously set, whether or not the preview screen 600 depicted in FIG. 6 is output (step S32), and, if the output setting is done, generates and displays, on the display 108, the preview screen 600 based on the rendering information acquired in step S31 in order to get the content of the processing target electronic data and the encrypting target area checked by the user (step S33). Whereas if not set to output the preview screen 600, the processing proceeds to step S35.

In step S34, it is determined whether the definition information retained in the definition information table is used or not. The definition information acquiring unit 23 determines, by referring to the setting content related to the image processing program or inquiring of the user, whether the definition information is read from the definition information table and then used or the area designation and the key information newly inputted by the user are used in the subsequent encryption process. If determined to use the definition information retained in the definition information table, the processing proceeds to step S35. In the case of using the area designation and the key information newly inputted by the user without employing the definition information in the definition information table, the processing proceeds to step S36.

In step S35, the definition information used for the encryption is read. The definition information acquiring unit 23 reads, from the definition information table, the definition information containing the area designating information and the encryption key used for the encryption. Herein, the definition information acquiring unit 23, if the designated-byuser content retaining unit 24 previously retains the identifying information specifying the definition information designated beforehand in the definition information designating process (see FIG. 8) etc, acquires the definition information specified by the identifying information from the definition information table. Whereas if not designated beforehand, the identifying information acquiring unit 18 acquires the identifying information contained in the digital image by means of the barcode recognition, the OCR, etc. Then, the definition information acquiring unit 23 reads the definition information specified by the identifying information acquired by the identifying information acquiring unit 18. The identifying information can be contained in the digital image in the format such as the barcode and the character string. With this scheme, the encryption can be performed without the user's selecting the proper definition information on the basis of the contents of the electronic file and of the paper medium. Note that in the first embodiment, the identifying information contained as the image (the image visible when printed or displayed) in the digital image is acquired by means of the barcode recognition, the OCR, etc, however, the identifying information may also be contained in the electronic file as data (so-called metadata) that is not normally displayed when depicted.

With this contrivance, the user's time-consuming operation of designating the definition information is omitted, and the operating efficiency can be improved. Especially in the case of encrypting batchwise documents taking plural patterns of fixed formats, pieces of identifying information corresponding to the fixed formats are included in templates of the fixed formats, whereby the encryption can be done in an extremely simple manner. Incidentally, in the decryption process also which will be described later on, the identifying information is acquired, and the definition information associated therewith may also be obtained.

Moreover, if unable to acquire the identifying information retained in the designated-by-user content retaining unit 24 and the identifying information contained in the digital image and if the definition information used in the encryption process is not yet determined, an available scheme may be such that a definition information selecting screen is displayed, and the user is prompted to select the definition information (see FIG. 8). Thereafter, the processing proceeds to step S38.

In step S36 and step S37, inputs of the encrypting target area and the encryption key are accepted. If determined not to use the definition information retained in the definition information table in step S34, the user input accepting unit 26 accepts the input of the encrypting target area based on user's manipulating the mouse etc on the preview screen 600 (step S36), and further accepts the input of the encryption key employed for encrypting the inputted encrypting target area (step S37). A flow of the process of accepting the inputs of the encrypting target area and the encryption key is substantially the same as the flow of the predefinition process explained in FIG. 5. The encrypting target area and the encryption key inputted herein may be stored as the definition information in the definition information table. Moreover, the encrypting target area and the encryption key may be, on the occasion of their being stored as the definition information, automatically stored, and another available scheme is to receive the user's judgment through a checkbox in which to designate storability and a dialog for inquiring of the user about the storability. Thereafter, the processing proceeds to step S38.

In step S38, the encryption is carried out. The encrypting unit 11 generates the encrypted image by encrypting the area of the digital image that is designated by the area designating information read in step S35 or the encrypting target area of the digital image that is inputted in step S36 on the basis of the encryption key read in step S35 or the encryption key inputted in step S37. An in-depth description of the encryption process will be made later on. Thereafter, the processing proceeds to step S39.

In step S39, the encrypted image is output. The output unit 12 outputs the electronic file containing the information of the encrypted image generated in step S38 to the storage device such as the HDD 103. Note that the encrypted image may be printed (output) on the paper medium by use of the printer 107. Thereafter, the process given in the flowchart is terminated.

According to the first embodiment, a part of the image based on the electronic data is encrypted, thereby enabling permission of browsing other items of information while restricting the important information from being browsed. Namely, in an operation etc of dealing with the electronic data which partially contains the important information such as the individual information, only the area containing the description of the individual information etc is encrypted, while the information needed for the operation is not encrypted, whereby the operation using the document containing the important information such as the individual information can be performed without causing leakage of the information.

Note that the barcode and the OCR-readable information may be added to the encrypted image to be output. Herein, the barcode and the OCR-readable information added to the encrypted image are the information containing the information enabling the definition information to be identified, which is used in the encryption process. The information to be added contains, e.g., the unique identifying information (see FIG. 4) for identifying the definition information stored in the definition information table. The encrypted information can be thereby decrypted with no such time-consuming operation that the user judges, from the electronic file or the content of the paper medium on which this electronic file is printed, which definition information the encryption process is executed by use of.

Figure 10:
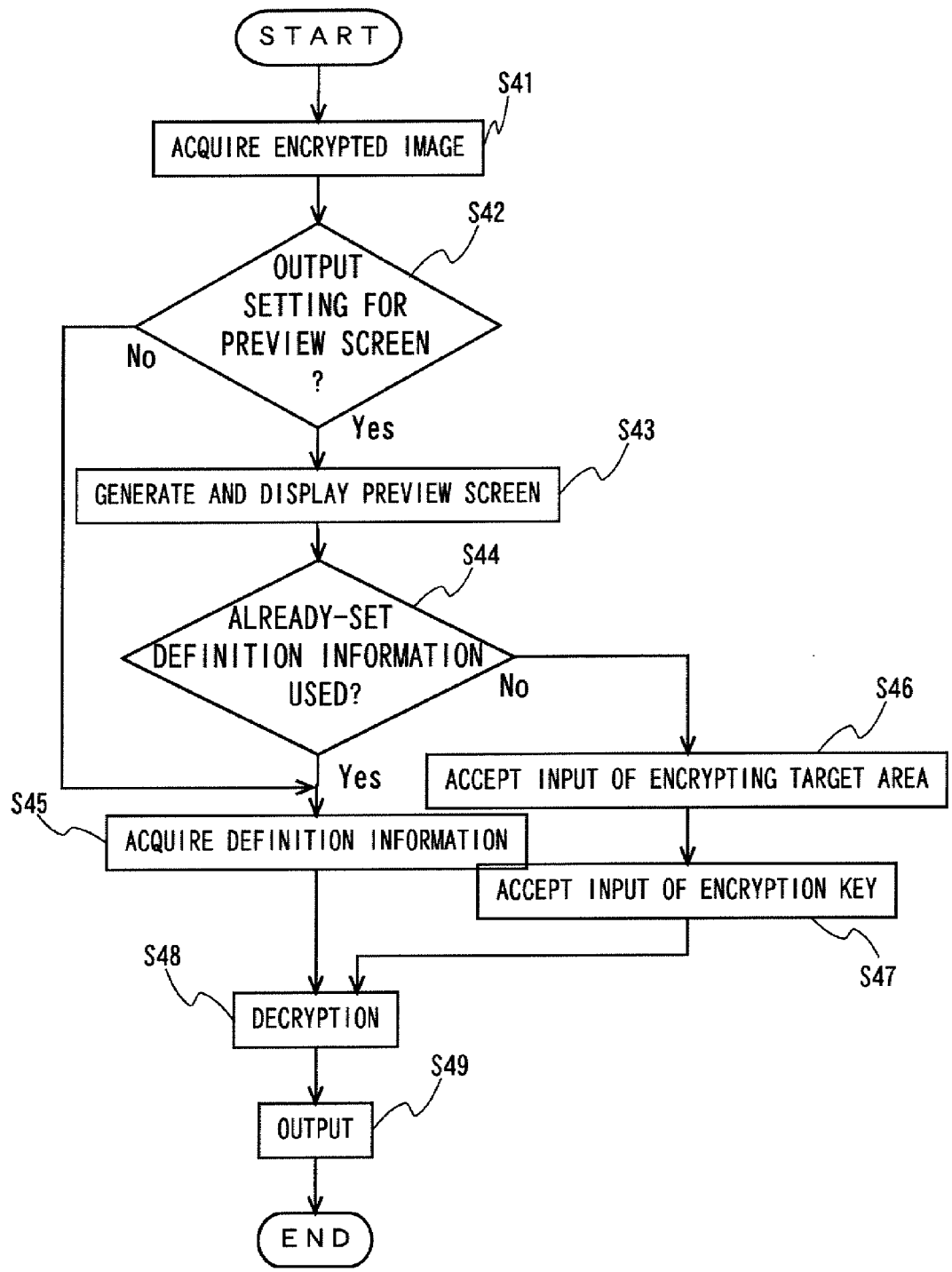
FIG. 10 is a flowchart illustrating a flow of a decryption process in the embodiment.

FIG. 10 is a flowchart illustrating a flow of the decryption process in the first embodiment. A start of the process given in the flowchart is triggered by such an event that user performs an operation of indicating a start of decrypting the electronic file containing the information of the encrypted image generated in the process etc depicted in FIG. 9.

In step S41, the encrypted image is acquired. The user conducts the operation of designating the electronic file containing the encrypted image generated in the process etc illustrated in FIG. 9. The encrypted image acquiring unit 13 develops the designated electronic file on the RAM 102, thereby acquiring the encrypted image. Incidentally, the encrypted image may be acquired not from the electronic file but from the paper medium on which the encrypted image is recorded. In this case, the user, after setting the paper medium recorded with the want-to-decrypt encrypted information on the scanner 106, performs the operation of indicating the start of the acquisition via the interface of the computer 100. Then, the encrypted image acquiring unit 13 accepting the input of the indication captures an image of the paper medium by controlling the scanner 106 and converts a result of the captured image into the encrypted image, thus acquiring the encrypted image. Thereafter, the processing proceeds to step S42.

In step S42 and step S43, it is determined whether a preview screen 600b used for the user to check the content of the processing target encrypted image and the decrypting target area is output or not, and, if it is set to output the preview screen 600b, the preview screen 600b is output. The details of the process are the same as step S32 and step S33 illustrated in FIG. 9, and hence the description thereof is omitted. Whereas if it is not set to output the preview screen 600b, the processing proceeds to step S45.

Figure 11:
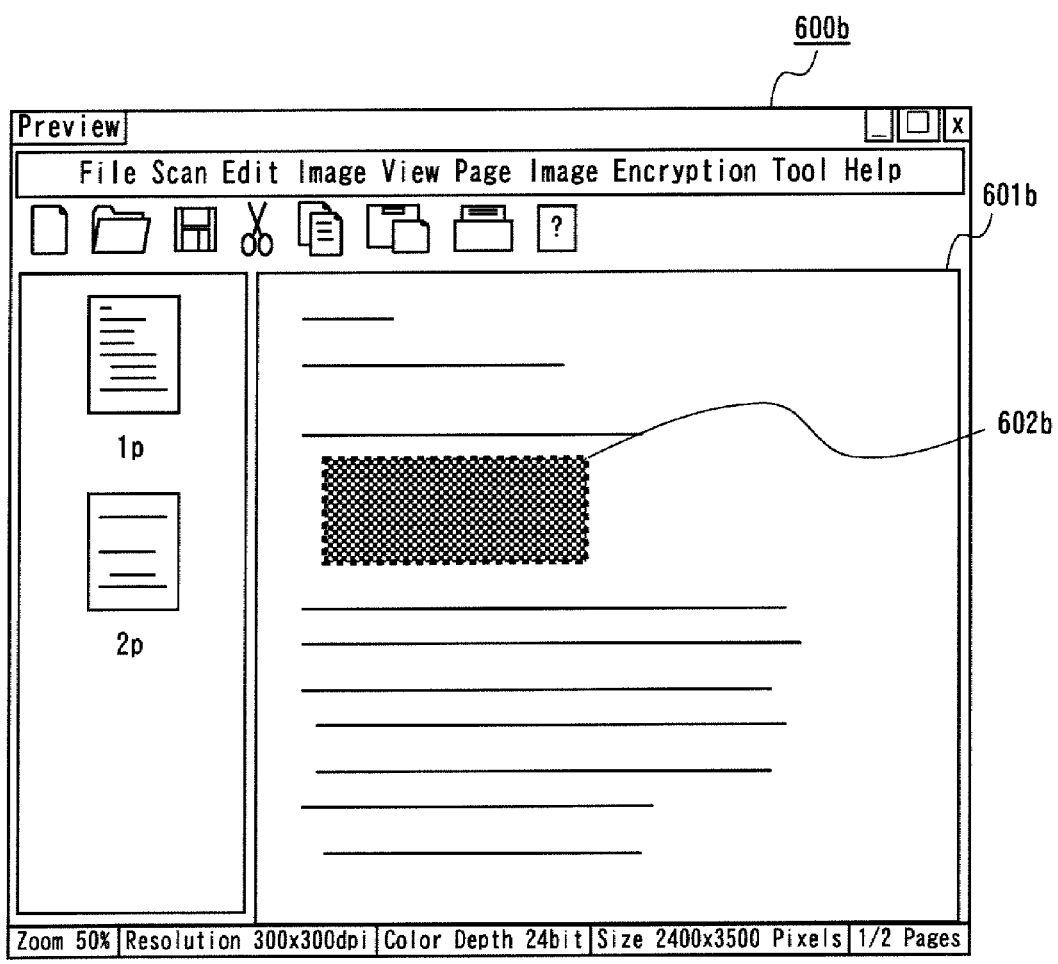
FIG. 11 is a diagram depicting a preview screen of an encrypted image that is displayed for designating a decryption area in the embodiment.

FIG. 11 is a diagram illustrating the preview screen 600b of the encrypted image displayed for designating a decryption area in the first embodiment. A decrypting target encrypted image 601b is displayed on the preview screen 600b, and the user can simply designate a decrypting target area 602b in a way that designates the range by use of the input device such as the mouse 110. A specific area designating method is substantially the same as the encrypting target area designating method, and hence its description is omitted.

In step S44, it is determined whether the definition information retained in the definition information table is used or not. Details of the process are substantially the same as step S34 in the encryption process, and therefore its explanation is omitted. If determined to use the definition information retained in the definition information, the processing proceeds to step S35. In the case of employing the area designation and the key information that are newly inputted from the user without using the definition information in the definition information table, the processing proceeds to step S36.

In step S45, the definition information used for the decryption is read. The definition information acquiring unit 23 reads, from the definition information table, the definition information containing the area designating information and the decryption key that are employed for the decryption. A method of acquiring the definition information from the definition information table is exemplified by a method based on a scheme of making none of the pre-designation retained in the designated-by-user content retaining unit 24, a method of acquiring the identifying information contained in the encrypted image, a method of displaying a selection screen and getting the user to make a selection, etc, and, since the details of the process are substantially the same as those of the encryption process, the description thereof is omitted. Thereafter, the processing proceeds to step S48.

In step S46 and step S47, inputs of the decrypting target area and the decryption key are accepted. The user input accepting unit 26 accepts the input of the decrypting target area based on the user's manipulating the mouse etc on the preview screen 600b (step S46), and further accepts the input of the decryption key employed for decrypting the inputted decrypting target area (step S47). A flow of the process of accepting the inputs of the decrypting target area and the decryption key is substantially the same as the flow of the predefinition process explained in FIG. 5. On this occasion, the input contents may be stored as the definition information in the definition information table in the same way as in the encryption process. Thereafter, the processing proceeds to step S48.

The decrypting target area may, however, be automatically selected. The decrypting unit 14 can detect the decrypting target area in the encrypted image and can specify the position thereof on the basis of the regularity, exhibited by the image in the decryption area, with which the pixel values are regularly converted on the occasion of the encryption process and a marker etc added for specifying the position in the decryption area.

In step S48 and step S49, the decryption is carried out, and the decrypted digital image is output. The decrypting unit 14 decrypts the area, of the encrypted image, designated by the area designating information read in step S45 or decrypts the decrypting target area inputted in step S46 on the basis of the decryption key read in step S45 or the decryption key inputted in step S47, thereby generating the thus-decrypted digital image (step S48). An in-depth description of the decryption process will be made later on. Then, the output unit 12 outputs the electronic file containing the information of the digital image generated in step S48 to the storage device such as the HDD 103 (step S49). Thereafter, the process given in the flowchart is finished.

Incidentally, in the process illustrated in the flowchart, the process is terminated by outputting the electronic file containing the information of the decrypted digital image, however, the electronic data serving as a basis of the rendering information inputted from the application on the occasion of the encryption process or the data approximate to the electronic data, may also be restored by using the OCR etc. The electronic data generating unit 501 detects and specifies the characters in the digital image generated in step S48, thereby generating the electronic data containing the characters in the digital image as the character information based on the character codes. It is feasible to deal with the decrypted information as the electronic data by restoring the pre-encrypting electronic data, resulting in improvement of convenience.

It should be noted that the image processing system according to the present invention may be carried out as an electronic data encryption system or an electronic data decryption system. The following is a description of an embodiment in the case of carrying out the image processing system as the electronic data encryption system or the electronic data decryption system. A hardware architecture of the electronic data encryption system or the electronic data decryption system in the embodiment discussed below is substantially the same as the hardware architecture of the image processing system depicted in FIG. 1.

Second Embodiment

Figure 12:
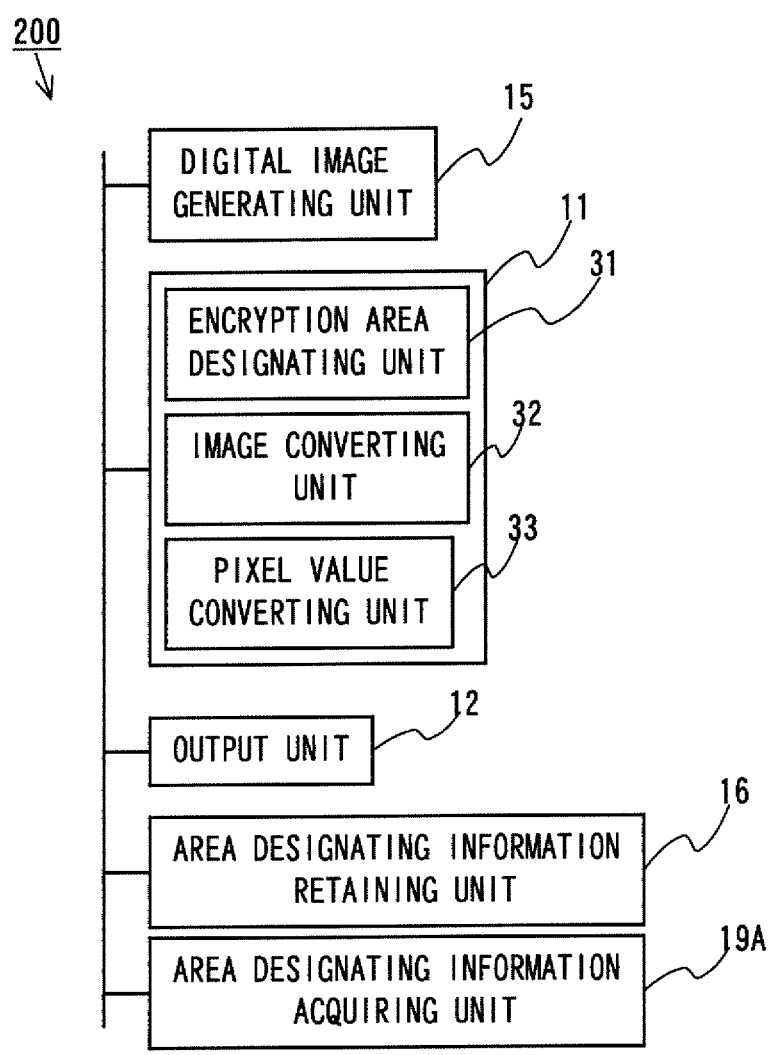
FIG. 12 is a diagram illustrating an outline of a functional configuration of the electronic data encrypting system according to the embodiment.

FIG. 12 is a diagram showing an outline of a functional configuration of the electronic data encrypting system 200 according to the second embodiment. The CPU 101 executes an electronic data encrypting program read from the HDD 103 and developed on the RAM 102, whereby the electronic data encrypting system 200 functions as a digital image generating unit 15 that captures an image of a paper medium and thus acquires a digital image, an encrypting unit 11 that generates an encrypted image by encrypting at least part of the generated digital image, an output unit 12 that outputs the thus-generated encrypted image, an area designating information retaining unit 16 that retains information for designating an area to be encrypted by the encrypting unit 11, and an area designating information acquiring unit 19A that displays options to a user and accepting an input of the selected result.

The digital image generating unit 15 generates, based on the electronic data, the digital image in a pixel format. The digital image generating unit 15 converts an image, in the case of printing or displaying the selected electronic data, into the digital image in a so-called bitmap format. Normally, in the case of document data, the image consists of character codes and format information, however, the image, in the case of displaying or printing the document data, is generated as the image in the bitmap format, whereby the encrypting unit 11 can encrypt the image.

The area designating information retaining unit 16 retains area designating information containing positional information that specifies a position on the digital image, as the area designating information for designating the encryption target partial area. Plural items of area designating information are managed in the form of area designating information table in a way that associates the area designating information with unique identifying information.

Figure 13:
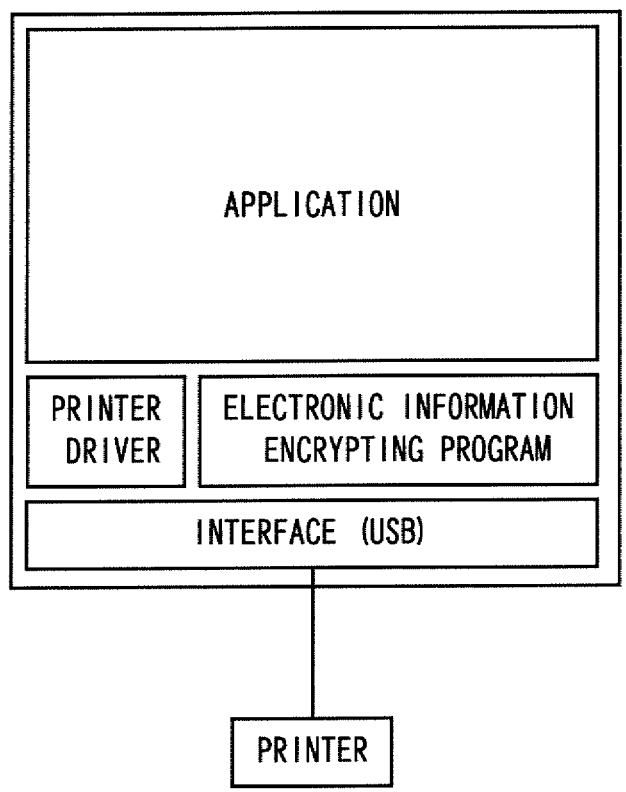
FIG. 13 is a diagram showing how an electronic data encrypting program in the embodiment is located.

FIG. 13 is a diagram showing how an electronic data encrypting program in the second embodiment is located. The electronic data encrypting program provides a so-called printer driver to various categories of applications. The electronic data encrypting program is thus implemented on the computer, thereby enabling the user to easily encrypt a printed matter based on the electronic data by the same operation as a normal printing process.

FIG. 14 is a diagram showing a structure of the area designating information table in the second embodiment. In the area designating information table, the items of area designating information containing the positional information specifying the area in the digital image are recorded in the way of being associated with the unique identifying information. The area designating information is substantially the same as the area designating information described in the first embodiment, and hence its description is omitted.

Further, the position designated as the encryption target partial area by the area designating information corresponds to a position in which to record the encryption target information in the electronic data that has become a basis for generating the digital image. For example, in the document data, if an [important item description field] describes the encryption target important information, an area in which to allocate the [important item description field] in the generated digital image is designated by the area designating information. Therefore, the area designating information may be prepared beforehand, as shown in FIG. 14, according to the format of the document data, and may also be generated each time the encryption is done according to a content of the document data. A process of generating the area designating information each time the encryption is conducted will be described in a third embodiment.

Figure 15:
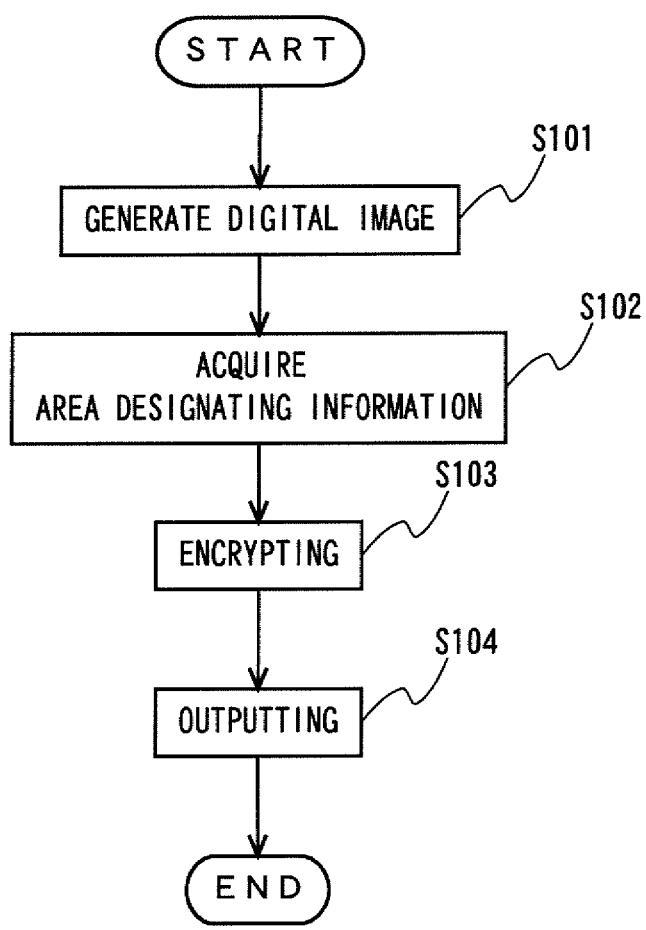
FIG. 15 is a flowchart showing a flow of encrypting the electronic data in the embodiment.

FIG. 15 is a flowchart showing a flow of encrypting the electronic data in the second embodiment. A start of the process shown in the present flowchart is triggered by reading the electronic data encrypting program from the HDD 103 and developing the program on the RAM 102 and executing the program by the CPU 101 on the basis of user's operations.

In step 5101, the digital image is generated. The user, in a status of using a document generating application etc, selects the electronic data encrypting program as a print output destination from an application menu, and gives a print start instruction. The digital image generating unit 15 acquires the electronic data from the application etc, and generates bitmap data of the print image or the display image, thereby generating the digital image. Thereafter, the processing proceeds to step S102.

In step S102, the area designating information is designated. The area designating information acquiring unit 19A displays, on a display (of which an illustration is omitted), an interface for reading candidates for the area designating information from the area designating information retaining unit 16 and prompting the user to select the area designating information on the basis of the readout candidate of the area designating information. The area designating information acquiring unit 19A accepts an input of the user's selection, and specifies the area designating information selected by the user. Thereafter, the processing proceeds to step S103.

In step S103, the encryption is carried out. The encrypting unit 11 encrypts the area of the digital image, which is designated by the area designating information specified in step S102, thereby generating the encrypted image. Details of the encrypting process will be described later on. Thereafter, the processing proceeds to step S104.

In step S104, the encrypted image is output. The CPU 101 executes the electronic data encrypting program, whereby the computer 100 prints (outputs) the encrypted image generated in step S103 onto the paper medium by use of the printer 107. Thereafter, the process shown in the present flowchart is terminated.

Figure 16:
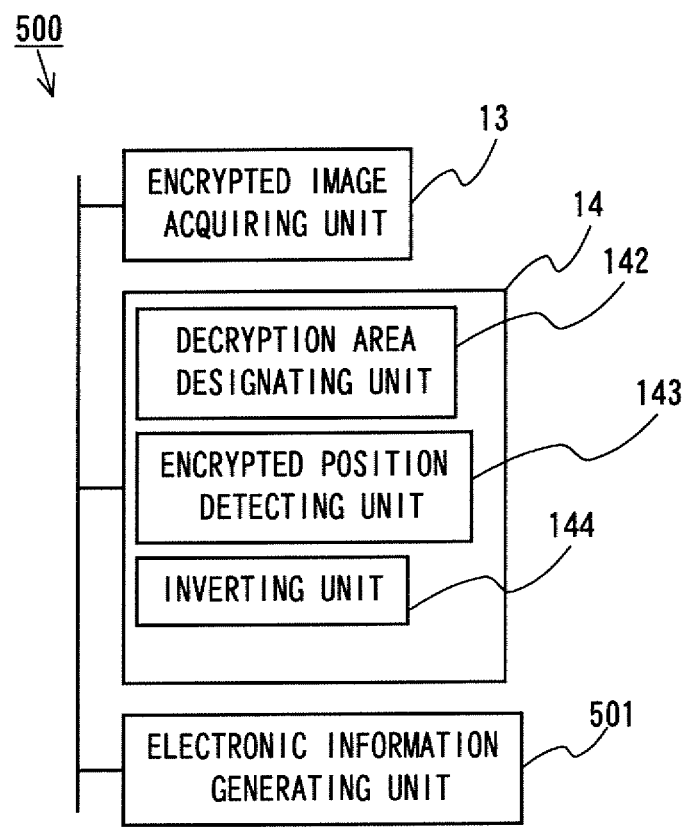
FIG. 16 is a diagram illustrating an outline of a functional configuration of an electronic data decrypting system according to the embodiment.

FIG. 16 is a diagram illustrating an outline of the functional configuration of an electronic data decrypting system 500 according to the second embodiment. The CPU 101 executes an electronic data decrypting program read from the HDD 103 and developed on the RAM 102, whereby the electronic data decrypting system 500 functions as an encrypted image acquiring unit 13 that captures an image of the paper medium and thus acquires the encrypted image on the paper medium, a decrypting unit 14 that decrypts at least part of the acquired digital image and thus generates the already-decrypted digital image, and an electronic data generating unit 501 that generates the electronic data based on the decrypted digital image.

The encrypted image acquiring unit 13 acquires, as the encrypted image, the information on the paper medium by capturing the image of the paper medium. In the second embodiment, the scanner 106 and the computer 100 executing the scanner driver correspond to the encrypted image acquiring unit 13. The encrypted image may, however, be acquired by employing a device such as a digital camera capable of capturing images of other types of paper mediums.

Figure 17:
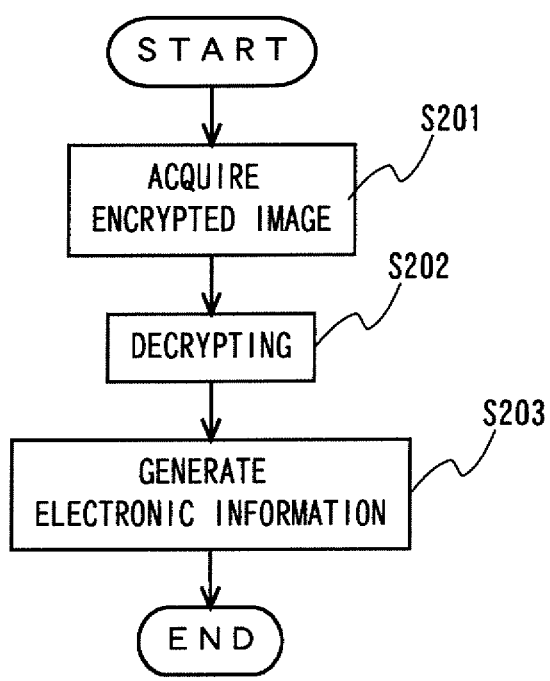
FIG. 17 is a flowchart showing a flow of an electronic data decrypting process in the embodiment.

FIG. 17 is a flowchart showing a flow of the electronic data decrypting process in the second embodiment. A start of the process shown in the present flowchart is triggered by reading an electronic data decrypting program from the HDD 103 and developing the program on the RAM 102 and executing the program by the CPU 101 on the basis of user's operations.

In step S201, the encrypted image is acquired. The user gives an acquisition start instruction via an interface of the computer 100 after setting the paper medium recorded with want-to-decrypt encrypted information on the scanner 106. The encrypted image acquiring unit 13 accepting an input of the instruction controls the scanner 106 to image the paper medium, and converts the imaged result into the encrypted image, thus acquiring the encrypted image. Thereafter, the processing proceeds to step S202.

In step S202, the decryption is conducted. The decrypting unit 14 detects the encryption area in the encrypted image and decrypts the detected area, thereby generating the decrypted digital image. Details of the decrypting process will be explained later on. Thereafter, the processing proceeds to step S203.

In step S203, the electronic data is generated. The electronic data generating unit 501 detects and specifies characters in the digital image generated in step S202 and thus generates the electronic data containing the characters in the digital image as the character information based on the character codes. Thereafter, the process shown in the present flowchart is finished.

Thus, in the decrypting process, the encryption area is automatically detected, and the detected area is decrypted, thereby enabling only the user who knows the decryption key to browse the information described in the encryption area. The same area information selecting interface as in the encrypting process may, however, be displayed, and the decryption area may also be determined based on the area information selected by the user. Decryption accuracy can be improved by applying the auto-detecting process of the decryption area to the area detected by the user. Further, the decrypted digital image is analyzed, and the pre-encrypting electronic data is restored, whereby the decrypted information can be treated as the electronic data, and the convenience is improved.

According to the second embodiment, the important information can be prevented from being leaked out without losing any convenience of the paper medium. Further, the image is output to the paper medium, and consequently it is feasible to obtain such an effect that, if copied by use of a coping machine etc, the encrypted image gets deteriorated, and the decryption is disabled if copied repeatedly. This effect enables prevention of the important documents from being easily copied by the copying machine and of the important information from leaking out. Further, a possible scheme is that the paper medium on which the encrypted image is printed involves using a special paper medium (so-called copy forgery preventive paper) in which a character image [Copy] etc appears when copied by the copying machine etc, or such a latent character image is printed simultaneously with printing the encrypted image, thereby restraining an easy copy and disabling the decryption from the copy due to noises being embedded in the encrypted image by an overlap of the sensitized character image.

It is to be noted that the second embodiment has described the encrypting system 200 and the decrypting system 500 as the different systems, however, the present invention may be realized as an electronic data encrypting/decrypting system including both of the encrypting function and the decrypting function. This mode is the same with second and fourth embodiments which will hereinafter be discussed.

Third Embodiment

Figure 18:
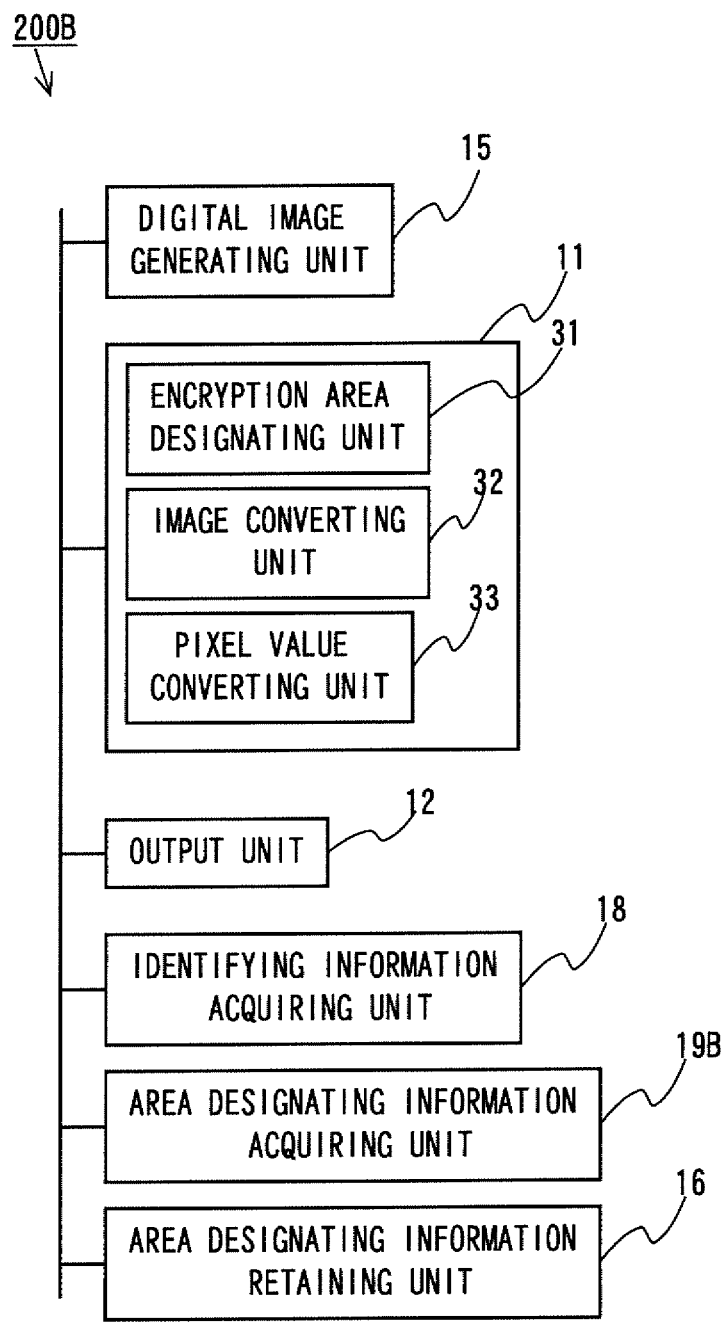
FIG. 18 is a diagram illustrating an outline of a functional configuration of the electronic data encrypting system according to the embodiment.

FIG. 18 is a diagram illustrating an outline of a functional configuration of an electronic data encrypting system 200B according to a third embodiment. The electronic data encrypting system 200B according to the third embodiment includes, in the same way as in the second embodiment, the digital image generating unit 15, the encrypting unit 11, the output unit 12 and the area designating information retaining unit 16, and further includes an identifying information acquiring unit 18 that acquires identifying information recorded on the paper medium, and an area designating information acquiring unit 19B that acquires an associated piece of area designating information on the basis of the acquired identifying information.

Figure 19:
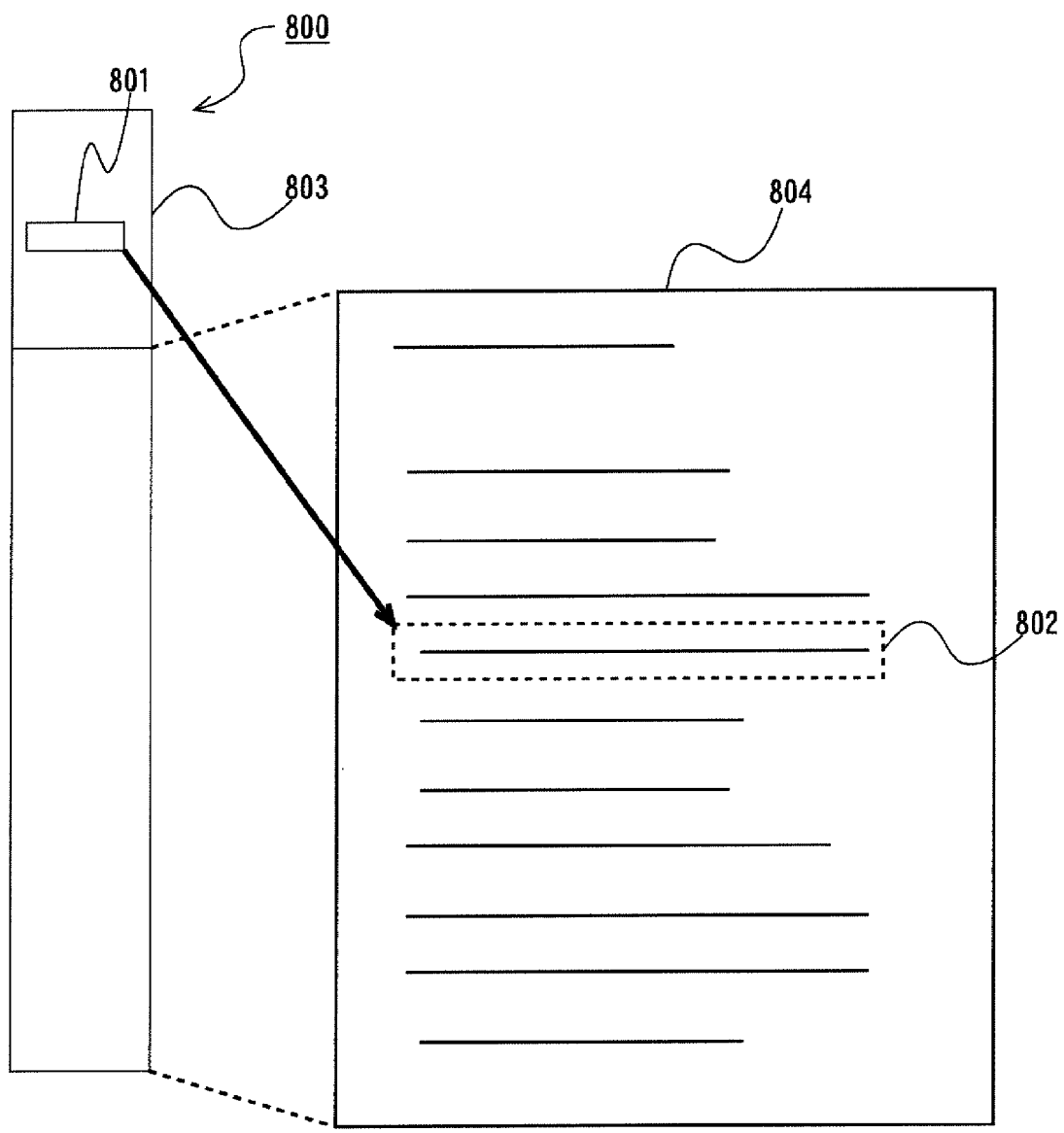
FIG. 19 is a diagram showing an example of electronic data in which identifying information is contained together with encryption target information in metadata.

The identifying information acquiring unit 18 acquires the identifying information contained in the electronic data (electronic file) becoming a basis of the digital image in order to identify the area designating information for encrypting the digital image. The identifying information is contained as metadata (file header) of the electronic file in the electronic data. FIG. 19 is a diagram showing an example of electronic data 800 in which identifying information 801 is contained together with the encryption target information in metadata 803. The identifying information 801 is, in the electronic data 800 containing this identifying information 801, associated with the area designating information for designating a partial area 802 of a digital image 804 generated based on the electronic data 800.

The area designating information acquiring unit 19B searches for the area designating information retained in the area designating information retaining unit in a way that uses, as a key, the identifying information acquired by the identifying information acquiring unit 18, and thus acquires the area designating information associated with the identifying information. Namely, the scheme of previously retaining, in the electronic data, the identifying information of the area designating information for designating the should-be-encryption area in the electronic data as the metadata, enables the optimum area designating information to be selected automatically without any time-consuming operation of prompting the user to select a proper item of area designating information and the should-be-encryption area to be encrypted.

Figure 20:
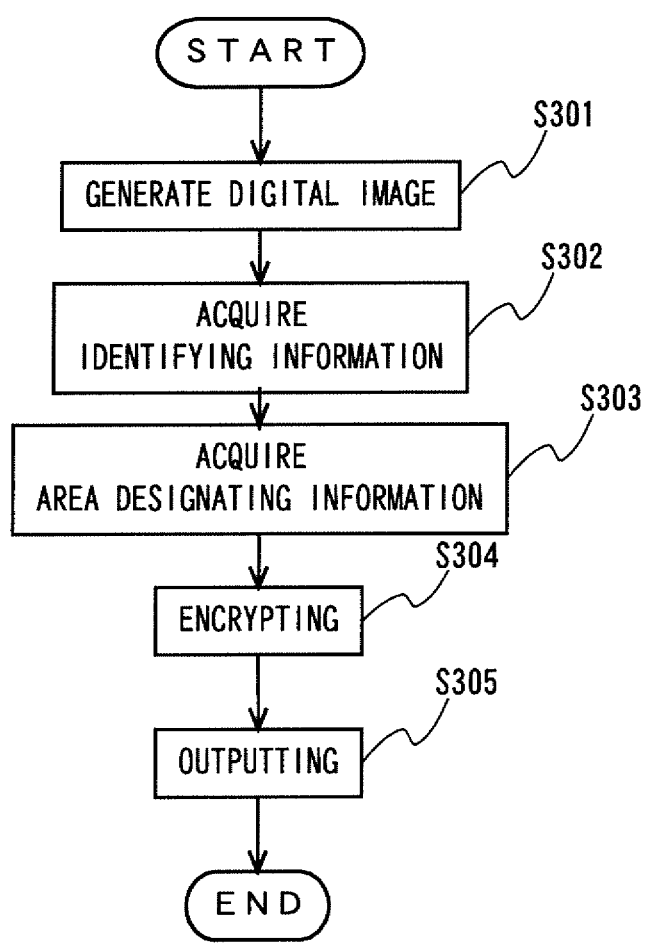
FIG. 20 is a flowchart showing a flow of how the electronic data is encrypted in the embodiment.

FIG. 20 is a flowchart showing a flow of how the electronic data is encrypted in the third embodiment. A start of the process shown in the present flowchart is triggered by reading an electronic data encrypting program from the HDD 103 and developing the program on the RAM 102 and executing the program by the CPU 101 on the basis of user's operations.

In step S301, the digital image is generated. Details of the process are substantially the same as step S101 described above, and hence its description is omitted. Thereafter, the processing proceeds to step S302.

In step S302, the identifying information is acquired. The identifying information acquiring unit 18 acquires the identifying information from the metadata of the electronic data becoming the basis of the digital image obtained in step S301. Thereafter, the processing proceeds to step S303.

In step S303, the area designating information is acquired. The area designating information acquiring unit 19B searches for the area designating information retained by the area designating information retaining unit 16 on the basis of the identifying information obtained in step S302, and thus acquires the area designating information associated with the identifying information. Thereafter, the processing proceeds to step S304.

Processes shown in step S304 and step S305 are substantially the same as the processes shown in step S103 and step S104, and hence their explanations are omitted.

A scheme of acquiring the identifying information and getting the associated area designating information selected, enables the user to omit the time-consuming operation of designating the area designating information and operation efficiency to be improved. Especially in the case of encrypting batchwise the documents taking plural patterns of fixed formats, the encryption can be performed extremely easily by getting the identifying information corresponding to the fixed format contained in metadata of a template of the fixed format.

In the same way as in the second embodiment, the decrypting process involves automatically detecting the encryption area and decrypting the detected area, thereby enabling only the user who knows the decryption key to browse the information described in the encryption area. In the decrypting process, however, the identifying information may be acquired, and the decryption area associated therewith may also be determined. Barcodes etc are printed on the printed paper medium, and the identifying information can be obtained from the paper medium by use of a barcode recognition technology, the OCR technology and so on. Decryption accuracy can be improved by applying the decryption area auto-detecting process to the area that is designated based on the identifying information.

Fourth Embodiment

Figure 21:
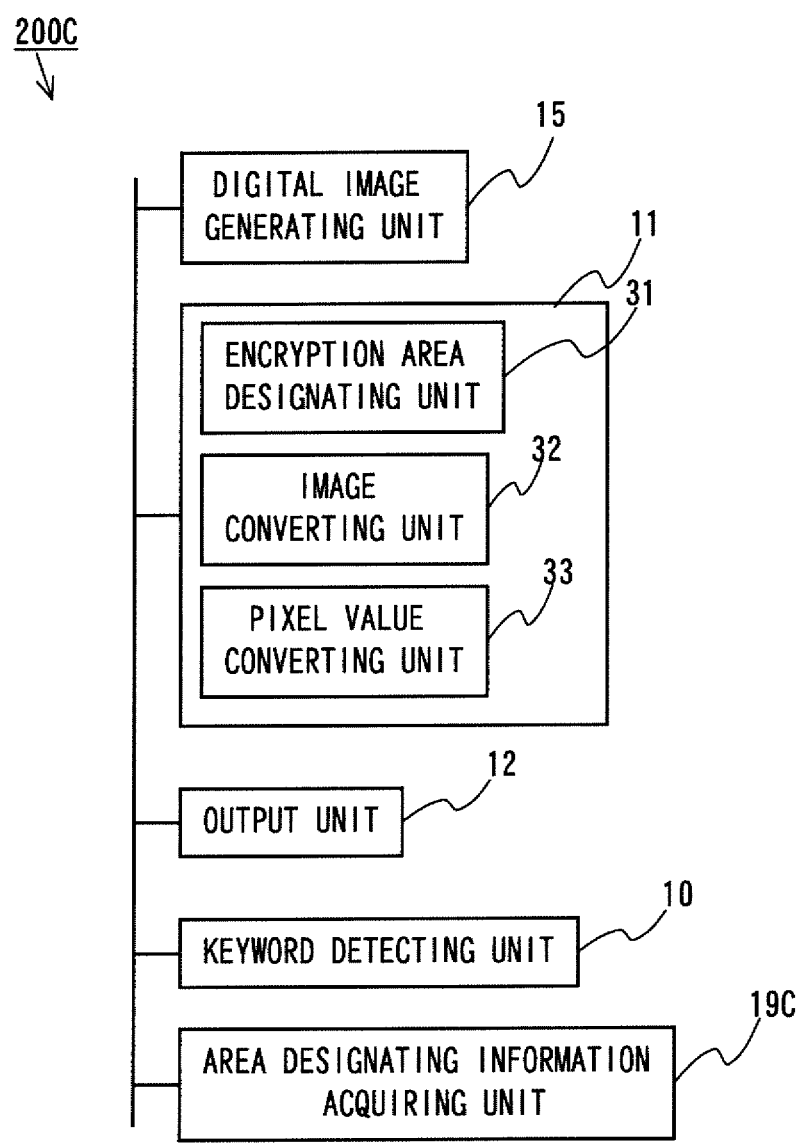
FIG. 21 is a diagram illustrating an outline of a functional configuration of the electronic data encrypting system according to the embodiment.

FIG. 21 is a diagram illustrating an outline of a functional configuration of an electronic data encrypting system 200C according to a fourth embodiment. The electronic data encrypting system 200C according to the fourth embodiment includes, in the same way as in the second embodiment, the digital image generating unit 15, the encrypting unit 11, the output unit 12 and the area designating information retaining unit 16, and further includes a keyword detecting unit 10 that detects a predetermined keyword from the information recorded on the paper medium, and an area designating information acquiring unit 19C that acquires an associated piece of area designating information according to a position corresponding to the detected keyword.

Figure 22:
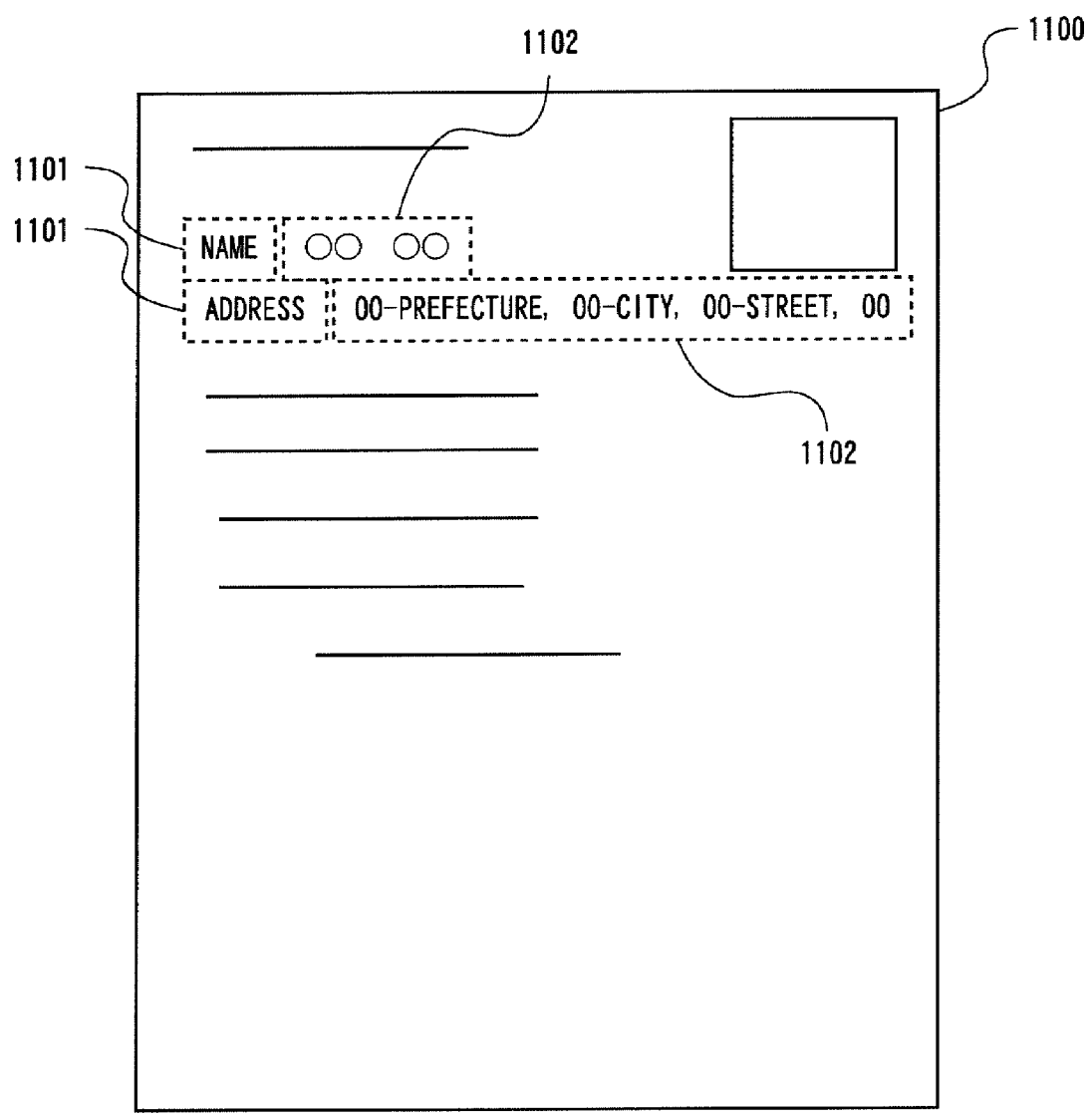
FIG. 22 is a diagram showing a display image of the electronic data containing keywords.

The keyword detecting unit 10 reads a character string from the electronic data becoming the basis of the digital image generated by the digital image generating unit 15, and detects a keyword contained in the electronic data by comparing the readout character string with the keyword defined as a predetermined character string. Herein, the "keyword" connotes the character string set for extracting, from the electronic data, existence or non-existence of the should-be-encrypted information and also extracting the position of the should-be-encrypted information when transformed into the digital image. FIG. 22 is a diagram showing a display image of electronic data 1100 containing the keywords. For example, if a [name] and an [address] are set as keywords, it is determined whether or not these keywords are contained in the electronic data 1100, and, if contained, positional information of positions 1101, 1101 where these keywords are described when transformed into the digital image, is acquired. Namely, character strings subsequent to these keywords can be presumed to be individual information such as the name and the address, and therefore it is possible to automatically obtain the should-be-encrypted information and the area designating information that designates areas 1102, 1102 where the should-be-encrypted information is described. On this occasion, the detection accuracy can be improved by referring to, if it is the name, a name list covering generally oft-used names and referring to, if being the address, an address list.

The area designating information acquiring unit 19C according to the fourth embodiment generates the area designating information for specifying the area associated with the keyword detected by the keyword detecting means. Generally, the area designating information is the information for specifying the area of the character string subsequent to the keyword. If the want-to-encrypt character string itself is set as the keyword, however, the information specifying the area in which to describe the keyword detected by the keyword detecting mean becomes the area designating information.

Figure 23:
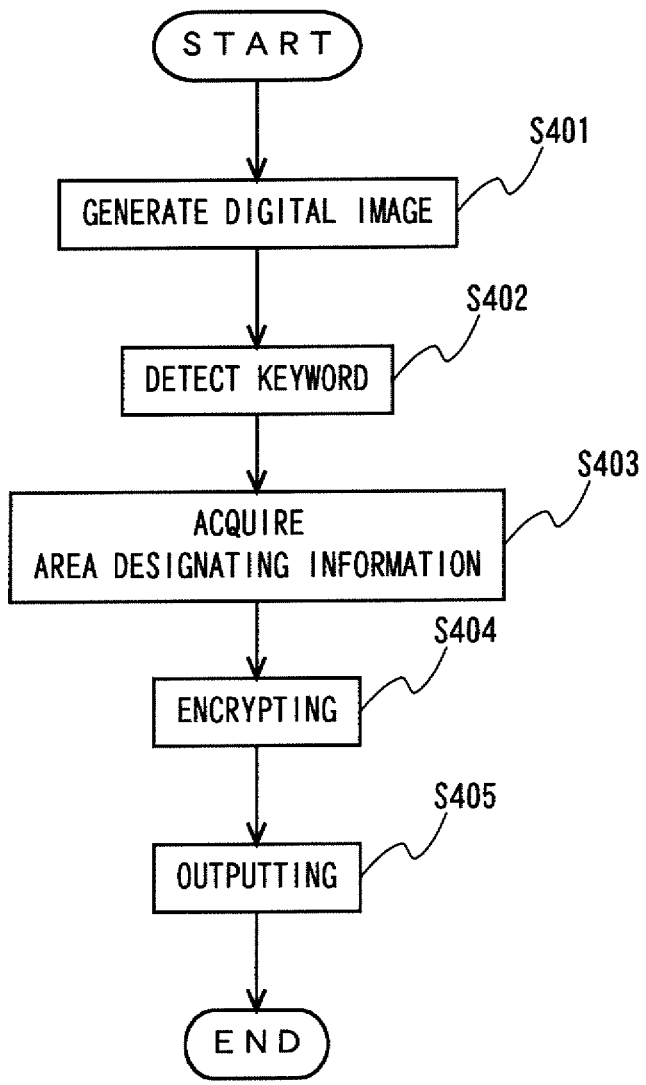
FIG. 23 is a flowchart showing a flow of encrypting the electronic data in the embodiment.

FIG. 23 is a flowchart showing a flow of encrypting the electronic data in the fourth embodiment. A start of the process shown in the present flowchart is triggered by reading the electronic data encrypting program from the HDD 103 and developing the program on the RAM 102 and executing the program by the CPU 101 on the basis of user's operations.

In step S401, the digital image is generated. Details of the process are substantially the same as step S101 described above, and hence its description is omitted. Thereafter, the processing proceeds to step S402.

In step S402, the keyword is detected. The keyword detecting unit 10 searches for the electronic data becoming the basis of the digital image generated in step S401, thereby detecting the predetermined keyword. Thereafter, the processing proceeds to step S403.

In step S403, the area designating information is acquired. The area designating information acquiring unit 19C generates the area designating information for specifying the area associated with the keyword on the basis of a position of the keyword detected in step S402. To be specific, if the keyword is a title of the want-to-encrypt information, the area designating information specifying the area in which to describe the information subsequent to the keyword is generated. Further, if the keyword represents the want-to-encrypt information itself, the area designating information specifying the area in which the keyword is described is generated. A method by which the area designating information designates the area involves using, in the same way as the method explained in the second embodiment, the positional information, the size information, vector information and so on. Thereafter, the processing proceeds to step S404.

The processes shown in step S404 and step S405 are substantially the same as the processes shown in step S103 and step S104, and hence their descriptions are omitted.

Over the recent years, importance of protecting the individual information has highly risen, however, the important information like the individual information is often described subsequent to the specified keywords such as a [name], an [address] and a [telephone number]. According to the fourth embodiment, the keyword is detected from the encryption target electronic data, and the area associated with the keyword is automatically encrypted, thereby enabling a quantity of the operation to be reduced when encrypting the information described in the variety of formats.

In the same way as in the second embodiment, in the decrypting process, the encryption area is automatically detected, and the detected area is decrypted, thereby enabling only the user who knows the decryption key to browse the information described in the encryption area. The decrypting process may, however, involve detecting the keyword and determining the decryption area associated therewith. The keyword can be detected from the printed paper medium by use of the OCR technology. The decryption accuracy can be improved by applying the decryption area auto-detecting process to the positional information of the detected keyword.

Figure 24:
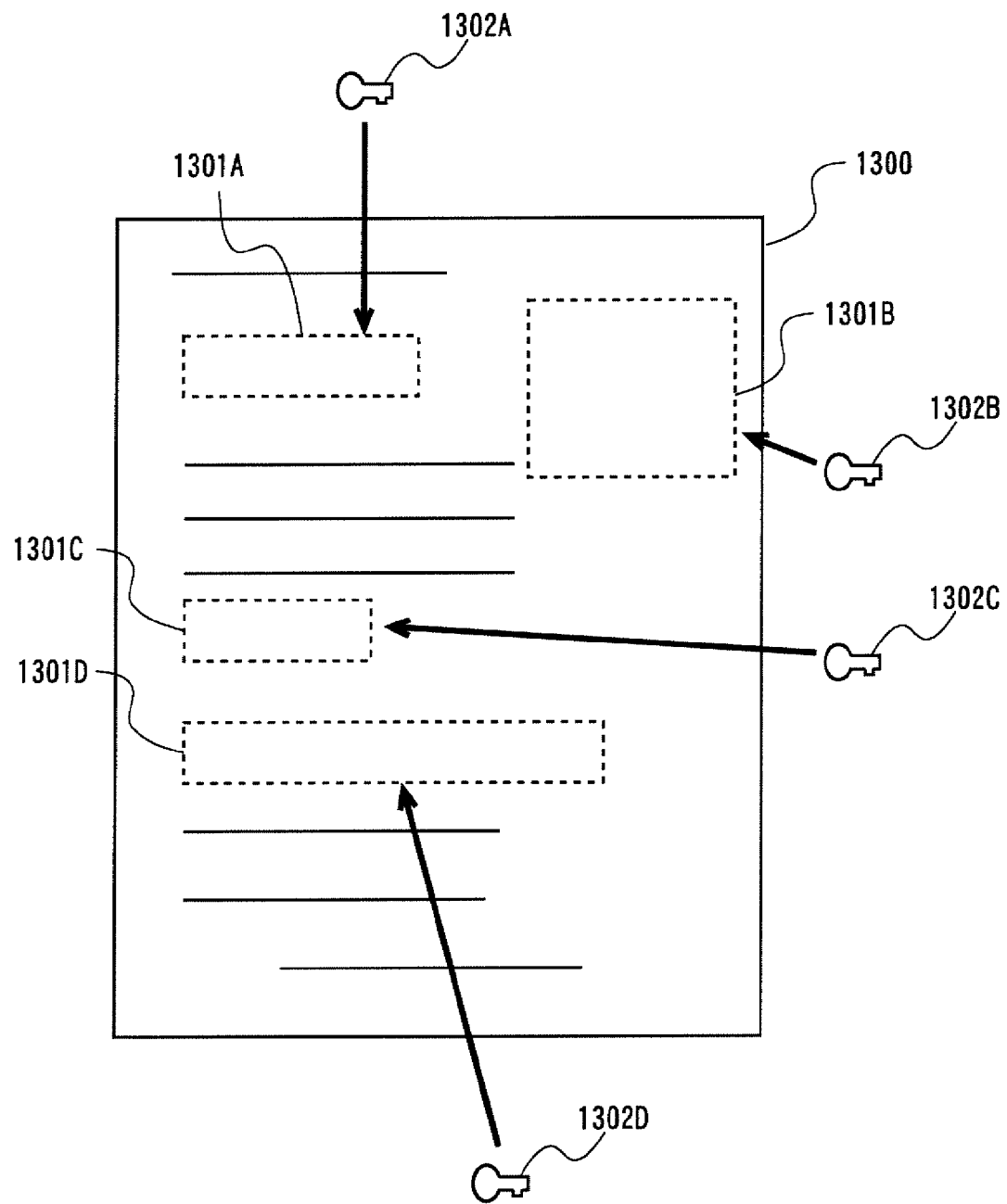
FIG. 24 is a diagram illustrating a display image of the electronic data to be encrypted by employing a plurality of encryption keys.

Moreover, in the first through fourth embodiments, on the occasion of transforming one set of electronic data into the digital image, the plurality of areas may also be encrypted with the encryption keys different from each other. FIG. 24 is a diagram illustrating a display image of electronic data 1300 to be encrypted by employing the plurality of encryption keys. Supposing that there are areas 1301A, 1301B, 1301C and 1301D, these areas 1301A, 1301B, 1301C and 1301D are encrypted with encryption keys 1302A, 1302B, 1302C and 1302D, whereby browsing authority can be set for every area.

<Encrypting Unit and Decrypting Unit>

Next, outlines of the encrypting process by the encrypting unit and of the decrypting process by the decrypting unit in the first through fourth embodiments, will be explained.

Figure 25:
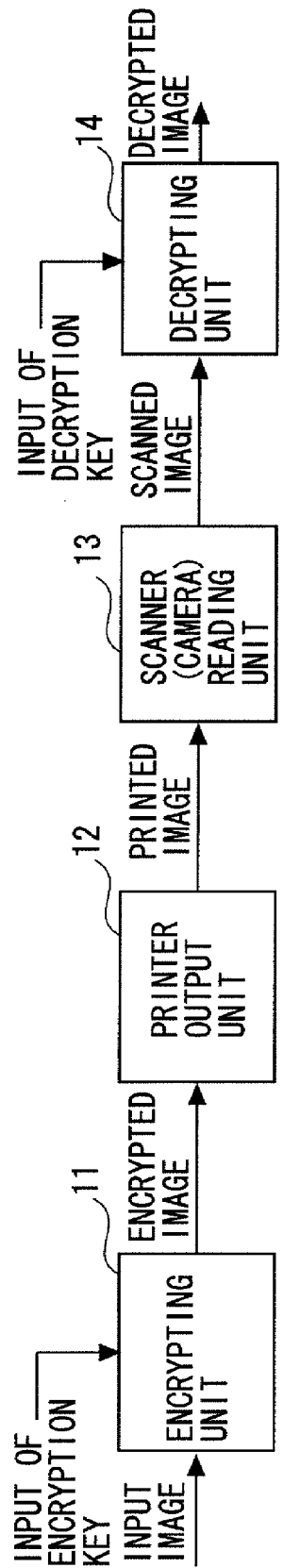
FIG. 25 is a diagram showing a processing outline (part 1) of the encrypting process and the decrypting process.

FIG. 25 is a diagram showing a processing outline (part 1) of the encrypting process and the decrypting process. In FIG. 25, the encrypting unit 11 (which is referred to as an encrypting unit 11A, encrypting unit 11B and an encrypting unit 11C in first through third modes, respectively) outputs the encrypted image into which part of the digital image has been encrypted on the basis of the inputted digital image and the encryption key specifying the encrypting method. The printer output unit 12 prints the digital image encrypted by the encrypting unit 11 on a printable physical medium such as the paper. The scanner (camera) reading unit 13 reads the printed image output by the printer output unit 12 by employing the scanner or the camera.

Then, the decrypting unit 14 (which is termed a decrypting unit 14A, a decrypting unit 14B and a decrypting unit 14C in the first through third modes, respectively) obtains the printed image output by the printer output unit 12 and the decrypted image with the inputted decryption key. As far as the inputted decryption key is valid, the encrypted image can be properly decrypted, and the information hidden with the encryption by the encrypting unit 11 gets visible.

Figure 26:
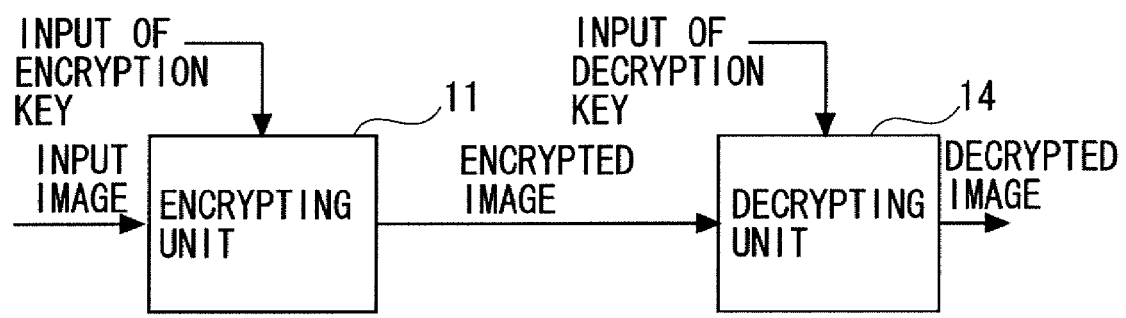
FIG. 26 is a diagram showing a processing outline (part 2) of the encrypting process and the decrypting process.

FIG. 26 is a diagram showing a processing outline (part 2) of the encrypting process and the decrypting process. As shown in FIG. 26, the encrypting process and the decrypting process in the first through third modes to which the present invention is applied, enable the decrypted image to be acquired by inputting the digital image encrypted by the encrypting unit 11 in an as-is state of the electronic document image without via the printer and the scanner to the decrypting unit 14.

Next, the first through the third modes to which the present invention is applied will be described, respectively. To begin with, the first mode to which the present invention is applied will be described.

Figure 27:
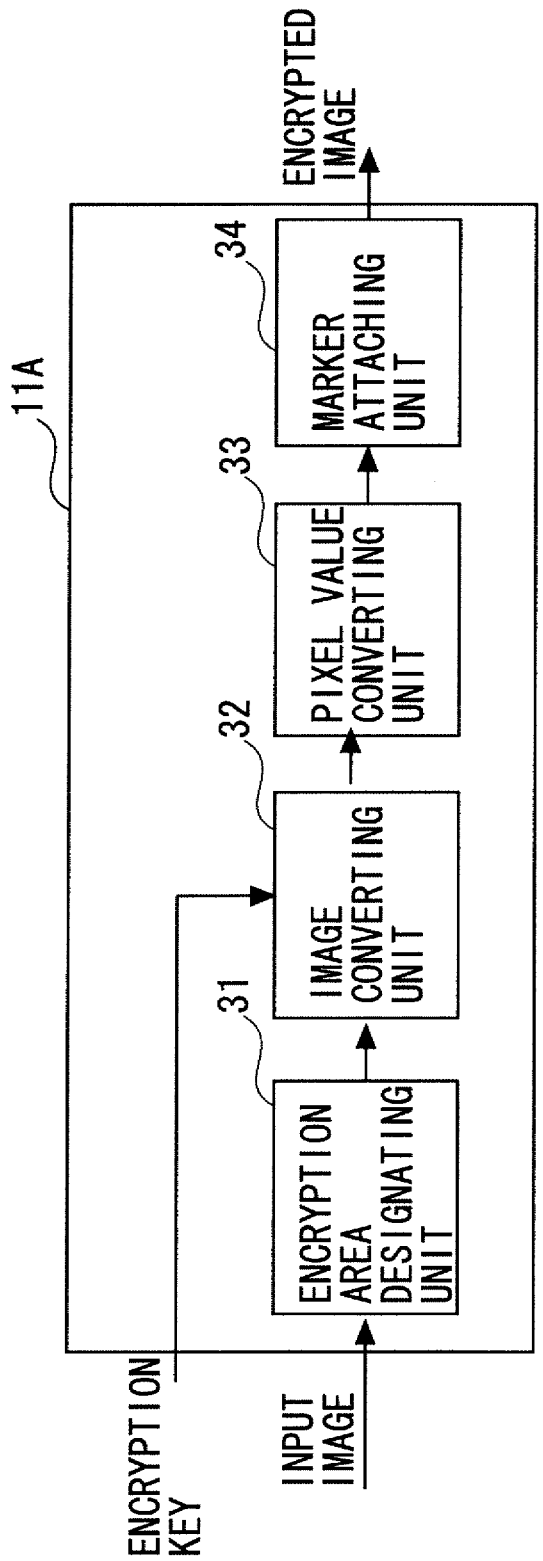
FIG. 27 is a diagram showing an outline of the encrypting process in a first mode.

FIG. 27 is a diagram illustrating an outline of the encrypting process in the first mode. In FIG. 27, the encrypting unit 11A includes an encryption area determining (designating) unit 31, an image converting unit 32, a pixel value converting unit 33 and a marker adding unit 34.

The encryption area designating (determining) unit 31 selects an area to be encrypted from the inputted image containing the want-to-encrypt area.

Figure 28:
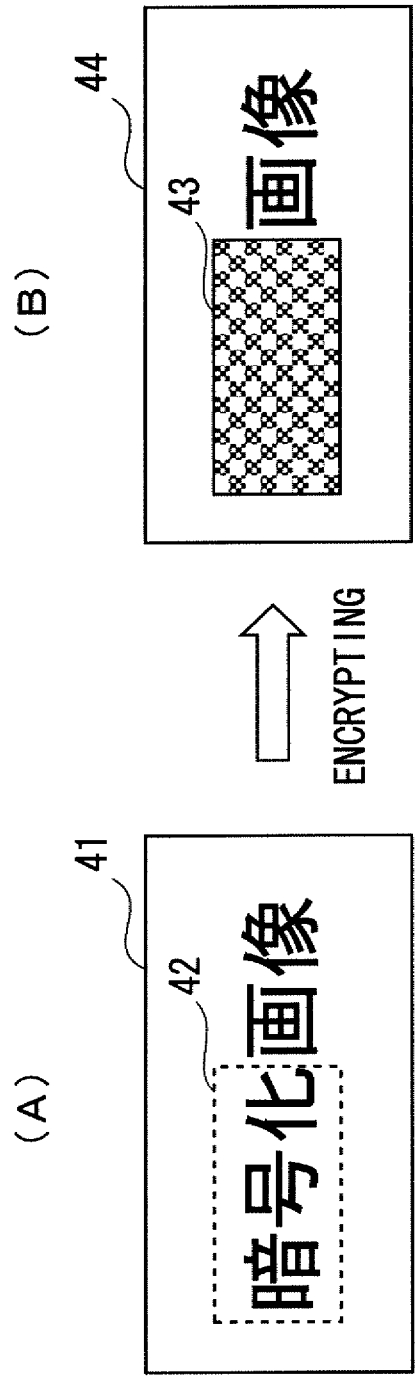
FIG. 28 is a diagram showing an example of selecting an encryption area.

FIG. 28 is a diagram showing an example of selecting the encryption area. To be specific, the encryption area designating unit 31 selects, as illustrated in (A) of FIG. 28(A), an area 42 to be encrypted out of a digital image (inputted image) 41 containing the want-to-encrypt area. The area 42 is converted into a converted image 43 as illustrated in (B) of FIG. 28 by the processes of the image converting unit 32 and the pixel value converting unit 33 that will hereinafter be described, and the digital image 41 is converted into an encrypted image 44 containing the converted image 43.

The discussion gets back to the description in FIG. 27. When the encryption area designating unit 31 selects the area 42 to be encrypted, the image converting unit 32 inputs the to-be-encryption area 42 and the encryption key, and visually converts the an image of the to-be-encryption area 42 by a converting method associated with the encryption key. A conversion parameter on this occasion is generated based on binary data obtained from the inputted encryption key.

Figure 29:
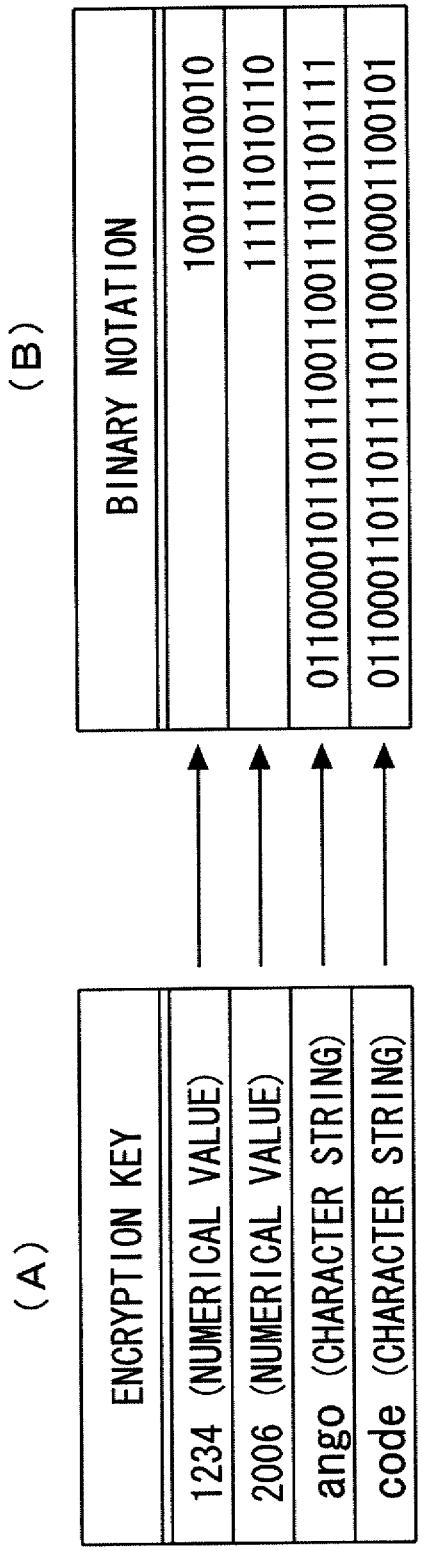
FIG. 29 is a diagram showing an input example of the encryption key.

FIG. 29 is a diagram showing an example of inputting the encryption key. FIG. 29 shows an example of the encryption key and an example of the binary data generated from the encryption key. For example, a numeric value [1234] used as the encryption key is inputted in the form of binary data [100011010010], and a character string [ango] as the encryption key is inputted in the form of binary data [01100001011011100110011101101111].

The first mode exemplifies, as the image converting methods, two converting methods, i.e., one method based on a process (called a scramble process) of segmenting the image into micro areas and rearranging the micro areas and another method based on an image compression process.

To start with, the scramble process will be described. The scramble process is that at first the image of the selected area 42 is segmented into the micro areas each having a fixed size, and next the micro areas are rearranged based on the binary data obtained from the encryption key.

Figure 30:
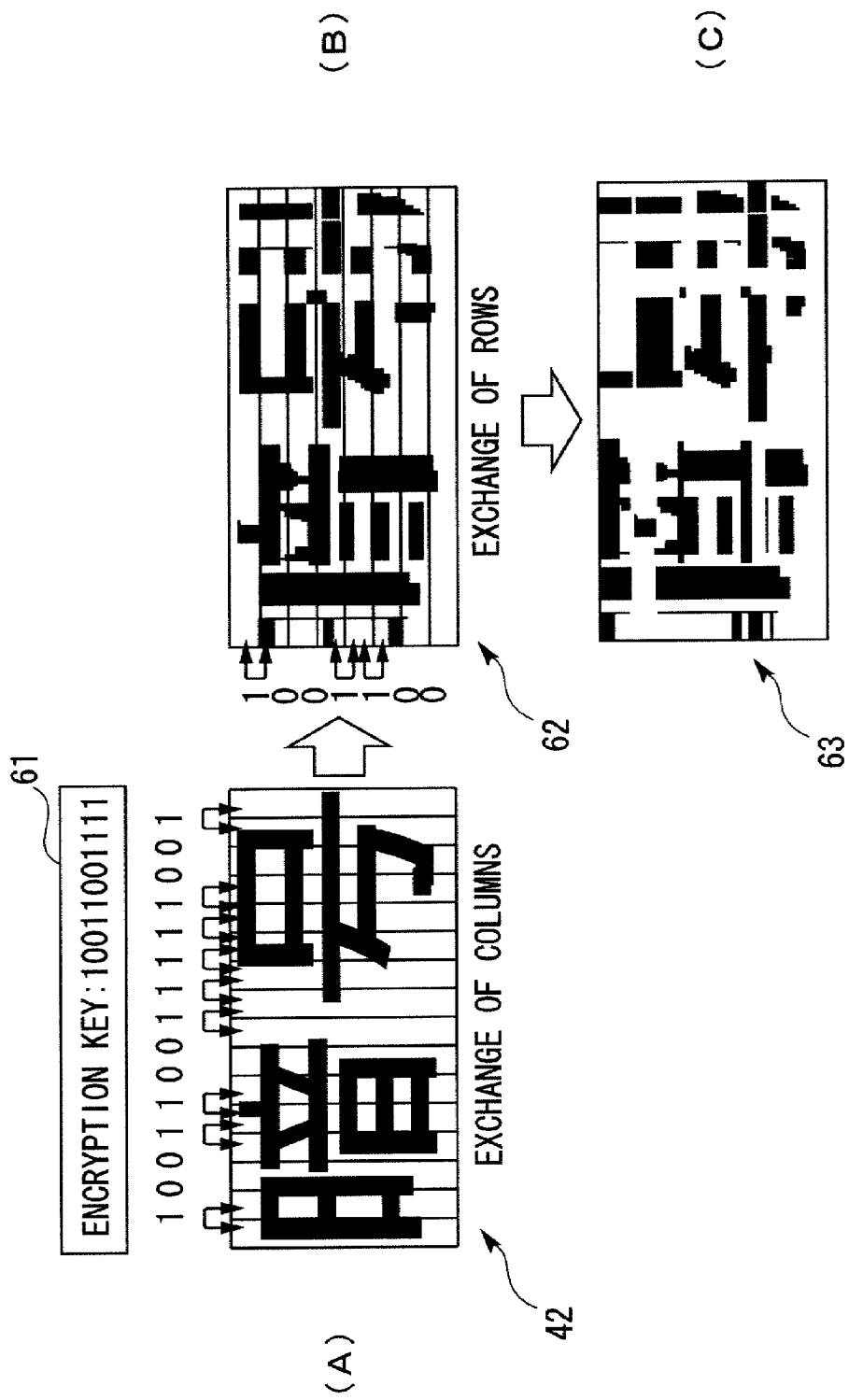
FIG. 30 is a diagram showing one example of a scramble process in an image converting unit.

FIG. 30 is a diagram showing one example of the scramble process by the image converting unit. As shown in (A) of FIG. 30, at the first onset, the area 42 selected by the encryption area designating unit 31 is segmented in a vertical direction, respective bits of a binary string of the encryption key 61 are set corresponding to borders between the segmented areas (micro areas) 42 in sequence from the left, when the bit is [1], neighboring segmented columns (segmented areas) are exchanged with each other, and, when the bit is [0], an execute-nothing-process is conducted in sequence from the left side. If the bit count of the binary string is insufficient for a segmentation border count, the same binary string is repeated from a position where the insufficiency occurs, thus performing the exchanging process up to the right end of the area 42.

Subsequently, as shown in (B) of FIG. 30, an image area 62 undergoing the exchange process is segmented in a horizontal direction, the respective bits of the binary string of the encryption key 61 is set corresponding to the boarders between the segmented image areas 62 in sequence from above, and the same exchanging process as done for the vertical segmentation is executed sequentially from above on a row-by-row basis.

Then, as illustrated in (C) of FIG. 30, as a result of executing the exchanging process on the individual segmented images, a scramble image 63, defined as a processed image into which the original area 42 has been subjected to the scramble process, is acquired.

An extension method of this exemplified scramble process can involve executing the scramble process twice or more both in the horizontal direction and in the vertical direction, and can further involve changing the size of the segmented area in the exchange conducted from the second time onward. Moreover, different binary strings can be also employed for exchanging the segmented areas in the horizontal direction and in the vertical direction. These extension methods are, if a size of the inputted image is small while a bit length of the encryption key is large, effective especially as a means for preventing absolutely the same processed image from being generated based on the different encryption key.

Figure 31:
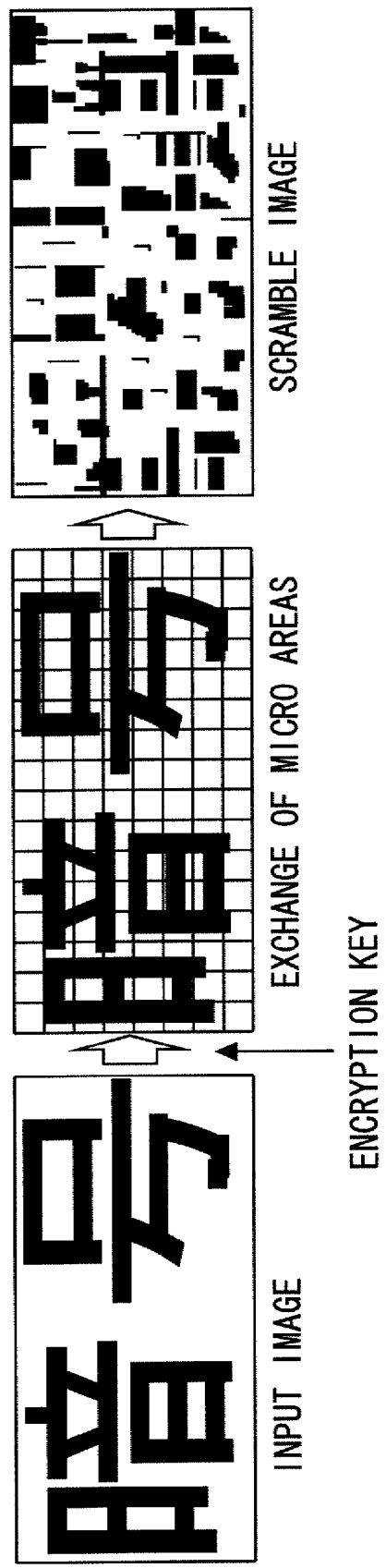
FIG. 31 is a diagram showing another example of the scramble process in the image converting unit.

FIG. 31 is a diagram illustrating another example of the scramble process in the image converting unit. A method of exchanging the pixels on the unit of the micro area as illustrated in FIG. 31 can be used as another scramble processing method different from the scramble process explained with reference to FIG. 30. More specifically, the inputted image is segmented into the micro areas each taking a rectangular shape, and the segmented micro areas are exchanged with each other. This scheme has a greater scrambling count and enables strength of the encryption to a greater degree than by the method of conducting the exchanges in the horizontal direction (row) and in the vertical direction (column) described above.

Figure 32:
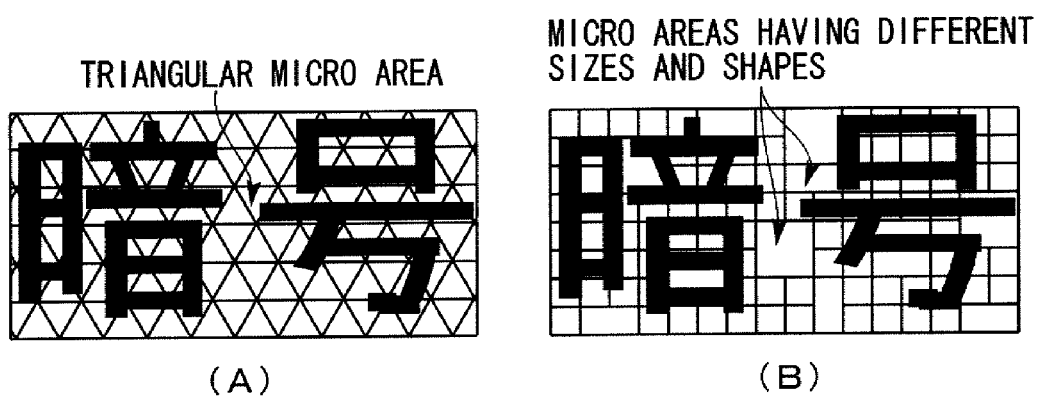
FIG. 32 is a diagram showing a modified example of a shape of a micro area in the scramble process.

FIG. 32 is a diagram showing modified examples of the shape of the micro area in the scramble process. Further, the shape of the micro area when executing the scramble process can include, e.g., a triangle as illustrated in (A) of FIG. 32 in addition to the rectangle illustrated in FIG. 31. Moreover, as illustrated in (A) of FIG. 32, the micro areas having different shapes and different sizes can coexist as shown in (B) of FIG. 32.

Next, the converting method based on the image compressing process will be described.

Figure 33:
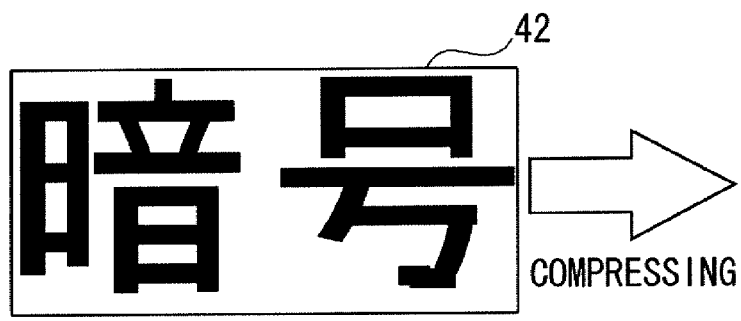
FIG. 33 is a diagram showing a compressing process in the image converting unit.

FIG. 33 is a diagram showing a compression process in the image converting unit. When the input image 41 is a binary image, at first, as illustrated in (A) of FIG. 33, a binary string 71 as shown in (B) of FIG. 33 is generated by compressing an image of the area 42 selected by the encryption area designating unit 31. A compression method herein can involve applying all types of compression methods such as a run-length compression method used for transferring binary image data in a facsimile apparatus and a JBIG (Joint Bi-level Image experts Group) compression method defined as a standard compression method for the binary image.

Figure 34:
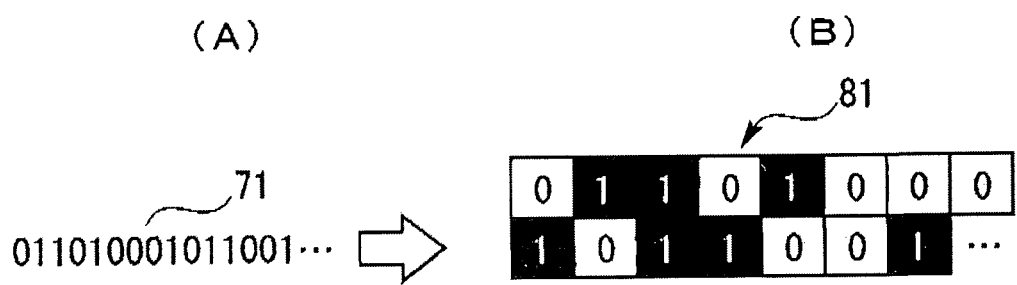
FIG. 34 is a diagram showing a process of transforming converted image into an image.

FIG. 34 is a diagram showing a process of transforming the converted data into the images. As shown in FIG. 33, subsequent to the compression of the area 42, the respective bits of the binary string 71 defined as the converted compression data are arrayed as black-and-white square images 81 in the area 42 of the image to be encrypted in a way that generates the square images (processed images) 81 by enlarging [0] bits as [white] squares and [1] bits as [black] squares in a designated size as illustrated in (B) of FIG. 34.

If desired to array the converted compression data (binary string 71) within the image of the selected area 42, the size of the square image 81 depends on a compression rate of the selected area 42. For example, if the compression rate is equal to or smaller than ¼, the size of the square image 81 is equivalent to (2×2) pixels at most, and, if equal to or smaller than 1/16, the size is equivalent to (4×4) pixels at most.

On the other hand, if desired to designate the size of the square image 81 and to arrange the compressed data within the image of the area 42, it is necessary for attaining a compression rate depending on the size of the square image 81 in the first image compression process. In the case of setting the square to, e.g., a (4×4) pixel size, the compression rate equal to or larger than 1/16 is needed. In this case, effective methods are a method of previously compressing the information in the selected area 42 and an irreversible compression method.

The encryption process of transforming the compressed data into the image in enlargement enables the enlarged black-and-white blocks to be recognized even when reading the encrypted image with, e.g., a low-resolution camera, and hence the encrypted image can be correctly decrypted.

The discussion gets back to the illustration in FIG. 27. A pixel value converting unit 33 converts at the fixed intervals the pixels within the processed image 63 converted by the image converting unit 32, thus making the converted image 43 take substantially a grating-shaped stripped pattern.

Figure 35:
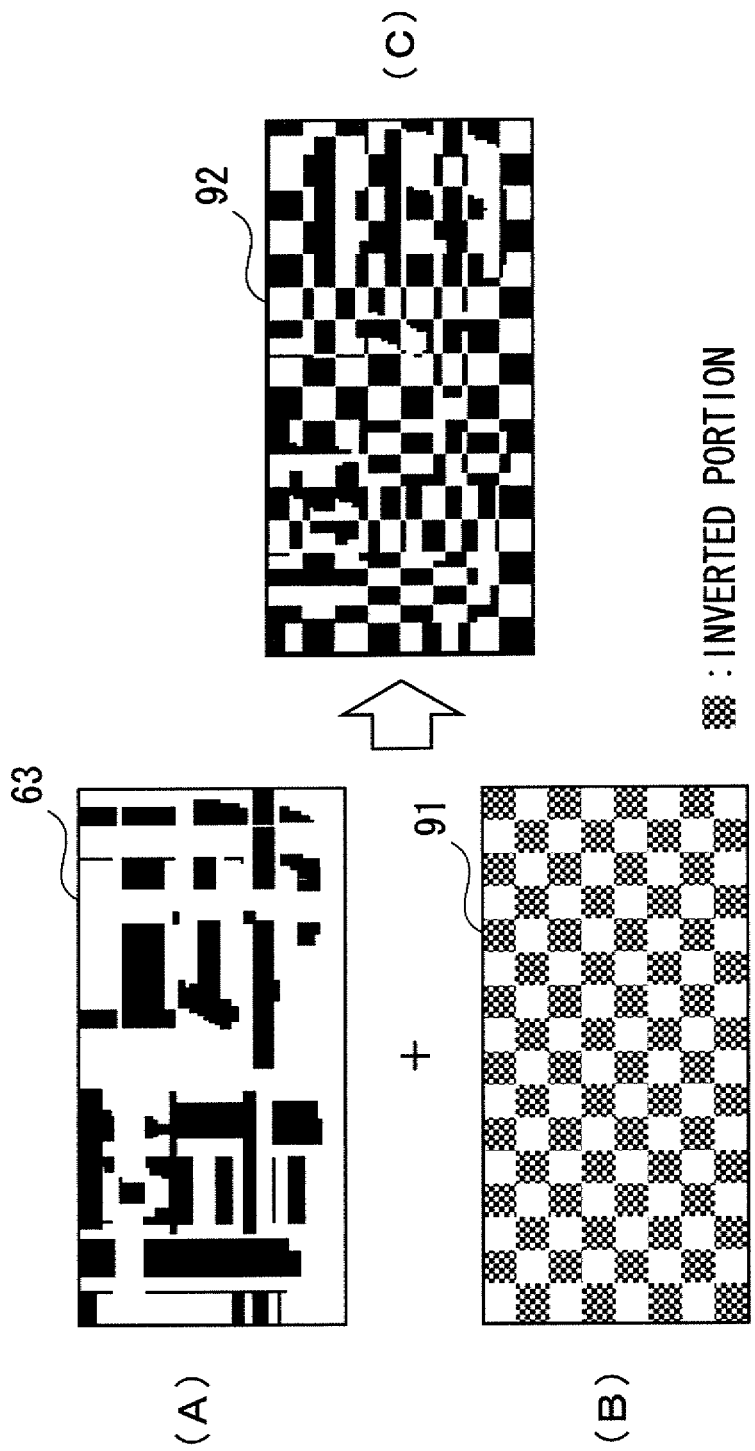
FIG. 35 is a diagram showing an example (part 1) of a pixel value converting process in a pixel value converting unit.

FIG. 35 is a diagram showing an example (part 1) of a pixel value converting process. The pixel value converting unit 33 converts at the fixed intervals the pixels of the processed image 63 into which the area is scrambled by the image converting unit 32, whereby the encrypted image 44 takes substantially the grating-shaped stripped pattern as a whole. For example, as illustrated in FIG. 35, a converted image 92 in which the encrypted image 44 takes substantially the grating-shaped stripped pattern on the whole is acquired as shown in (C) by executing such conversion that the scramble image 63 shown in (A) of FIG. 35 is inverted (inversion process) with colored portions of a checkered pattern image 91 illustrated in FIG. (B). The stripped pattern to be generated is thereby used for detecting minute positions of the respective pixels within the encryption area when decrypting the encrypted image 44.

Another conversion can be carried out for a series of these processes. For example, the process of inverting the pixel values may also be a process of adding a designated value.

Further, a checkered pattern image 91 illustrated in (B) of FIG. 35 has substantially the same size as the scramble image 63 shown in (A) has, however, only the central area, excluding the peripheral area, of the scramble image 63 may also be subjected to the inverting process.

Figure 36:
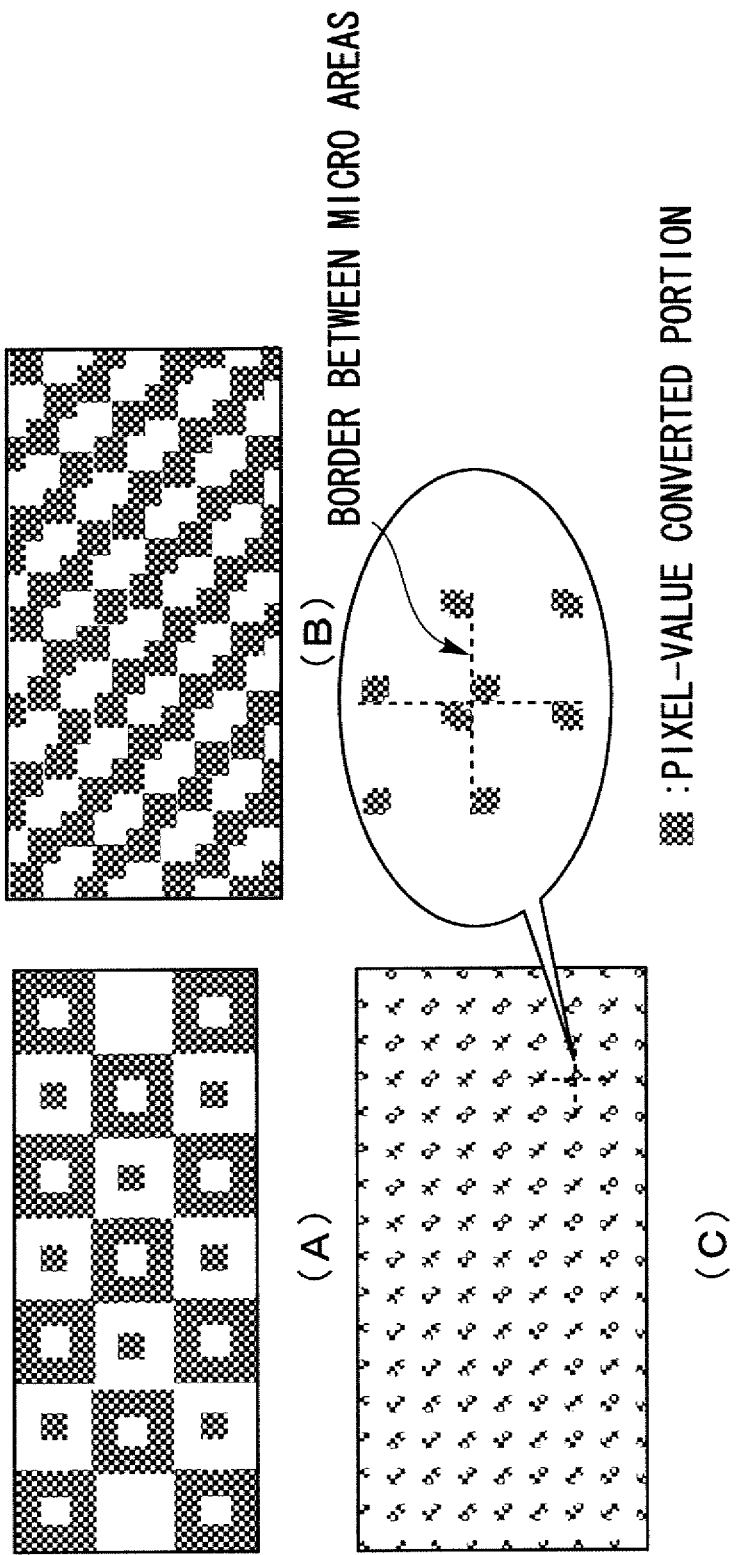
FIG. 36 is a diagram showing an example (part 2) of the pixel value converting process in the pixel value converting unit.

FIG. 36 is a diagram showing an example (part 2) of the pixel value converting process by the pixel value converting unit. Moreover, a variety of shapes as illustrated in (A) through (C) of FIG. 36 can be applied to the area 42 in which to convert the pixel values. The conversion of the pixel values is a process aiming at detecting the border position between the micro areas with the high accuracy, and hence it is considered that, e.g., as in (A) of FIG. 36, only the border portions are pixel-value-converted. Further, as in (B) of FIG. 36, the borders between the conversion and the non-conversion appear at much minuter intervals by converting the pixel values while shifting little by little with respect to the micro areas, whereby the positions of the pixels of the encrypted image 44 can be detected in much greater detail in the decrypting process. Moreover, as in (C) of FIG. 36, only portions, in which the borders between the micro areas, are pixel-value-converted, thereby enabling deterioration of an image quality to be restrained to the minimum when reading and decrypting the images printed on a sheet of paper etc with the scanner and the camera.

Herein, such a postscript is added that if the shape of the micro area is not the square having a uniform size and if the micro areas are triangular ((A) of FIG. 32) of if the micro areas having different sizes and different shapes coexist (B) of FIG. 32), the pixel values are required to be converted by methods corresponding to the shapes without being limited to the conversion examples given above.

As described above, the present invention takes not the scheme that the regular patterns representing the encrypted positions are generated in the way of being overwritten on the inputted image as in Patent document 1 but the scheme that the regular patterns are generated by converting the pixel values of the inputted image. Accordingly, it does not happen that the image information of the edge portions of the encrypted image are sacrificed as by the prior arts, and the encryption can be done at the high efficiency in the form of making the position detecting information coexist with the original image information.

Note that if the pattern forming portions contain some pieces of image information, the regularity thereof is lost more or less, however, as will be mentioned about he process of the decrypting unit 14 that will be described later on, the encrypted positions can be detected by making use of statistical characteristics of the whole encrypted image.

The discussion gets back to the illustration in FIG. 27. The marker adding unit 34 adds positioning markers to, e.g., three corners other than the right lower corner among the four corners of the converted image 92 undergoing the converting process by the pixel value converting unit 33, thereby generating the encrypted image 44.

The marker adding unit 34 allocates the positioning markers for specifying the position of the encryption area 42 to the three corners excluding the right lower corner among the four corners of the converted image 92.

FIG. 37 is a diagram illustrating examples of the positioning markers used for the encryption process. The positioning marker used in the first mode takes, it should be assumed, a circled cross as illustrated in (A) of FIG. 37. The shape of the positioning marker may be in a broader sense formed by the circle or a polygon of a solid line and a plurality of lines intersecting the periphery thereof. This is exemplified such as a shape of [intra-square cross] which resembles kanji character [田] used as the positioning marker in (B) of FIG. 37, a circled Y consisting of three lines extending radially toward the periphery from the center as in the case of the positioning marker in (C), and a circled centrally-voided cross (lines disconnected at the center) as in the case of the positioning marker in (D).

Moreover, a color combination of the positioning marker may be such that most simply the background is white, while the foreground is black, however, it does not cause any inconvenience to properly change the color combination corresponding to a color (pixel values) distribution of the converted image 92 without being limited to the color combination given above. Further, a thinkable method is not that the determined colors are designated for the background and the foreground but that the positioning marker is formed by inverting the pixels values of the foreground while the background color is set to an as-is color of the digital image 41. With this contrivance, the image is encrypted while retaining the input image information of the positioning marker.

Figure 38:
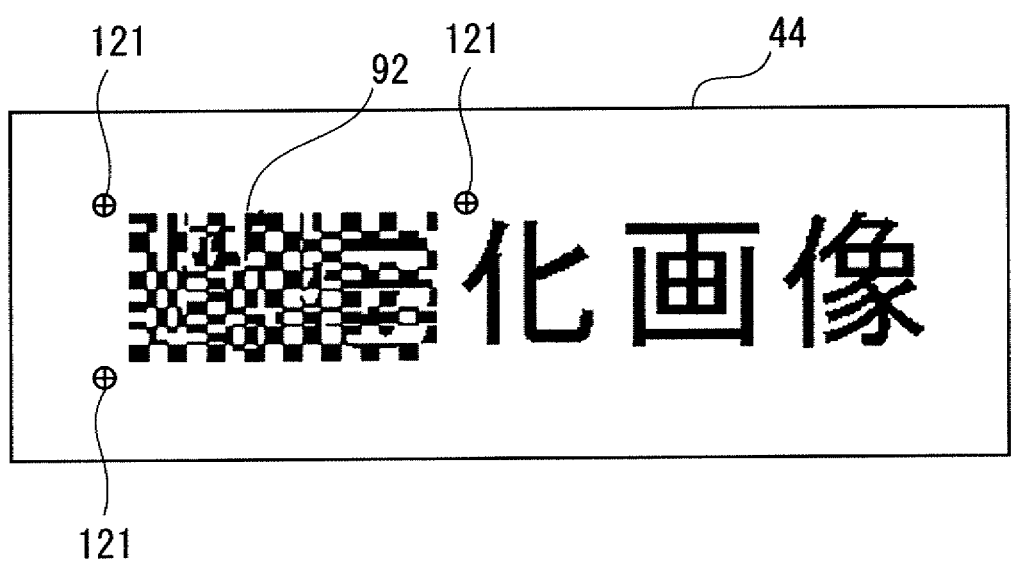
FIG. 38 is a diagram showing an example of the encrypted image.

FIG. 38 is a diagram illustrating an example of the encrypting image. By the processes of the encrypting unit 11A, finally the encrypted image 44 as illustrated in FIG. 38 is generated. The encrypted image 44 contains the converted image 92 and a positioning marker 121.

Moreover, in the encrypting method according to the first mode, when the image converting unit 32 adopts the [micro area rearranging process (scramble process)], the encryption process can be applied to a gray-scale image and a color image as well as to the binary image.

Figure 39:
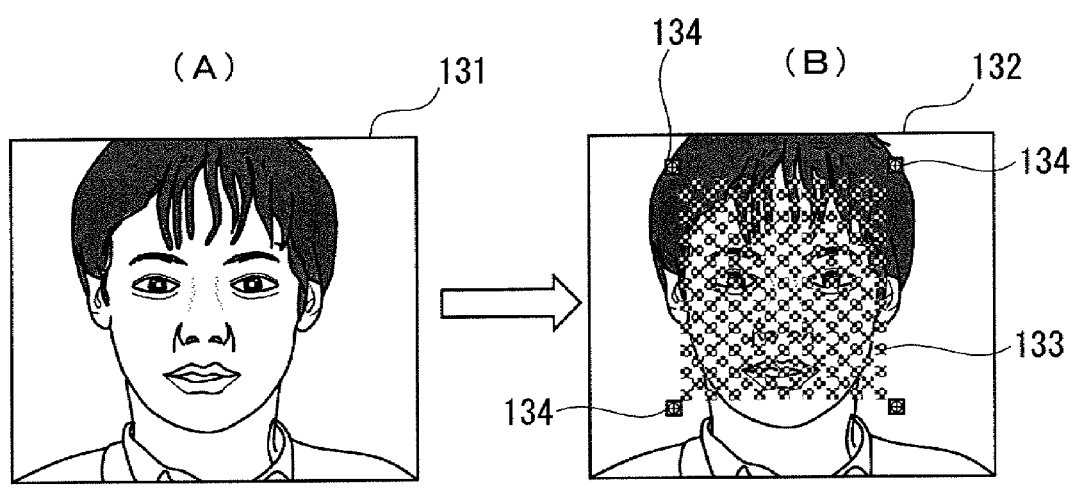
FIG. 39 is a diagram of an example of encrypting a grayscale image.

FIG. 39 shows an example of how the gray-scale image is encrypted. In FIG. 39, a gray-scale image 131 illustrated in (A) is subjected to the process by the encrypting unit 11A, thereby generating an encrypted image 132 containing a converted image 133 and a positioning marker 134 as illustrated in (B).

Next, the decrypting unit 14A will be described.

Figure 40:
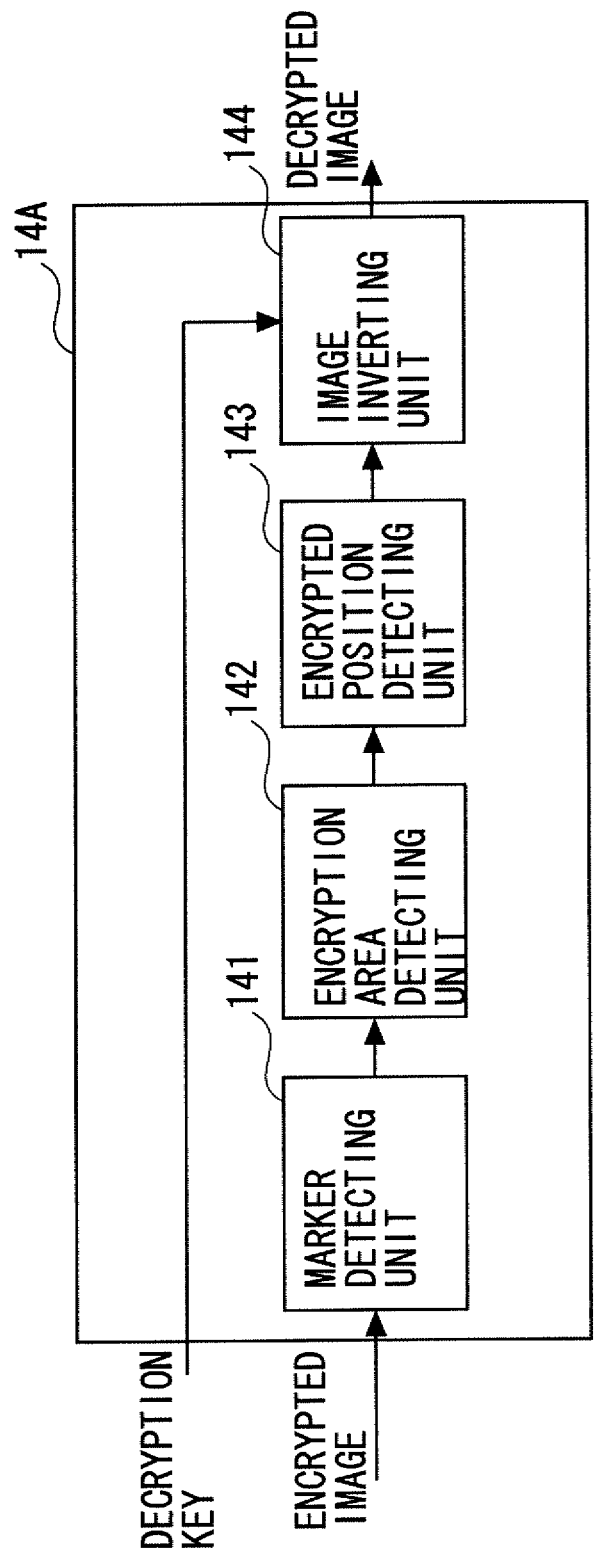
FIG. 40 is a diagram showing an outline of a decrypting process in the first mode.

FIG. 40 is a diagram showing an outline of the decrypting process in the first mode. In FIG. 40, the decrypting unit 14A includes a marker detecting unit 141, an encryption area detecting unit 142, an encrypted position detecting unit 143 and an image inverting unit 144.

The marker detecting unit 141 detects, from the encrypted image, a position of the positioning marker added by the marker adding unit 34 in a way that uses a general image recognition technology. An applicable method as the detecting method involves using pattern matching and analyzing connectivity of graphics.

The encryption area detecting unit 142 detects the encrypted image area on the basis of the positional relation between the three positioning markers detected by the marker detecting unit 141.

Figure 41:
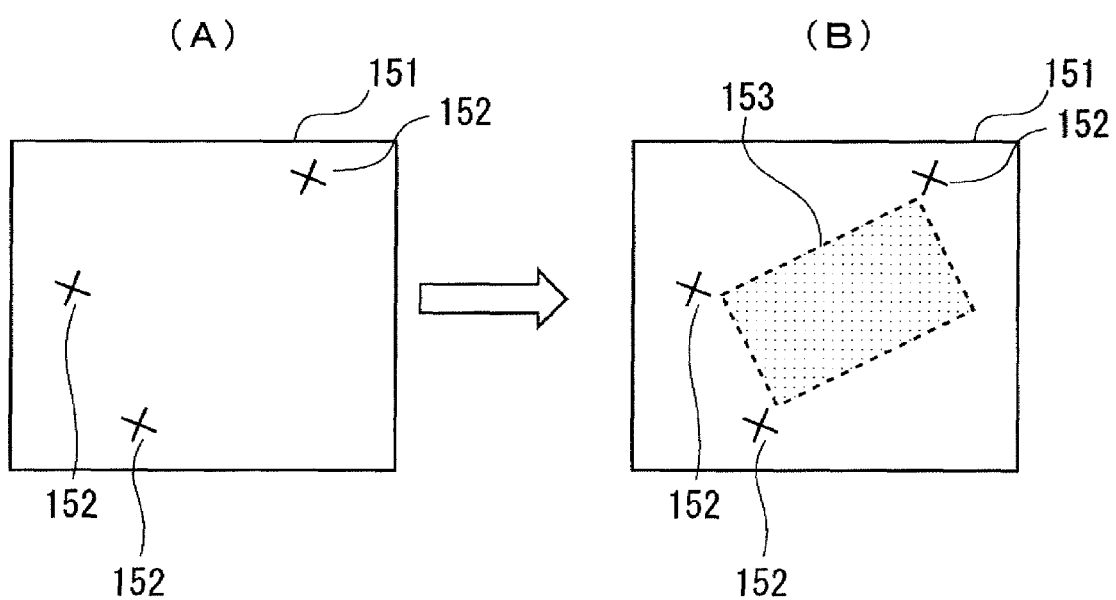
FIG. 41 is a diagram showing a process of detecting the encryption area from the positioning marker.

FIG. 41 is a diagram showing a process of detecting the encryption area from the positioning marker. As shown in (A) of FIG. 41, when the marker detecting unit 141 detects at least three positioning markers 152 from the encrypted image 151, as illustrated in (B), one encryption area 153 can be detected. Namely, the three positioning markers 152 are disposed at the four corners of the rectangular encryption area 153, and hence a graphic form obtained by connecting these three points (the positions of the positioning markers 152) with lines becomes roughly a right-angled triangle. Then, if the three or more positioning markers 152 are detected, the positional relation between the three positioning markers 152 embraces an area taking a shape that is approximate to the right-angled triangle, and the encryption area 153 takes a rectangular shape in which the three positioning markers 152 correspond to three angular points among the four angular points. Note that if the number of the detected positioning markers 152 is equal to or smaller than "2", the corresponding encryption area 153 can not be specified, and hence the decrypting process is terminated on the assumption that the encrypted image does not exist.

Figure 42:
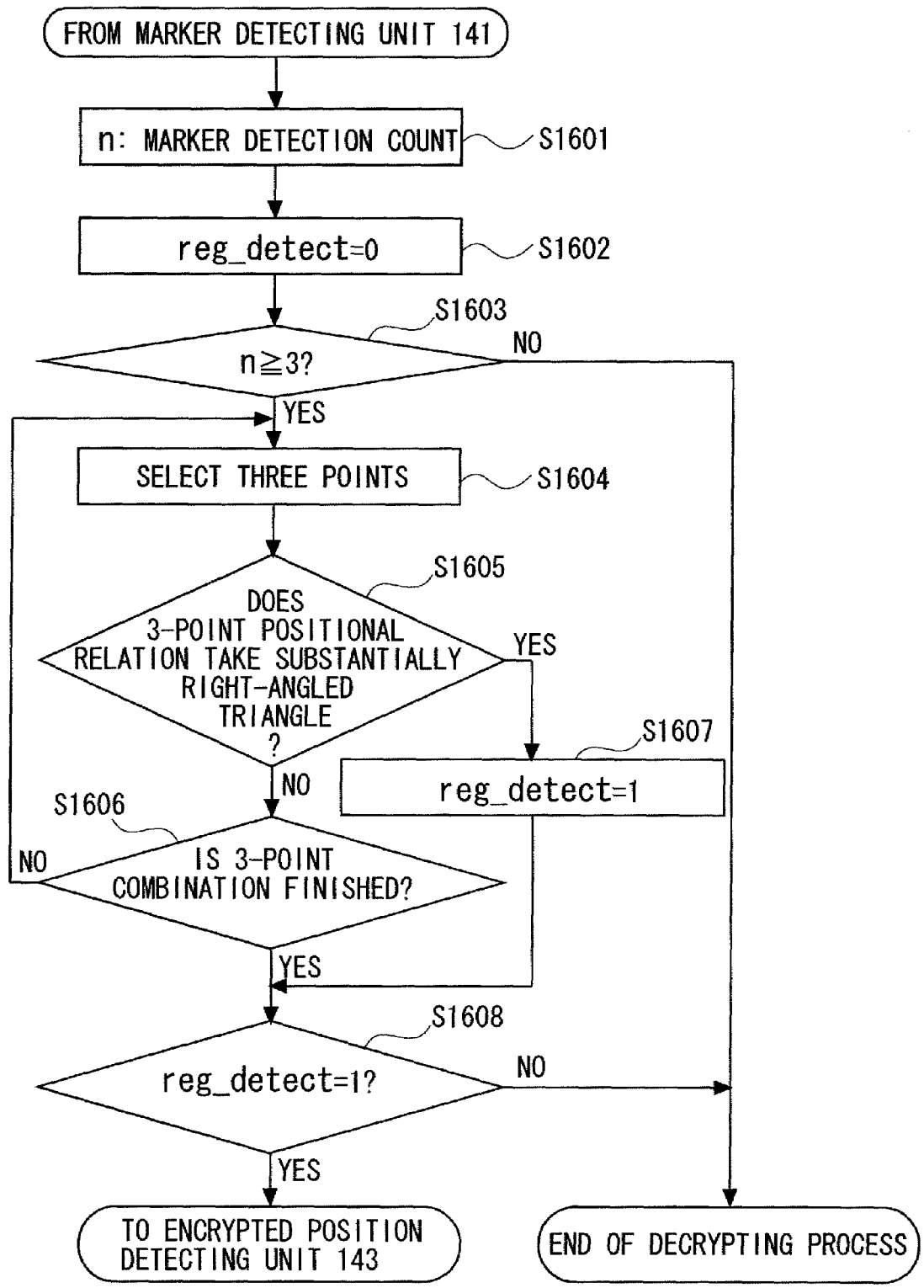
FIG. 42 is a flowchart showing a flow of an encryption area detecting process.

FIG. 42 is a flowchart showing a flow of the encryption area detecting process. The encryption area detecting process executed by the encryption area detecting unit 142 starts with step S1601 in which the number of the positioning markers 152 detected by the marker detecting unit 141 is substituted into a variable n, and in step S1602, "0" is substituted into a detection flag "reg_detect" of the encryption area 153.

Then, in step S1603, it is determined whether or not the variable n, into which the number of the positioning markers 152 is substituted, is equal to or larger than "3", and, if the variable n is not equal to or larger than "3", i.e., if the variable n is not equal to or smaller than "2" (step S1603: No), the decrypting process including the present encryption area detecting process is terminated.

While on the other hand, if the variable n is equal to or larger than "3" (step S1603: Yes), in step S1604, the three positioning markers 152 among the positioning markers 152 detected by the marker detecting unit 141 are selected, and, in step S1605, it is determined whether or not the positional relation between the thus-selected three positioning markers 152 takes substantially the right-angled triangle.

If the positional relation between the selected three positioning markers 152 does not take substantially the right-angled triangle (step S1605: No), in step S1606, it is determined whether or not a 3-point combination of the positioning markers 152 detected by the marker detecting unit 141 is completely finished, then, if not finished (step S1606: No), returning to step S1604, another set of three points is selected, and, when finished (step S1606: Yes), the operation proceeds to step S1608.

Whereas if the positional relation between the selected three positioning markers 152 takes substantially the right-angled triangle (step S1605: Yes), in step S1607, "1" is substituted into the detection flag "reg_detect".

Then, in step S1608, it is determined whether or not "1" is substituted into the detection flag "reg_detect", i.e., it is determined whether or not the three positioning markers 152 of which the 3-point positional relation takes the right-angled triangle can be detected, and the operation proceeds to a process by the encrypted position detecting unit 143 if "1" is substituted into the flag "reg_detect" (step S1608: Yes) and to the decrypting process including the present encryption area detecting process is finished whereas if "1" is not substituted into the flag "reg_detect" (step S1608: No).

The discussion gets back to the illustration in FIG. 40. The encrypted position detecting unit 143 detects minute positions of the respective pixels within the encryption area 153 by the frequency analysis and pattern matching in a way that makes use of a point that the edge portions of the encryption area 153 detected by the encryption area detecting unit 142 have a regular pixel distribution in order to accurately decrypt the encrypted image 151. This detection involves utilizing such a characteristic that the whole of the encrypted image 151 has the periodic pattern owing to the pixel value converting (inverting) process of the pixel value converting unit 33.

One thinkable detection method is a method of obtaining a pattern cycle (width) in horizontal and vertical directions of the image by use of a frequency analyzing method such as Fast Fourier Transform (FFT) and thereafter detecting the border positions (offset) by template matching etc.

Further, the border positions can be detected by Hough transform in a way that utilizes such a characteristic that the border portion becomes rectilinear when applying an edge detection filter (Laplacian filter etc) to the encrypted image.

Figure 43:
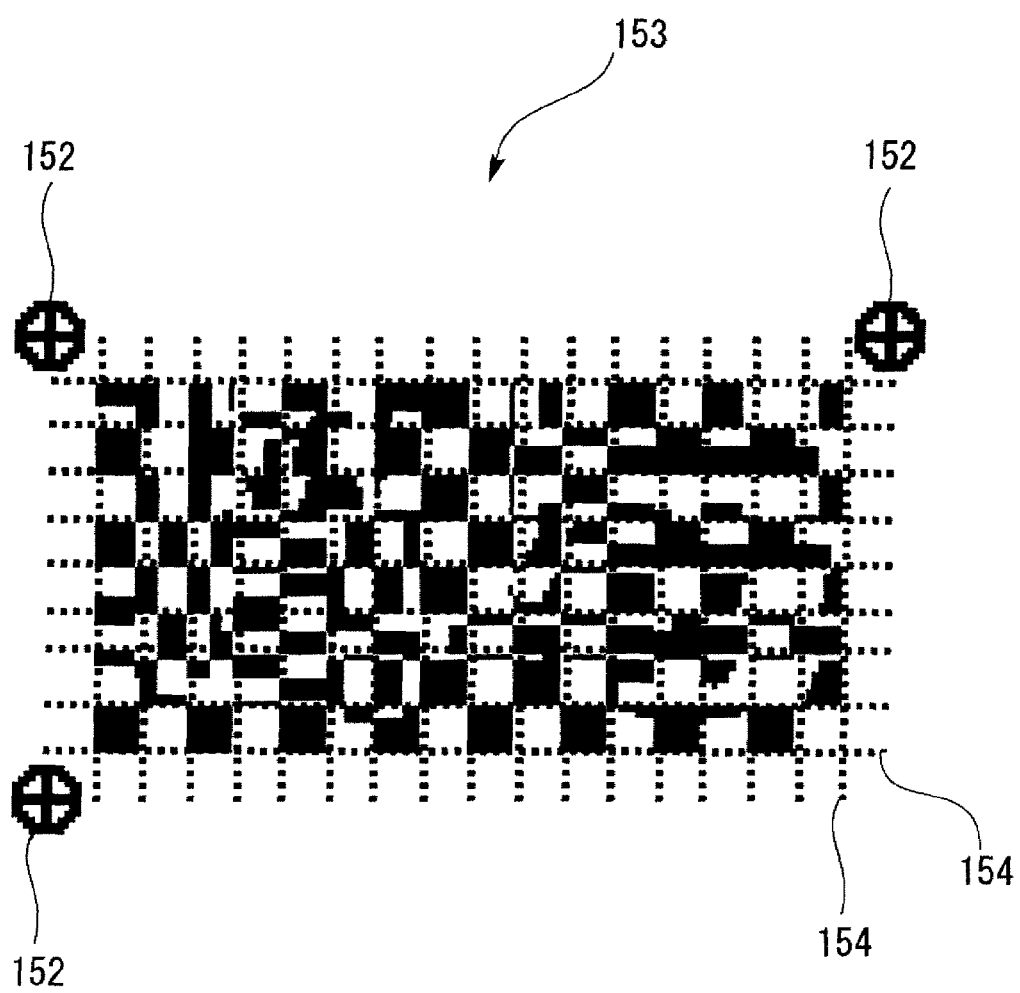
FIG. 43 is a diagram showing an example in which an encrypted position is detected.

FIG. 43 is a diagram showing an example of how the encrypted positions are detected. If the encrypted digital image 41 is complicated, a possibility is that a portion with a remarkably declined cyclicality of the encrypted image 44 might appear. In this case, an effective method is a method of detecting the encrypted positions in a way that limits the image area used for calculating the pattern cycle and the border positions to the portions exhibiting comparatively strong cyclicality.

The discussion gets back to the illustration in FIG. 40. The image inverting unit 144 executes, about the encrypted image 44, the inverting process of the converting process of the image inverting unit 32 on the basis of a method corresponding to a decryption key by use of the encrypted position information detected by the encrypted position detecting unit 143 and the decryption key inputted by a user, thereby generating a decrypted image. A procedure of the decrypting process is realized by the procedure reversed to the encrypting process, and hence its description is omitted. What has been discussed so far is the description of the first mode to which the present invention is applied.

Next, a second mode to which the present invention is applied will be described.

Figure 44:
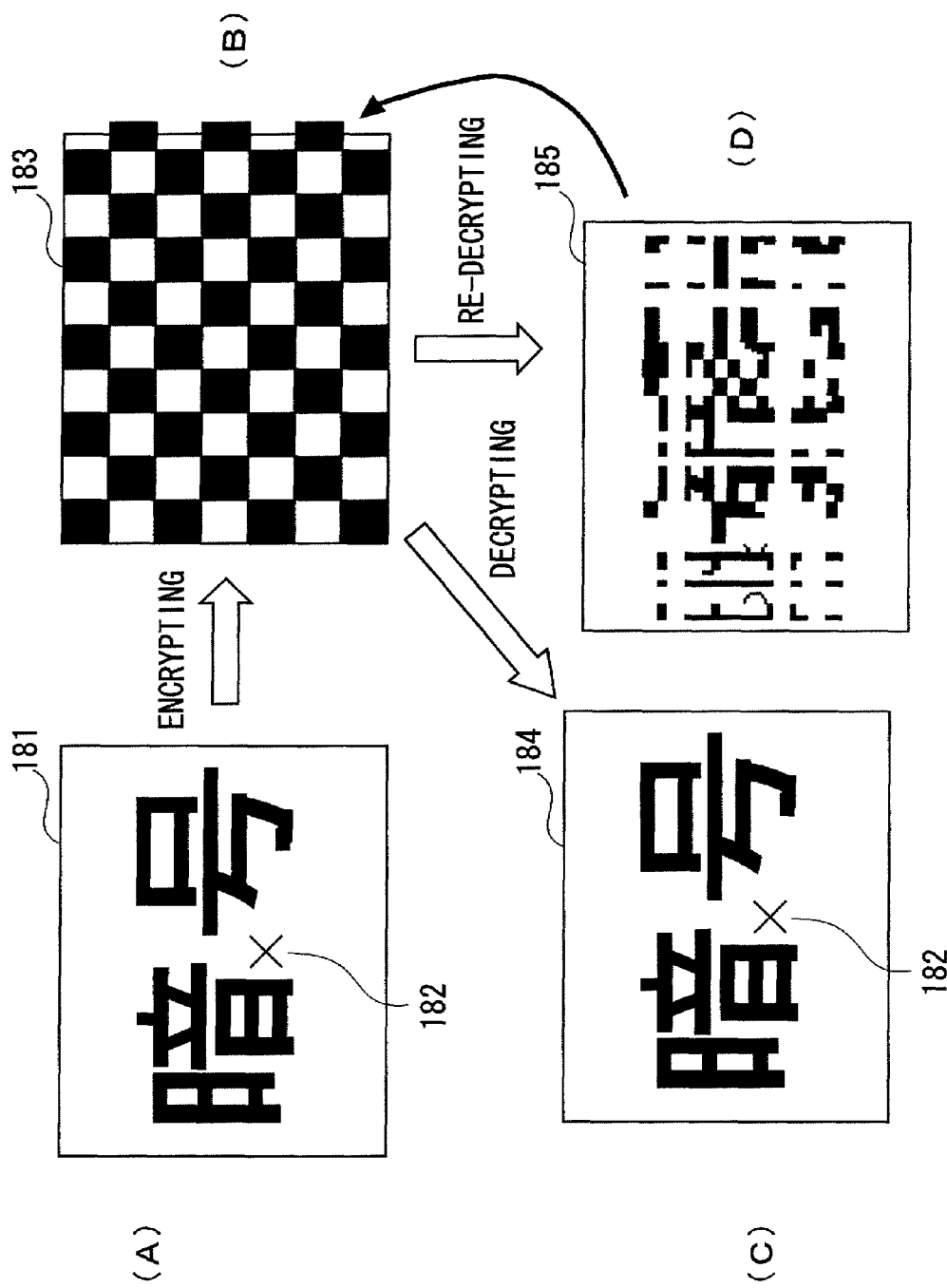
FIG. 44 is a diagram illustrating a whole image in a second mode.

FIG. 44 is a diagram showing a whole image according to the second mode. The second mode is that before the encrypting process, a specified check mark 182 for verifying validity of decrypting the encrypted image 183 ((A) in FIG. 44) is attached to an arbitrary position of an area 181 to be encrypted, then the encryption is conducted ((B) in FIG. 44), the decryption is considered to be performed correctly if the check mark 182 attached beforehand is detected from the decrypted image 184 after decrypting the encrypted image 183, and the decrypting process is terminated ((C) in FIG. 44). Whereas if the check mark 182 is not detected ((D) in FIG. 44), the encrypted position is corrected, and the decrypting process is repeated till the check mark 182 is detected or till a designated standard is satisfied.

Figure 45:
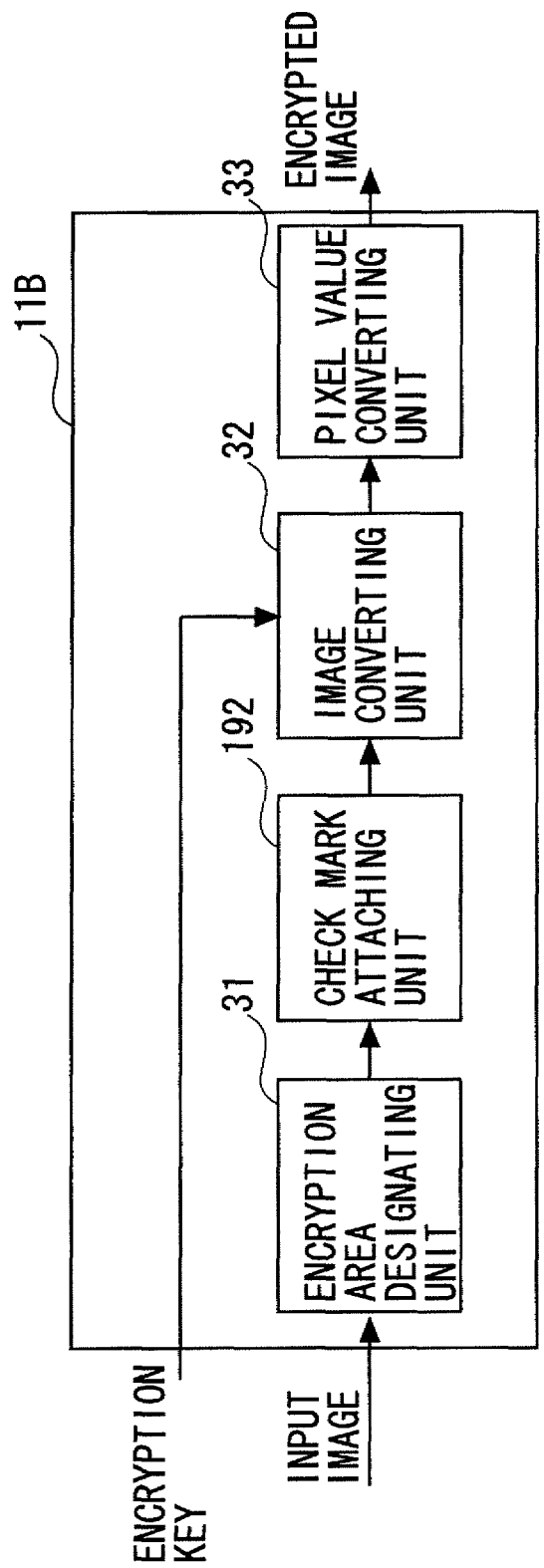
FIG. 45 is a diagram showing an outline of the encrypting process in the second mode.

FIG. 45 is a diagram illustrating an outline of the encrypting process in the second mode. In FIG. 45, the encrypting unit 11B includes the encryption area determining unit 31, a check mark attaching unit 192, the image converting unit 32 and the pixel value converting unit 33.

In the same way as in the first mode, the encryption area designating unit 31 selects the to-be-encryption area from the input image containing a want-to-encrypt area.

Then, the check mark attaching unit 192 attaches the specified check mark 182 for verifying the validity of decrypting the encrypted image 183 to the arbitrary position of the area 181 to the encrypted. The check mark 182 is, it is desirable, attached to an area having, if possible, fewer image information and a flat pixel distribution.

After attaching the check mark 182 to the designated position, in the same way as in the first mode, the image converting unit 32 inputs the area 181 to be encrypted and the encryption key, an image of the area 181 to be encrypted is visually converted by the converting method corresponding to the encryption key, and the pixel value converting unit 33 converts at the fixed intervals the pixels within the processed image converted by the image converting unit 32, thus making the converted image take substantially the grating-shaped stripped pattern.

Figure 46:
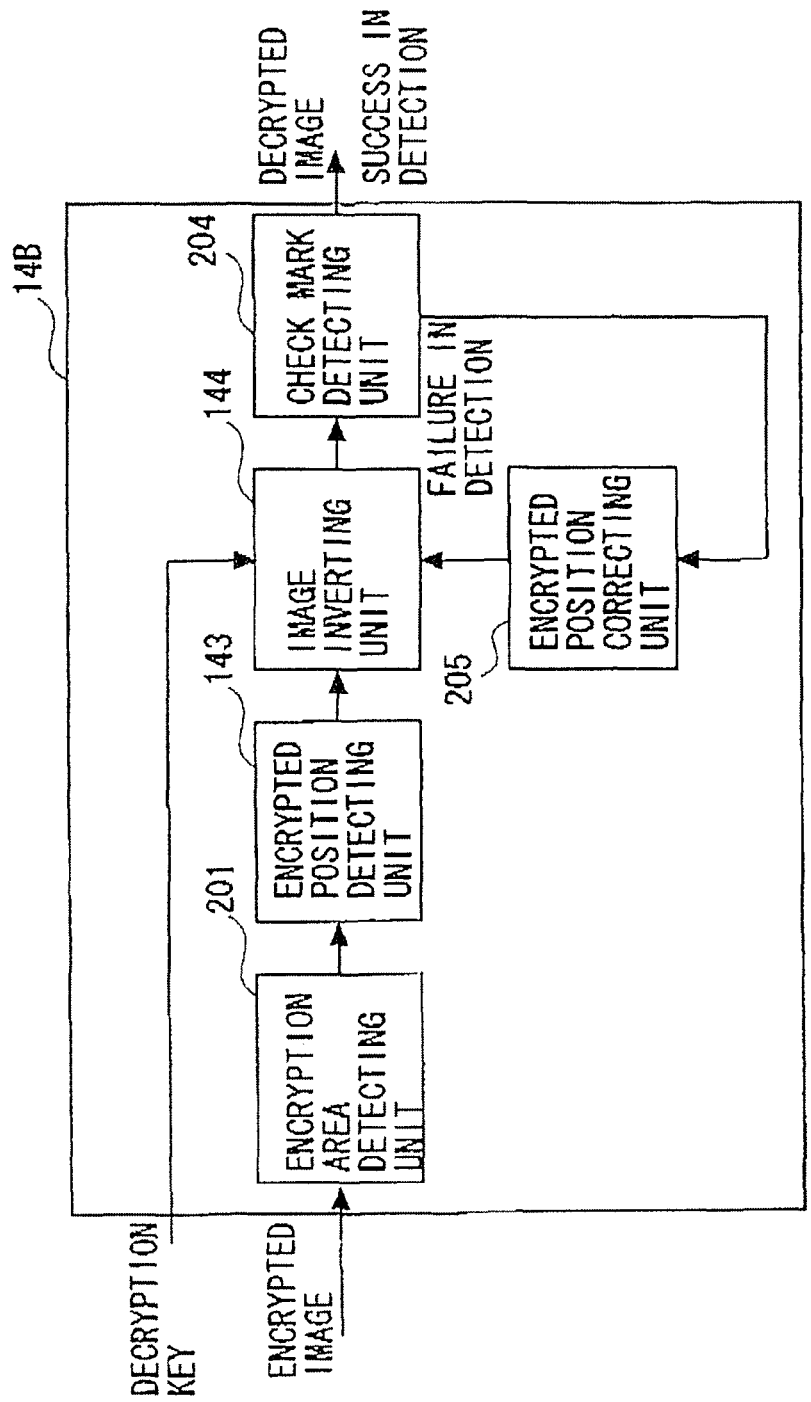
FIG. 46 is a diagram showing an outline of the decrypting process in the second mode.

FIG. 46 is a diagram showing an outline of the decrypting process in the second mode. In FIG. 46, the decrypting unit 14B includes an encryption area detecting unit 201, an encrypted position detecting unit 143, an image inverting unit 144, a check mark detecting unit 204 and an encrypted position correcting unit 205.

To start with, the encryption area detecting unit 201 detects a rough area of the encrypted image 183. Through the encrypting process by the encrypting unit 11B, a pixel distribution of the encrypted image 183 takes roughly a checkered pattern, and therefore, if the frequency analysis such as FFT is conducted about the horizontal and vertical directions thereof, power of a frequency corresponding to a stripe cycle becomes conspicuously strong.

Figure 47:
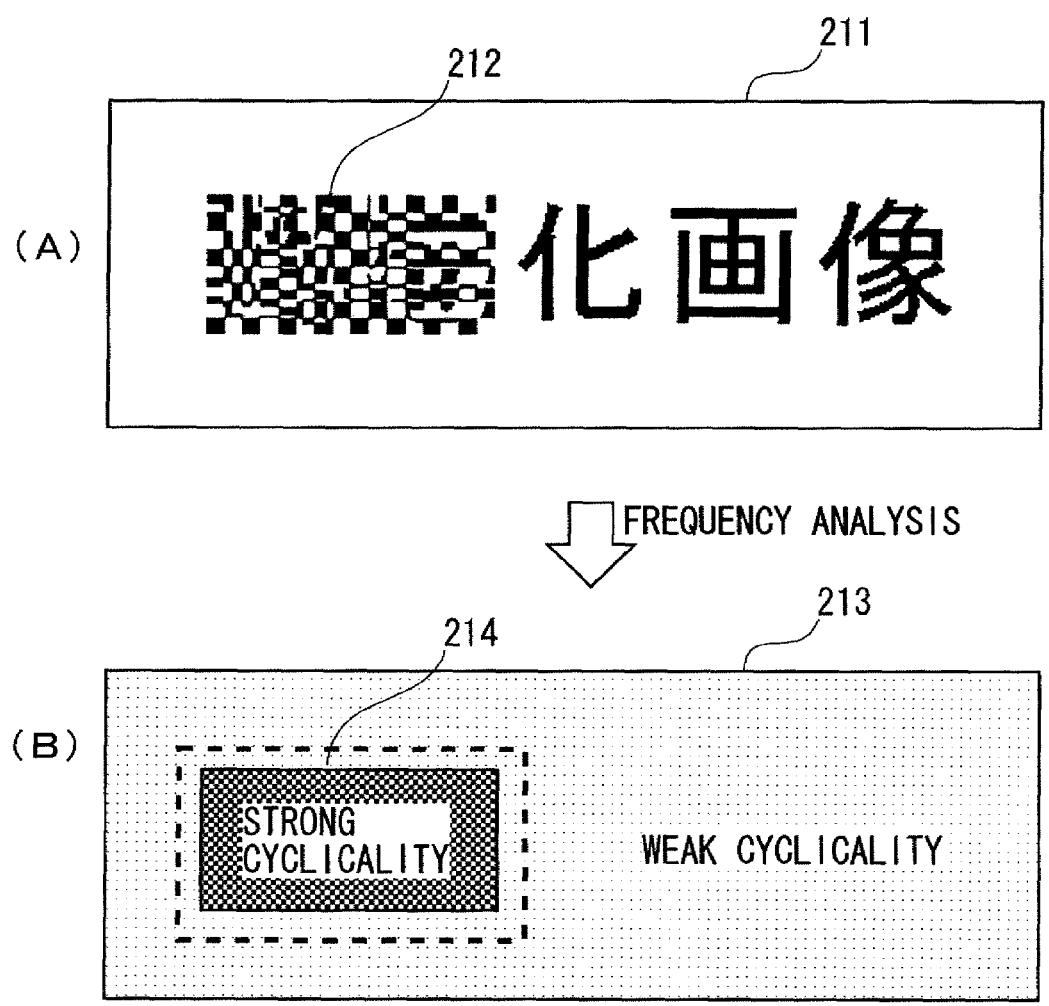
FIG. 47 is an explanatory diagram of an encryption area detecting method.

FIG. 47 is an explanatory diagram of a method of detecting the encryption area. As illustrated in (A) of FIG. 47, when performing the frequency analysis about an encrypted image 211, as shown in (B), a power intensive area of a certain frequency is expressed as a [strong cyclicality] 214 (a frequency of an integral multiple of the former frequency). The cyclicality of the pixel distribution within the encryption area tends to be strong, and it is therefore feasible to detect a rough encryption area and a stripped pattern cycle.

The discussion gets back to the illustration in FIG. 46. The encrypted position detecting unit 143, after the encryption area detecting unit 201 has specified a rough encryption area, detects the encryption area more precisely, and simultaneously the minute positions of the respective pixels in the encryption area. Such a method can be considered as one example of the positional detection that the border position (offset) of the pixel-value conversion is obtained from the stripped pattern cycle acquired by the encryption area detecting unit 201 and from an absolute pixel value difference distribution, and the areas exhibiting a comparatively large absolute pixel value difference are further narrowed down therefrom. Moreover, in the same way as by the encrypted position detecting unit 143 in the first mode, the detection of the encrypted position can involve using the Hough transform.

Figure 48:
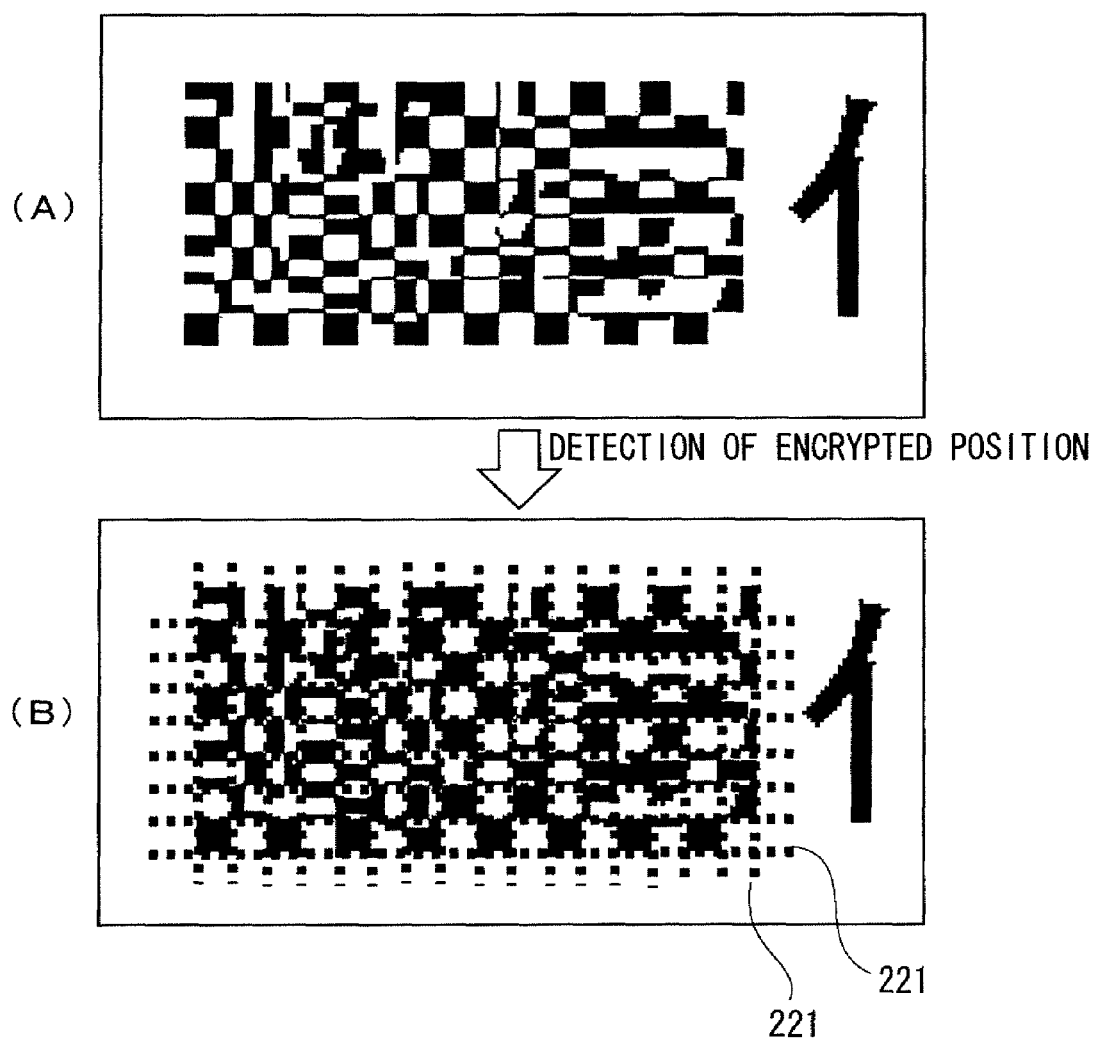
FIG. 48 is an explanatory diagram of a method of detecting an encrypted position (in a horizontal direction).

FIG. 48 is an explanatory diagram of the method of detecting the encrypted position (in the horizontal direction). As stated above, when the encryption area detecting process described above is conducted respectively in the horizontal direction and in the vertical direction, as illustrated in FIG. 48, an encrypted position 221 is detected.

The discussion gets back to the illustration in FIG. 46. The image inverting unit 144 generates a decrypted image by executing the same method as in the first mode in a way that employs the information on the encrypted position and a decryption key.

The check mark detecting unit 204 tries to detect the check mark from the decrypted image decrypted by the image inverting unit 144. The detecting method is the same as the marker detecting process in the first mode, and hence its explanation is omitted. Then, when the check mark is detected, the decrypted image is output, and the process is terminated. When the check mark is not detected, the encrypted position correcting unit 205 corrects the encrypted position, and, till the check mark is detected or till a designated standard is satisfied, the decrypting process (image inverting process) is redone.

Figure 49:
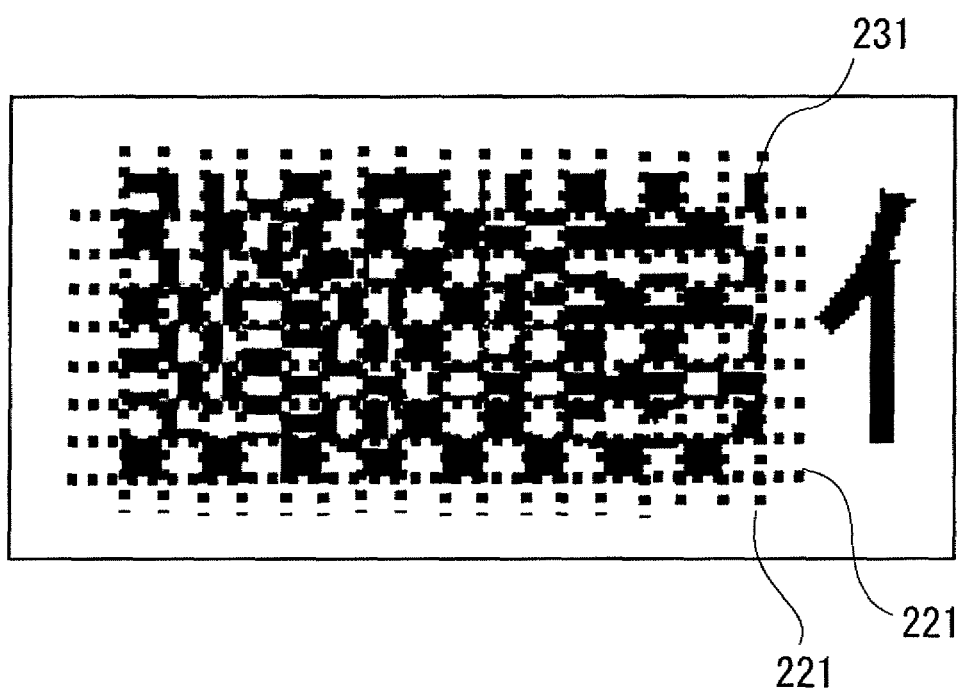
FIG. 49 is a diagram showing an example of mis-detecting the encrypted position.

FIG. 49 is a diagram showing an example of how the encrypted position is mis-detected. As illustrated in FIG. 49, there is considered a case in which an edge of the encrypted image is overlooked (a fail-in-detection line 231). Such being the case, when failing to detect the check mark 221, lines representing the encrypted position are added to or deleted from the left right edge and the upper lower edge, and the image inverting process is executed, thus examining in various ways whether the check mark 221 is detected or not. If the check mark 221 can not be detected by adding or deleting the lines in whatever manner, the process is ended without outputting the decrypted image. What has been discussed so far is the description about the second mode to which the present invention is applied.

Next, a third mode to which the present invention is applied will be described. The third mode of the present invention entails encrypting the image and decrypting the encrypted image by use of both of the positioning marker for specifying the encryption area that is exemplified in the first mode and the check mark for determining the validity of the decrypted image in the second mode. An image decryption error caused when the valid decryption key is inputted can be reduced by use of the two types of markers such as the position marker for the positional detection and the check mark for checking the decrypted image.

Figure 50:
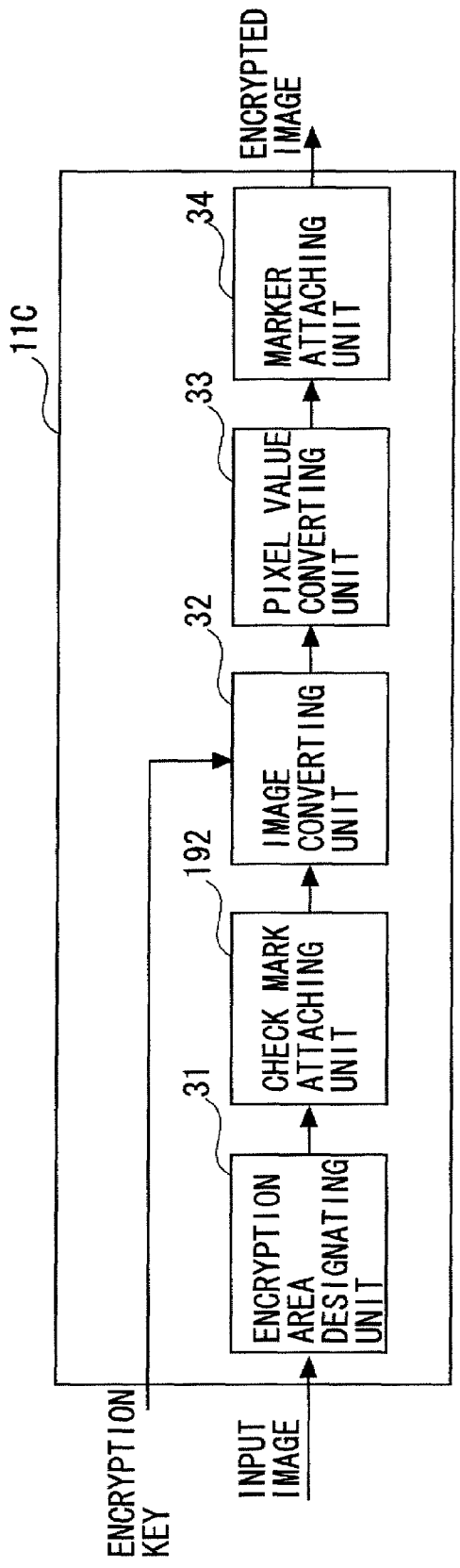
FIG. 50 is a diagram showing an outline of the encrypting process in a third mode.

FIG. 50 is a diagram showing an outline of the encrypting process in the third mode. In FIG. 50, the encrypting unit 11C includes the encryption area determining unit 31, a check mark attaching unit 192, the image converting unit 32, the pixel value converting unit 33 and the marker attaching unit 34.

To begin with, the encryption area determining unit 31 selects the image area to be encrypted, and the check mark attaching unit 192 attaches the check mark for verifying the decryption by the same method as in the second mode. After attaching the check mark, the image converting unit 32 and the pixel value converting unit 33 encrypt the image by executing the image process by the same method as in the first and second modes, and the marker attaching unit 34 attaches the positioning marker for detecting the encryption area by the same method as in the first mode. The contents of the respective processes are the same as those in the first or second mode, and hence their explanations are omitted.

FIG. 51 is a diagram showing an outline of the decrypting process in the third mode. In FIG. 51, the decrypting unit 14C includes the marker detecting unit 141, the encryption area detecting unit 142, the encrypted position detecting unit 143, the image inverting unit 144, the check mark detecting unit 204 and the encrypted position correcting unit 205.

At first, the marker detecting unit 141 detects the positioning marker by the same method as in the first mode, and subsequently the encryption area detecting unit 142 detects the encryption area by the same method as in the first mode. Moreover, the encrypted position detecting unit 143 detects the minute positions of the respective pixels in the encryption area by the same method as in the first mode. Furthermore, the respective processing procedures executed by the check mark detecting unit 204 and the encrypted position correcting unit 205 are the same as those in the second mode, and hence their explanations are omitted. What has been discussed so far is the description about the third mode to which the present invention is applied.

What is claimed is:

1. An image processing system comprising:
one or more central processing unit (CPU) coupled to a memory; said one or more CPU configured to execute:
a rendering information input accepting function to accept an input of rendering information for depicting a content of electronic data;
a digital image generating function to generate a digital image configured to have an aggregation of pixels based on the rendering information of which the input is accepted by said rendering information input accepting function;
a definition information acquiring function to acquire definition information containing area designating information for specifying an encrypting target partial area in the digital image generated by said digital image generating function and key information used on the occasion of encrypting the target partial area;
an encrypting function to generate an encrypted image into which an image of the target partial area is encrypted by converting the image of the target partial area specified based on the area designating information based on the key information;
an output function to output the encrypted image corresponding to the content of the electronic data, which is generated by said encrypting function;
a definition information retaining function to retain a plurality of predefined pieces of definition information associated with pieces of identifying information for identifying the definition information; and
an identifying information acquiring function to acquire the identifying information by image recognizing from the digital image generated by said digital image generating function,
wherein said definition information acquiring function acquires the definition information containing the area designating information and the key information used for generating the encrypted image by said encrypting function from the plurality of predefined pieces of definition information retained by said definition information retaining function based on the identifying information acquired by said identifying information acquiring function.

2. The image processing system according to claim 1, wherein said encrypting function generates the encrypted image containing a converted image having regularity used for specifying an encrypting position on the occasion of decryption by converting the image of the target partial area into a processed image based on the key information and further converting pixel values of the processed image with the regularity.

3. The image processing system according to claim 1, further comprising a designated-by-user content retaining function to retain the identifying information associated with the definition information designated beforehand by a user in the plurality of predefined pieces of definition information retained by said definition information retaining function,
wherein said definition information acquiring function acquires the definition information associated with the identifying information retained by said designated-by-user content retaining function from the plurality of predefined pieces of definition information retained by said definition information retaining unit.

4. The image processing system according to claim 1, wherein said identifying information acquiring function acquires the identifying information by detecting, from the image, at least any one of a character, a symbol, a pattern and a color contained in the digital image.

5. A non-transitory readable-by-computer recording medium recorded with an image processing program making a computer to execute:
accepting an input of rendering information for depicting a content of electronic data;
generating a digital image configured to have an aggregation of pixels based on the rendering information of which the input is accepted by said rendering information input accepting;
acquiring definition information containing area designating information for specifying an encrypting target partial area in the digital image generated by said digital image generating and key information used on the occasion of encrypting the target partial area;
encrypting involves generating an encrypted image into which an image of the target partial area is encrypted by converting the image of the target partial area specified based on the area designating information based on the key information;
outputting the encrypted image corresponding to the content of the electronic data, which is generated by said encrypting;
making said computer to execute retaining a plurality of predefined pieces of definition information associated with pieces of identifying information for identifying the definition information; and
acquiring the identifying information by image recognizing from the digital image generated by said digital image generating, wherein said definition information acquiring acquires the definition information containing the area designating information and the key information used for generating the encrypted image by said encrypting from the plurality of predefined pieces of definition information retained by said definition information retaining based on the identifying information acquired by said identifying information acquiring.

6. The non-transitory readable-by-computer recording medium recorded with an image processing program according to claim 5, wherein said encrypting involves generating the encrypted image containing a converted image having regularity used for specifying an encrypting position on the occasion of decryption by converting the image of the target partial area into a processed image based on the key information and further converting pixel values of the processed image with the regularity.

7. The non-transitory readable-by-computer recording medium recorded with an image processing program according to claim 5, further making said computer to execute retaining the identifying information associated with the definition information designated beforehand by a user in the plurality of predefined pieces of definition information retained by said definition information retaining,
wherein said definition information acquiring involves acquiring the definition information associated with the identifying information retained by said designated-by-user content retaining from the plurality of predefined pieces of definition information retained by said definition information retaining.

8. The non-transitory readable-by-computer recording medium recorded with an image processing program according to claim 5, wherein said identifying information acquiring involves acquiring the identifying information by detecting, from the image, at least any one of a character, a symbol, a pattern and a color contained in the digital image.

9. An image processing method by which a computer system executes:
accepting an input of rendering information for depicting a content of electronic data;
generating a digital image configured to have an aggregation of pixels based on the rendering information of which the input is accepted in said rendering information input accepting;
acquiring definition information containing area designating information for specifying an encrypting target partial area in the digital image generated in said digital image generating and key information used on the occasion of encrypting the target partial area;
encrypting involves generating an encrypted image into which an image of the target partial area is encrypted by converting the image of the target partial area specified based on the area designating information based on the key information;
outputting the encrypted image corresponding to the content of the electronic data, which is generated in said encrypting;
retaining a plurality of predefined pieces of definition information associated with pieces of identifying information for identifying the definition information; and
acquiring the identifying information by image recognizing from the digital image generated by said digital image generating,
wherein said definition information acquiring includes acquiring the definition information containing the area designating information and the key information used for generating the encrypted image in said encrypting from the plurality of predefined pieces of definition information retained in said definition information retaining based on the identifying information acquired by said identifying information acquiring.

10. The image processing method according to claim 9, wherein said encrypting involves generating the encrypted image containing a converted image having regularity used for specifying an encrypting position on the occasion of decryption by converting the image of the target partial area into a processed image based on the key information and further converting pixel values of the processed image with the regularity.

11. The image processing method according to claim 9, wherein said computer system further executes retaining the identifying information associated with the definition information designated beforehand by a user in the plurality of predefined pieces of definition information retained by said definition information retaining,
wherein said definition information acquiring involves acquiring the definition information associated with the identifying information retained by said designated-by-user content retaining from the plurality of predefined pieces of definition information retained by said definition information retaining.

12. The image processing method according to claim 9, wherein said identifying information acquiring involves acquiring the identifying information by detecting, from the image, at least any one of a character, a symbol, a pattern and a color contained in the digital image.

* * * * *